United States Patent [19]

Yoshida et al.

[11] Patent Number: 5,504,695

[45] Date of Patent: Apr. 2, 1996

[54] APPARATUS FOR MEASURING PAINT FILM THICKNESS BASED ON DYNAMIC LEVELLING PROPERTY OF WET PAINT FILM SURFACE

[75] Inventors: Kiyoshi Yoshida, Atsugi; Yutaka Suzuki, Zama, both of Japan

[73] Assignee: Nissan Motor Co., Ltd., Yokohama, Japan

[21] Appl. No.: 153,914

[22] Filed: Nov. 17, 1993

[30] Foreign Application Priority Data

| Nov. 17, 1992 | [JP] | Japan | 4-306966 |
| Nov. 17, 1992 | [JP] | Japan | 4-307343 |
| Mar. 16, 1993 | [JP] | Japan | 5-055549 |
| Mar. 16, 1993 | [JP] | Japan | 5-055556 |
| Sep. 17, 1993 | [JP] | Japan | 5-231796 |

[51] Int. Cl.$^6$ ................... G01B 11/00
[52] U.S. Cl. ........... 364/563; 356/355; 324/716
[58] Field of Search ............ 118/712, 679; 356/355, 382, 381; 239/75; 364/552, 563; 324/716, 721

[56] References Cited

U.S. PATENT DOCUMENTS

| 4,207,835 | 6/1980 | Schwieker et al. | 118/712 |
| 4,525,376 | 6/1985 | Edgerton | 118/712 |
| 4,695,797 | 9/1987 | Deutsch | 118/712 |
| 4,702,931 | 10/1987 | Falcoff | 118/697 |
| 4,853,879 | 8/1989 | Matzoll, Jr. et al. | 364/552 |
| 4,930,440 | 6/1990 | Shirono | 118/663 |
| 4,992,952 | 2/1991 | Sasaki | 364/510 |
| 5,091,647 | 2/1992 | Carduner et al. | |
| 5,099,788 | 3/1992 | Ito et al. | 118/712 |
| 5,147,462 | 9/1992 | Wollaus | 118/679 |
| 5,221,893 | 6/1993 | Kondou et al. | 324/721 |

Primary Examiner—Ellis B. Ramirez
Assistant Examiner—Thomas Peeso
Attorney, Agent, or Firm—Foley & Lardner

[57] ABSTRACT

An apparatus capable of measuring a wet paint film thickness easily and accurately in a non-contacting manner. The apparatus includes a paint film surface data acquisition unit for obtaining paint film surface data indicating a roughness of a paint film surface in a wet state, in a non-contacting manner; a paint medium data input unit for inputting paint medium data specifying a paint medium from which a paint film is formed; and a paint film thickness calculation unit for calculating the paint film thickness from the paint film surface data and the paint medium data according to a dynamic levelling property of a wet paint film. The paint film surface data include wavelength data indicating a wavelength of an unevenness on the paint film surface, and roughness data indicating one of a peak to peak amplitude of the unevenness on the paint film surface, a surface roughness of the unevenness on the paint film surface, a power spectrum integrated value in an image of the paint film surface, and a density vector in the image of the paint film surface.

20 Claims, 49 Drawing Sheets

PAINT FILM

POWER SPECTRUM INTERGATED VALUE Pi(%)

MEASURED

THEORETICAL

ELAPSED TIME (SEC)

| t (sec)<br>h (μm) | 0—10 | 10—20 | 20—30 | 30—40 | 40—50 | AVERAGE |
|---|---|---|---|---|---|---|
| 60 μm | 63.0 | 61.1 | 60.9 | 57.7 | 59.6 | 60.5 μm |
| 54 μm | 56.8 | 59.1 | 56.6 | 49.5 | 53.0 | 55.0 μm |

APPARATUS FOR MEASURING PAINT FILM THICKNESS BASED ON DYNAMIC LEVELLING PROPERTY OF WET PAINT FILM SURFACE

BACKGROUND OF THE INVENTION

1. Field of the Invention

The present invention relates to the apparatus for measuring a thickness of a paint film according to an information concerning a dynamic levelling property of a paint film surface in a wet state immediately after an application of the paint medium.

2. Description of the Background Art

The known examples of a conventional apparatus for measuring a thickness of a paint film include a contact type utilizing a needle gauge, and a non-contact type utilizing an electromagnetic property or an eddy current.

However, the contact type paint film thickness measurement apparatus utilizing a needle gauge has been associated with a serious problem concerning a possible damage on the paint film surface due to the contact between the needle gauge and the paint film surface, which severely affects the quality of painting.

Moreover, such a contact type paint film thickness measurement apparatus is apparently inapplicable to the measurement of the wet paint film thickness.

On the other hand, in a conventional non-contact type paint film thickness measurement apparatus utilizing the non-magnetic property of the paint medium, the measurement of the paint film thickness can be made in a non-contacting manner as shown in FIGS. 1A and 1B.

Namely, as shown in FIG. 1A, a non-contact type film thickness sensor 82 is positioned in advance at a prescribed small gap $h_0$ from a painting surface of a painting target body 81, such that the magnetic field is generated between the paint target body 81 and the non-contact type film thickness sensor 82 by a transmitter and receiver coil provided within the non-contact type film thickness sensor 82. Then, as shown in FIG. 1B, when a paint medium 83 is applied onto the painting surface of the painting target body 81 for a thickness "h", the attenuation of the magnetic field between the painting target body 81 and the non-contact type film thickness sensor 82 after the painting due to the electromagnetic resistance of the applied paint medium can be detected by the non-contact type film thickness sensor 82 which detects the change of the magnetic flux that is inversely proportional to the thickness "h" of the paint film.

However, in such a conventional non-contact type paint film thickness measurement apparatus, there is a need to set up the prescribed small gap between the painting target body 81 and the non-contact type film thickness sensor 82 before the actual painting is made, but this small gap is so small that there is a potential danger for the non-contact type film thickness sensor 82 to actually make a contact with the paint film surface and damage the paint film surface.

Moreover, this conventional non-contact type paint film thickness measurement apparatus has also been associated with the inconveniences concerning the facts that the measurement cannot be initiated after the painting is made, and that two measurements before and after the painting are necessary in order to obtain the paint film thickness.

Furthermore, this conventional non-contact type paint film thickness measurement apparatus has also been associated with the basic problem that the measurement accuracy has been so poor that the application to the measurement of the thin wet paint film has been quite difficult.

Now, the measurement of the thickness of the paint film using such a paint film thickness measurement apparatus is most typically utilized for the purpose of the management of the quality of painting, while the management of the quality of painting is usually made on a basis of a thickness of the paint film in a dry state obtained by a drying process after the painting process, so that the conventional paint film thickness measurement apparatus is usually required to measure only the dry paint film thickness.

However, this manner of management of the quality of painting has a consequence that the measurement of the paint film thickness can be carried out only after the several hours of drying process after the painting process, so that the data on the paint film thickness is unavailable during the painting process itself.

As a consequence, the data on the paint film thickness could not have been fed back to the painting process itself for the purpose of appropriately controlling the painting conditions used in the painting process according to the resulting paint film thickness. Therefore, even when an inappropriate paint film thickness is detected by the measurement made after the drying process, there are cases in which the entire painting process is required to be carried out again from the beginning such that the earlier painting is totally wasted.

On the other hand, in such management of the quality of painting, it is also necessary to check the presence of the sagging on the paint film, especially on vertical paint surfaces. Conventionally, the checking of the presence of the sagging has been achieved by the human eye inspection by the inspection worker at a painting process site.

However, in the usual painting process, there are many aspects to be inspected by the inspection worker, so that it is desirable to provide means for automatically checking the presence of the sagging such that either the work load of the inspection worker can be reduced or a number of inspection workers required in the painting process can be reduced.

SUMMARY OF THE INVENTION

It is therefore an object of the present invention to provide an apparatus capable of measuring a wet paint film thickness easily and accurately in a non-contacting manner.

It is another object of the present invention to provide an apparatus capable of estimating a dry paint film thickness according to the wet paint film thickness.

It is another object of the present invention to provide an apparatus capable of estimating quality of painting and optimum paint film thickness from the paint film thickness and the distinctness of the dry paint film according to the paint film thickness and the distinctness of the wet paint film.

It is another object of the present invention to provide an apparatus capable of checking the presence of the sagging on the wet paint film surface automatically.

According to one aspect of the present invention there is provided an apparatus for measuring a paint film thickness, comprising: paint film surface data acquisition means for obtaining paint film surface data indicating a roughness of a paint film surface in a wet state, in a non-contacting manner; paint medium data input means for inputting paint medium data specifying a paint medium from which a paint film is formed; and paint film thickness calculation means for calculating the paint film thickness from the paint film surface data obtained by the paint film surface data acquisition means and the paint medium data inputted by the paint medium data input means, according to a dynamic levelling property of a wet paint film.

According to another aspect of the present invention there is provided a method of measuring a paint film thickness, comprising the steps of: (a) obtaining paint film surface data indicating a roughness of a paint film surface in a wet state, in a non-contacting manner; (b) inputting paint medium data specifying a paint medium from which a paint film is formed; and (c) calculating the paint film thickness from the paint film surface data obtained at the step (a) and the paint medium data inputted at the step (b), according to a dynamic levelling property of a wet paint film.

Other features and advantages of the present invention will become apparent from the following description taken in conjunction with the accompanying drawings.

DETAILED DESCRIPTION OF THE PREFERRED EMBODIMENTS

Now various embodiments of an apparatus for measuring a paint film thickness according to the present invention will be described in detail.

First, a basic principle for the paint film thickness measurement based on the dynamic levelling property of the wet paint film surface according to the present invention will be described.

Figure 1A:
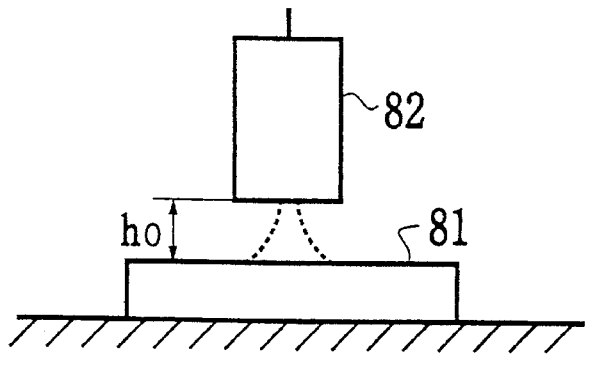
FIGS. 1A and 1B are illustrations of an exemplary conventional non-contact type paint film thickness measurement scheme.
Figure 1B:
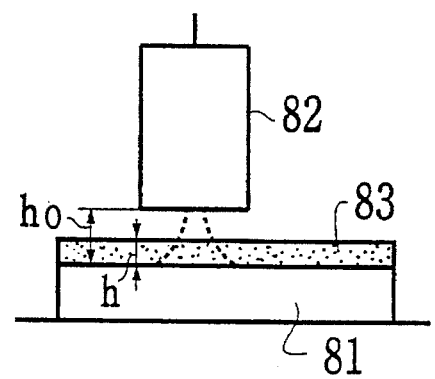
Figure 2A:
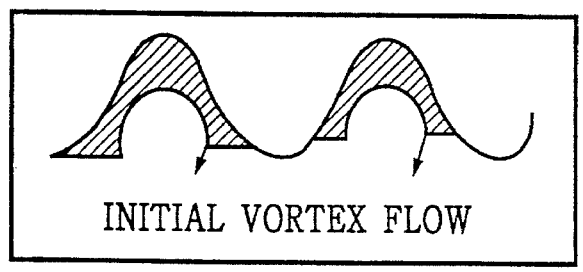
FIGS. 2A, 2B and 2C are sequential illustrations of the paint film surface showing the dynamic levelling property of the wet paint film surface utilized in the present invention.
Figure 2B:
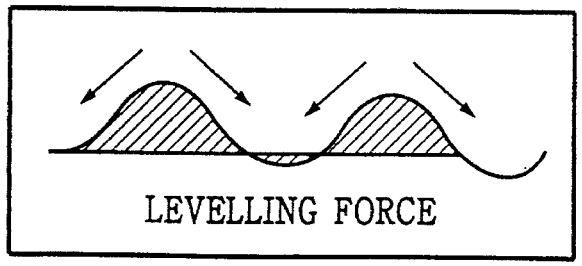
Figure 2C:
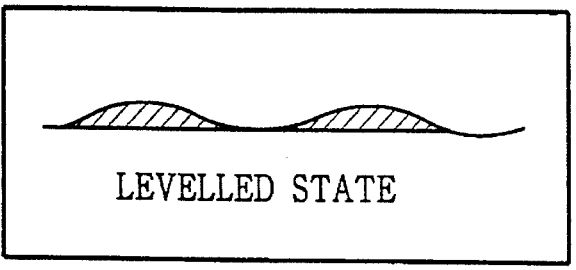

In the present invention, the measurement of the paint film thickness is achieved by utilizing the levelling property of the paint film surface in the wet state immediately after the application of the paint medium and before the drying process. Namely, immediately after the application of the paint medium, the wet paint film surface has the uneven roughness as shown in FIG. 2A due to the initial vortex flow. This roughness of the paint film surface is subsequently levelled by the levelling force as shown in FIG. 2B, and the paint film surface is eventually settled into the levelled state as shown in FIG. 2C. This property of the wet paint film is called the levelling property. In the present invention, this levelling property of the wet paint film surface is utilized for the purpose of obtaining the accurate thickness of the paint film in the dry state in a non-contact manner, by the measurement of the roughness of the wet paint film surface immediately after the application of the paint medium, as follows.

Figure 3A:
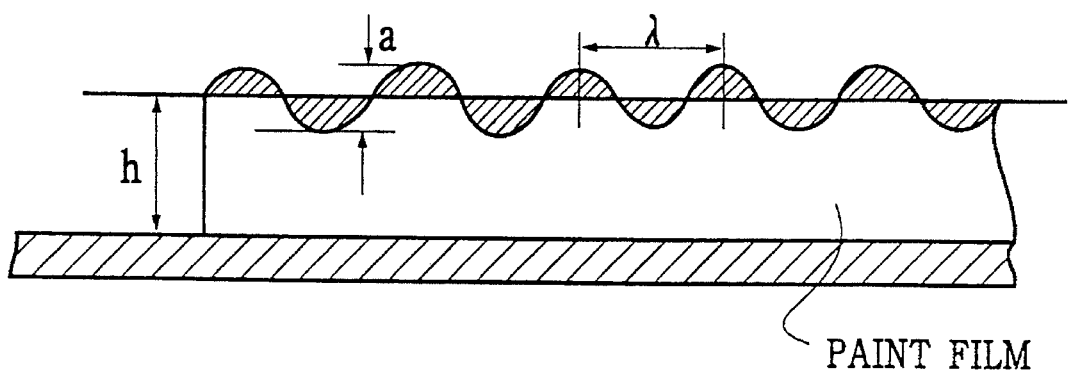
FIGS. 3A and 3B are diagrammatic and graphic representations of the paint film surface used in the first embodiment of an apparatus for measuring a paint film thickness according to the present invention.
Figure 3B:
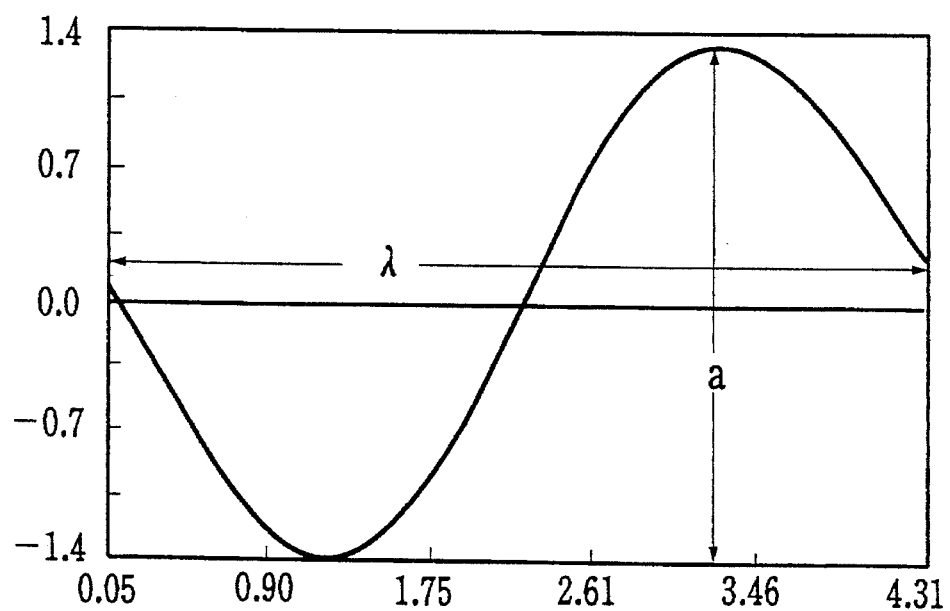

For the purpose of analysis, an initial rough wet paint film surface can be modelled as shown in FIGS. 3A and 3B, where the paint film surface contains peaks with a wavelength $\lambda$ and a peak to peak amplitude "a". Then, the dynamic characteristic of the surface levelling of the wet paint film surface can be expressed generally by the following equations (1) to (3).

$$da/dt = (-h^3 \gamma)/(3\eta) \times (2\pi/\lambda)^4 a \qquad (1)$$

$$a = a_0 \cdot \exp(-t/\tau) \qquad (2)$$

$$\tau = 3\eta\lambda^4/(16\pi^4 \times \gamma h^3) \qquad (3)$$

where "h" is an average wet paint film thickness shown in FIG. 3A, $\eta$ is the viscosity of the paint medium, $\gamma$ is the surface tension of the paint film, and $a_0$ is the initial peak to peak amplitude.

Figure 4:
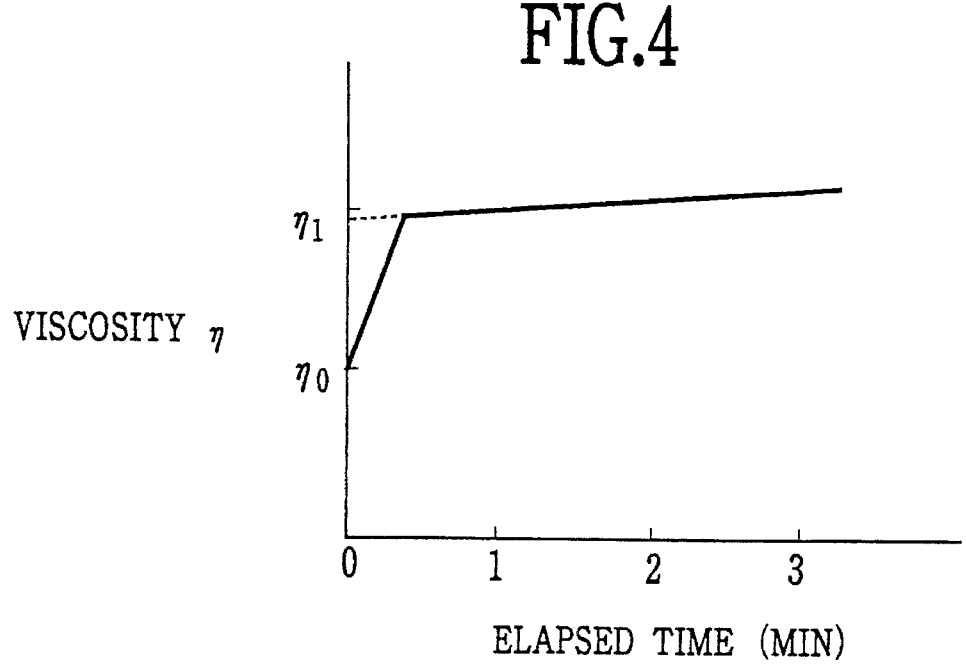
FIG. 4 is a graph showing a typical time change of the viscosity of the paint medium used in the first embodiment of an apparatus for measuring a paint film thickness according to the present invention.

Here, the viscosity $\eta$ of the paint medium changes in time after the application of the paint medium as shown in FIG. 4, when the conditions such vapor pressure, solvent, initial viscosity $\eta_0$ before the application of the paint medium, and temperature are fixed. In FIG. 4, $\eta_1$ indicates the viscosity immediately after the application of the paint medium. Consequently, in order to account for this time change of the viscosity $\eta$ as shown in FIG. 4, the following expression (4) may be used for the viscosity $\eta$ appearing in the above equations (1) to (3).

$$\eta = \eta_1 + Kt \qquad (4)$$

where $K \ll 1.0$, and $\eta_1 > \eta_0$.

Figure 5:
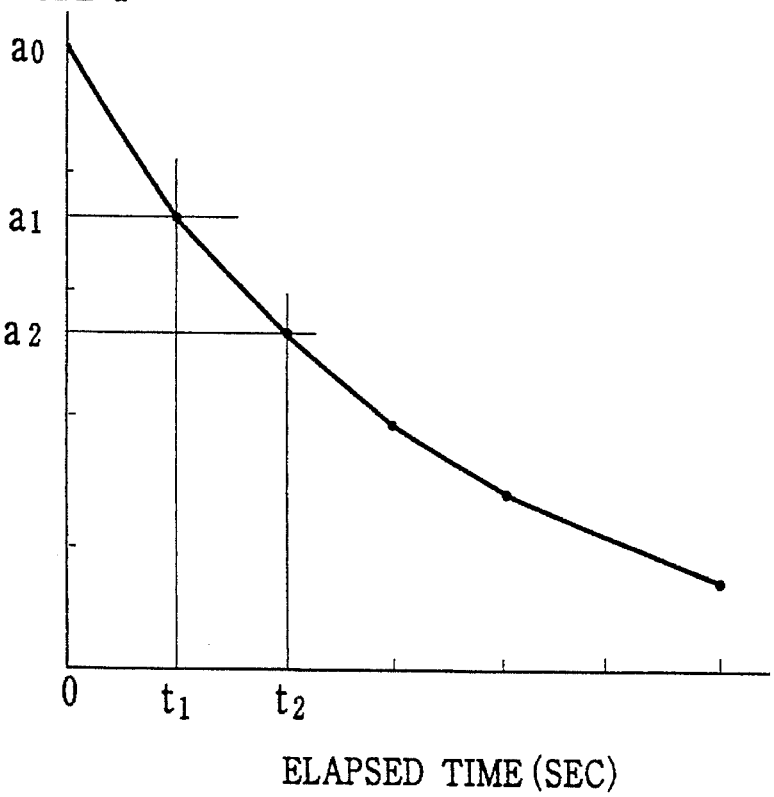
FIG. 5 is a graph showing a time change of a peak to peak amplitude used in the first embodiment of an apparatus for measuring a paint film thickness according to the present invention.

Then, the dynamic characteristic of the surface levelling given by the above equations (1) to (3) can be plotted as shown in FIG. 5, and in a case the wavelength between the elapsed times $t_1$ and $t_2$ is denoted by $\lambda_{12}$, the peal to peak amplitudes $a_1$ and $a_2$ at these elapsed times $t_1$ and $t_2$ can be expressed by the following equations (5) to (8).

$$a_1 = a_0 \cdot \exp(-t_1/\tau_1) \qquad (5)$$

$$\tau_1 = \{3 \times \eta(t_1) \times \lambda_{12}^4\}/(16\pi^4 \times \gamma \times h^3) \qquad (6)$$

$$a_2 = a_0 \cdot \exp(-t_2/\tau_2) \tag{7}$$

$$\tau_2 = \{3 \times \eta(t_2) \times \lambda_{12}{}^4\}/(16\pi^4 \times \gamma \times h^3) \tag{8}$$

Then, by dividing both sides of the above equation (5) by the respective sides of the above equation (7), the paint film thickness "h" can be expressed by the following equations (9) and (10)

$$a_1/a_2 = \exp)-t_1/\tau_1 + t_2/\tau_2) \tag{9}$$

$$\ln a_1/a_2 = (-t_1/\tau_1 + t_2/\tau_2) \tag{10}$$

From the above equations (6), (8), and (10), the expression for the wet paint film thickness in this case can be given by the following equations (11) to (13).

$$h = \}\ln a_1/a_2)/(-t_1/\tau_1' + t_2/\tau_2')\}^{1/3} \tag{11}$$

$$\tau_1' = (3\eta_1 \times \lambda_{12}{}^4)/(16\pi^4 \gamma) \tag{12}$$

$$\tau_2' = (3\eta_2 \times \lambda_{12}{}^4)/(16\pi^4 \gamma) \tag{13}$$

Similarly, by setting the left hand side of the above equation (1) as:

$$da/dt = (a_2 - a_1)/(t_2 - t_1)$$

and incorporating the above equation (4), the general expression for the wet paint film thickness can be given by the following equation (14).

$$h = \frac{(a_1 - a_2)}{a_2} \times 3\eta_1 \lambda^4/\{(t_2 - t_1) \times 16\pi^4 \gamma\} \tag{14}$$

Either one of these expressions (11) and (14) may be used in the present invention depending on the measurement system employed.

In this manner, in the present invention, the paint film thickness measurement can be realized in accordance with the dynamic levelling property of the wet paint film surface.

Figure 6:
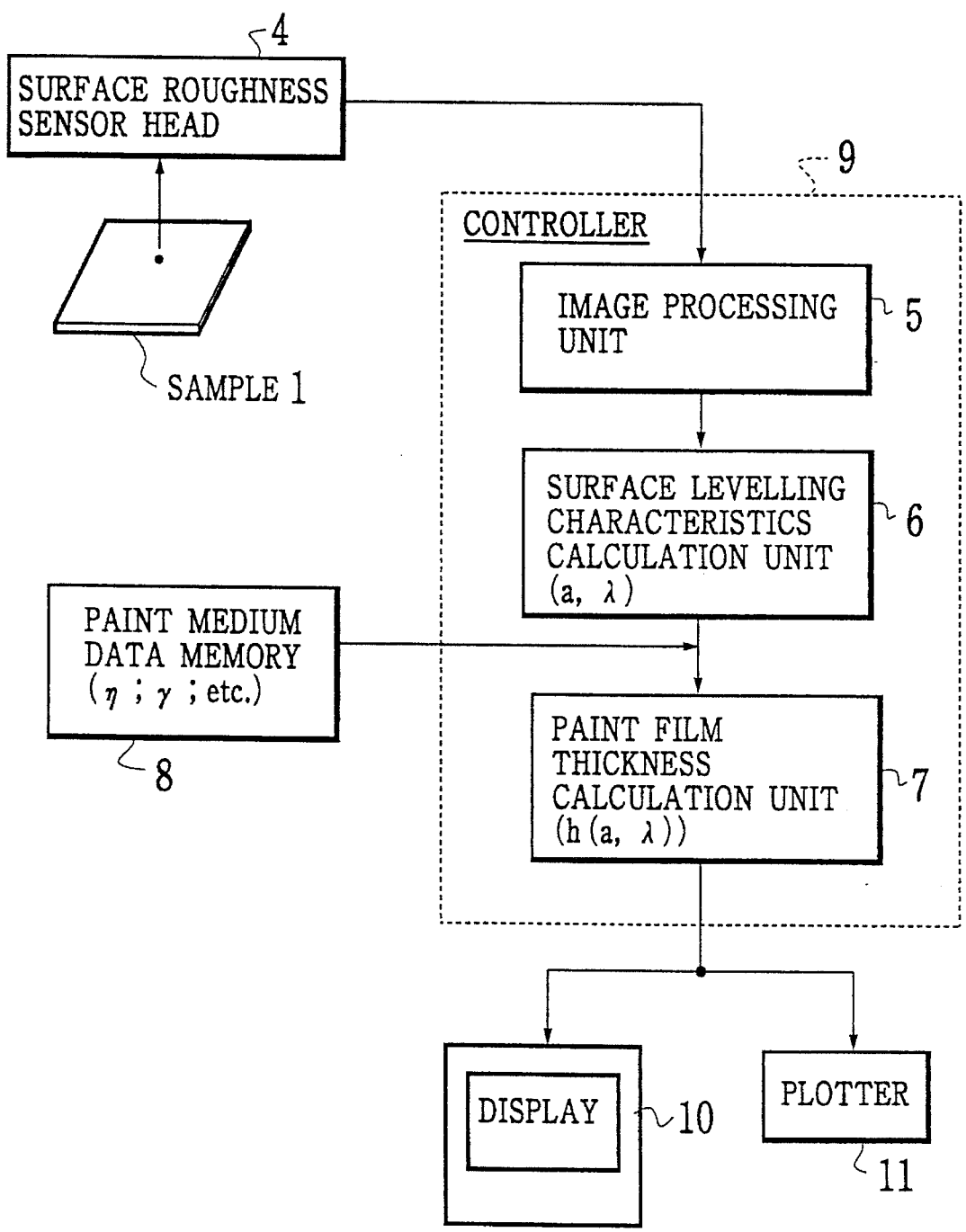
FIG. 6 is a schematic block diagram of the first embodiment of an apparatus for measuring a paint film thickness according to the present invention.

Referring now to FIG. 6, a first embodiment of an apparatus for measuring a paint film thickness according to the present invention will be described in detail.

The apparatus of this first embodiment shown in FIG. 6 generally comprises: a surface roughness sensor head 4 of a non-contact interferometer type positioned to be facing toward a wet paint film surface of a painted sample 1 formed by applying a top coating paint medium; a controller 9 for calculating the paint film thickness from the surface roughness data measured by the surface roughness sensor head 4 according to the basic principle described above; a paint medium data memory 8 for supplying data on the paint medium used in forming the wet paint film surface on the painted sample 1; and a display 10 and a plotter 11 for outputting the paint film thickness obtained by the controller 9 in suitable forms.

Figure 7:
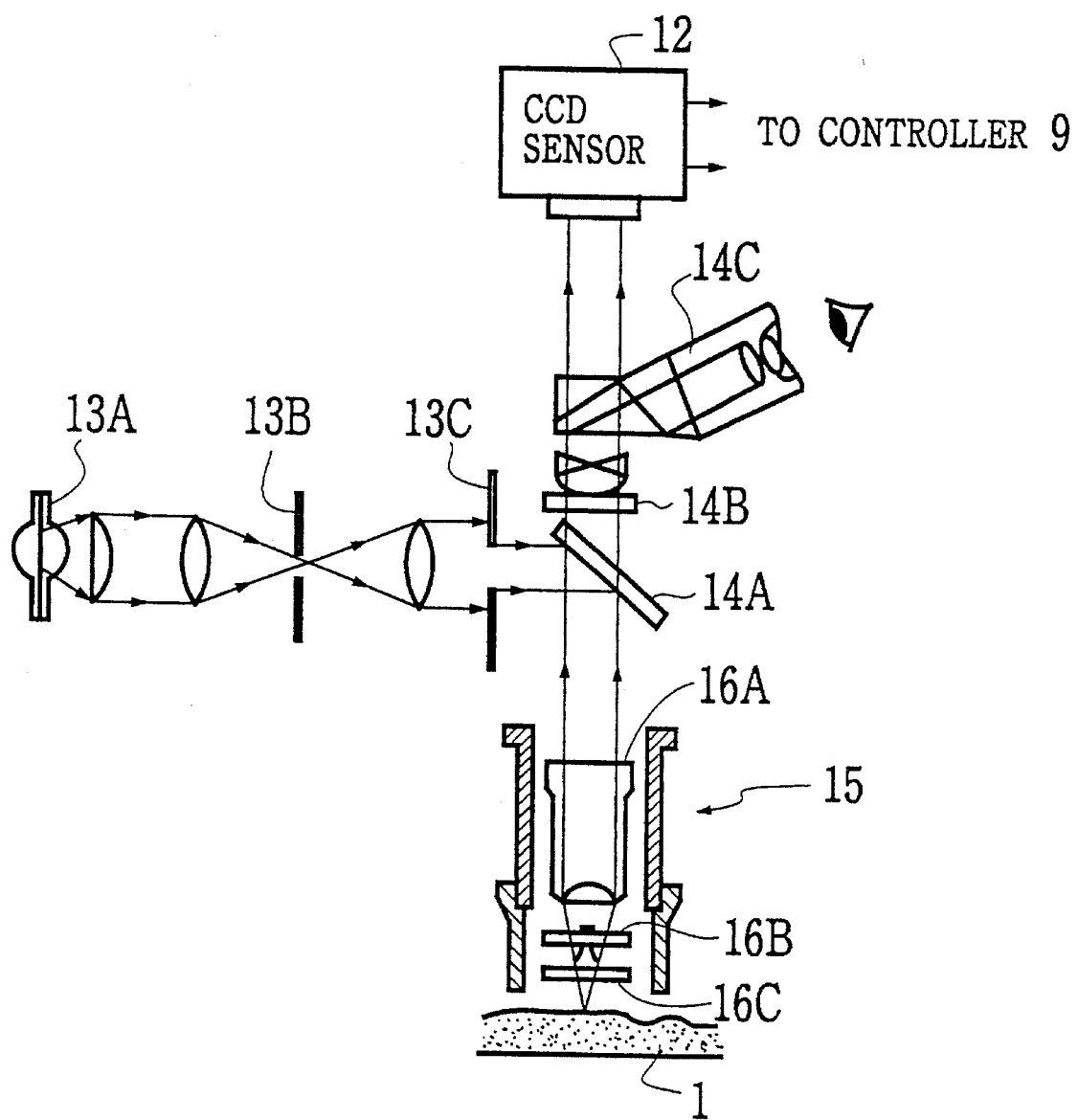
FIG. 7 is a block diagram of an exemplary configuration for a surface roughness sensor head used in the apparatus of FIG. 6.

More specifically, the surface roughness sensor head 4 is in a form of the Mirau interferometer having a configuration as shown in FIG. 7, in which the light beam generated at a light source 13A and passing through a pin hole 13B and an aperture 13C is reflected by a half mirror 14A and irradiated onto the paint film surface of the sample 1 through an object lens 16A, a reference plane 16B, and a beam splitter 16C of a spectroscope unit 15, while the light beam reflected by the paint film surface of the sample 1 passes through the beam splitter 16C, the reference plane 16B, the objective lens 16A, the half mirror 14A, and a filter 14B, and entered into a CCD sensor 12 and an eye piece 14C, such that the surface roughness data obtained at the CCD sensor 12 are supplied to the controller 9.

The controller 9 includes: an image processing unit 5 for applying various image processings such as coordinate set up and coordinate transformation for a real space modelling onto the surface roughness data supplied from the surface roughness sensor head 4; a surface levelling characteristics calculation unit 6 for calculating the surface levelling characteristics such as the wavelength $\lambda$ and the peak to peak amplitude "a" from the image processed surface roughness data; and a paint film thickness calculation unit 7 for calculating the paint film thickness "h" according to the surface levelling characteristics supplied from the surface levelling characteristics calculation unit 6 and the paint medium data supplied from the paint medium data memory 8, by using either one of the equations (11) and (14) described above.

Thus, the paint film thickness measurement operation of the apparatus of FIG. 6 is carried out according to the flow chart of FIG. 8, as follows.

First, the surface roughness data are obtained by the steps 110 to 160, by generating the light beam at the light source 13A in the surface roughness sensor head 4 at the step 110, entered into the spectroscope unit 15 at the step 120, and irradiated onto the paint film surface of the sample 1 at the step 130. Then, the light beam reflected from the paint film surface of the sample 1 is received by the CCD sensor 12 at the step 140, and the surface roughness data in a form of interference fringe image indicative of the roughness of the paint film surface is obtained by the CCD sensor 12 at the step 150. Then, the obtained surface roughness data are supplied to a memory (not shown) of the controller 9 in which they are temporarily stored at the step 160. After this surface roughness data acquisition process is carried out for a time $t_1$, the same process is repeated for a time $t_2 = t_1 + \Delta t$, so as to obtain the surface roughness data at times $t_1$ and $t_2$ that are necessary in the calculation of the paint film thickness.

Next, at the step 170, the various image processings including the coordinate set up and the coordinate transformation for a real space modelling are applied to the temporarily stored surface roughness data at the image processing unit 5.

Then, at the step 180, the peak to peak amplitude "a" and the wavelength $\lambda$ are calculated from the image processed surface roughness data at the surface levelling characteristics calculation unit 6, and supplied to the paint film thickness calculation unit 7.

On the other hand, at the step 190, the paint medium data such as the viscosity and the surface tension of the paint medium used are entered from the paint medium data memory 8 to the paint film thickness calculation unit 7.

Then, at the step 200, the paint film thickness "h" is calculated by the paint film thickness calculation unit 7 according to the surface levelling characteristics supplied from the surface levelling characteristics calculation unit 6 and the paint medium data supplied from the paint medium data memory 8, by using either one of the equations (11) and (14) described above.

Finally, at the step 210, the paint film thickness "h" obtained by the paint film thickness calculation unit 7 is displayed on the display 10 and printed out at the plotter 11.

Figure 9:
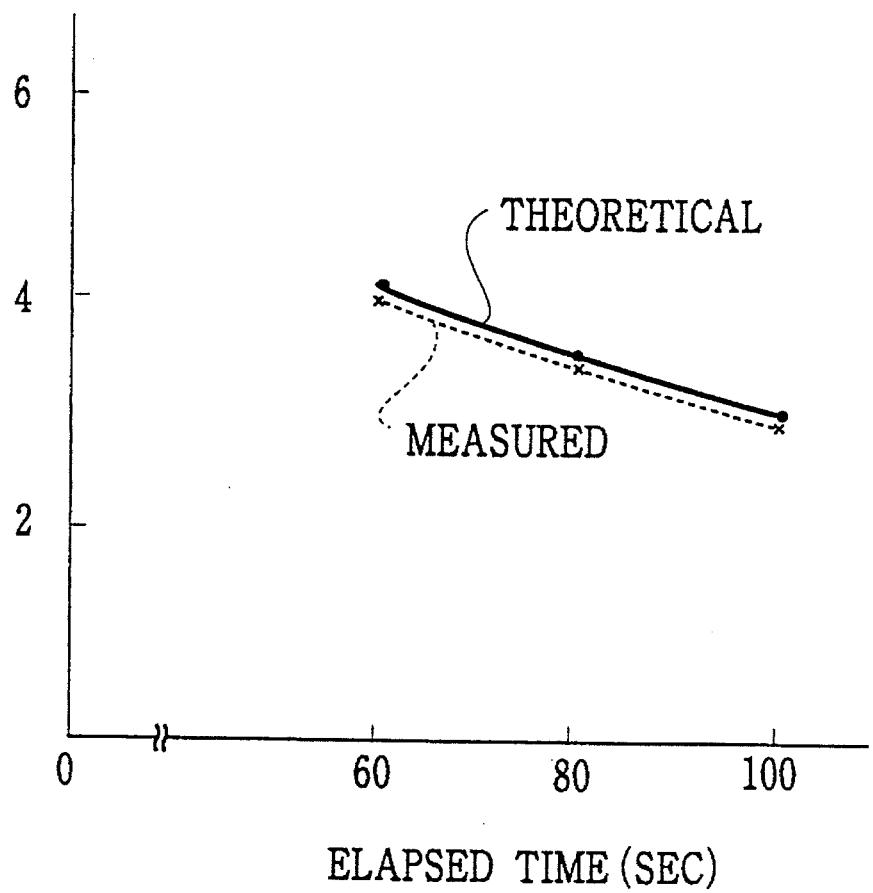
FIG. 9 is a graph showing a time change of a peak to peak amplitude obtained by the apparatus of FIG. 6, along with the theoretical values for the peak to peak amplitude.

The time change of the peak to peak amplitude "a" actually obtained by this apparatus of FIG. 6 is plotted as a dashed line in FIG. 9 along with the theoretical values indicated by a solid line, for an exemplary case of using the wavelength equal to 4.3 mm, the actual paint film thickness of 38 μm, and fixed painting conditions. As shown in FIG. 9, the values of the peak to peak amplitude "a" are obtained by this apparatus of FIG. 6 after the elapsed time of 60 to 100 sec. since the application of the paint medium are very close to the theoretical values, and the paint film thickness of approximately 38 to 40 μm can be obtained from this result and the equation (11) described above, so that the extremely accurate paint film thickness can be obtained in this first embodiment.

As described, according to this first embodiment, it becomes possible to provide an apparatus capable of measuring a wet paint film thickness easily and accurately in a non-contacting manner.

It is to be noted here that the surface roughness sensor head 4 of the interferometer type shown in FIG. 7 described above may be replaced by the other known surface roughness sensor such as that in a form of a laser displacement scanner, if desired.

Figure 10:
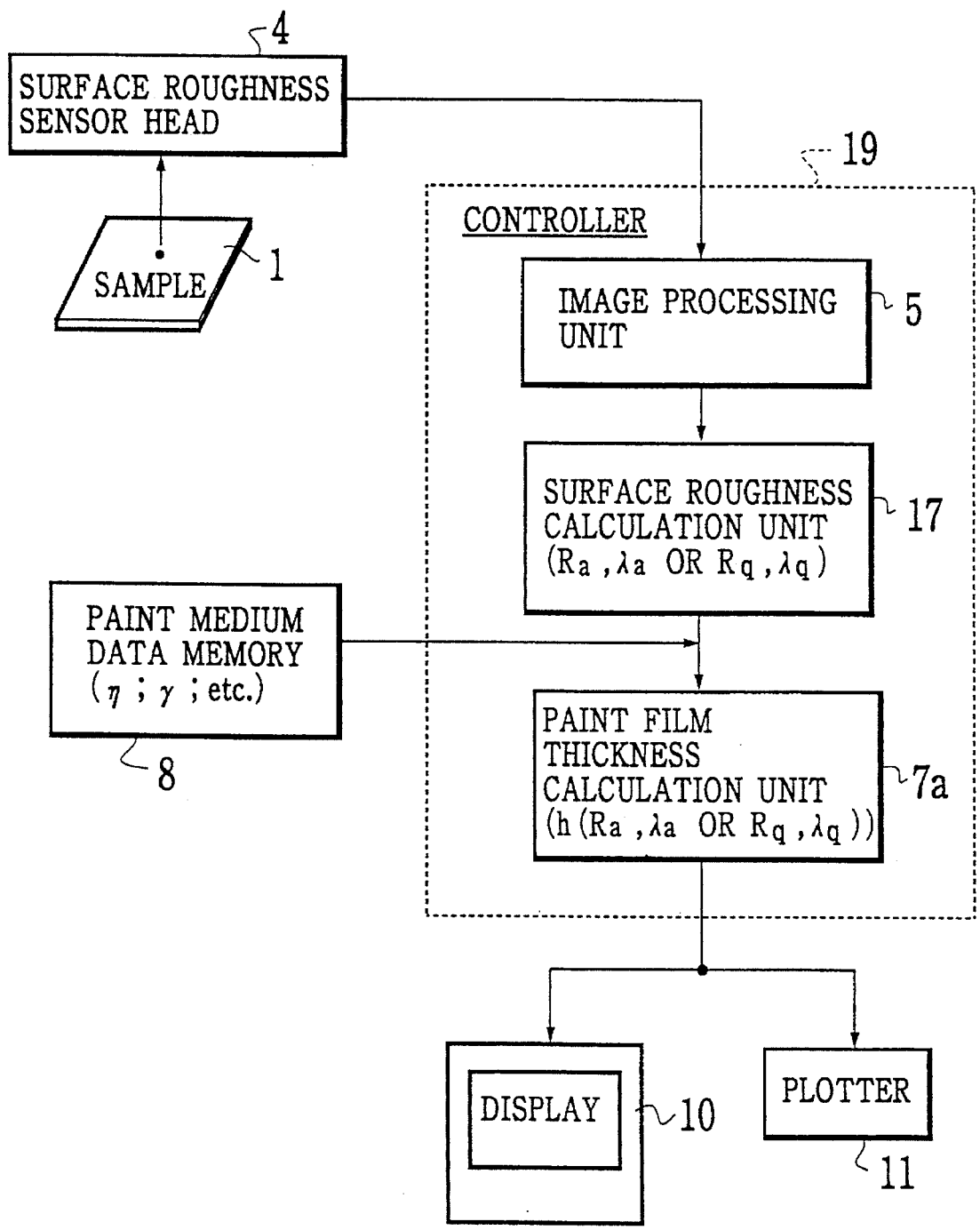
FIG. 10 is a schematic block diagram of the second embodiment of an apparatus for measuring a paint film thickness according to the present invention.

Referring now to FIG. 10, a second embodiment of an apparatus for measuring a paint film thickness according to the present invention will be described in detail.

This second embodiment of FIG. 10 differs from the first embodiment of FIG. 6 described above in that the control unit 9 in the configuration of FIG. 6 is replaced by the control unit 19 in which the surface levelling characteristics calculation unit 6 and the paint film thickness calculation unit 7 in the configuration of FIG. 6 are replaced by a surface roughness calculation unit 17 and a paint film thickness calculation unit 7a in the configuration of FIG. 10.

In the surface roughness calculation unit 17, instead of the peak to peak amplitude "a" and the wavelength λ calculated by the surface levelling characteristics calculation unit 6, a surface roughness and a surface roughness wavelength are calculated. Here, the surface roughness and the surface roughness wavelength can be specified in terms of an average roughness $R_a$ and an average wavelength $\lambda_a$, or a root mean square roughness $R_q$ and a root mean square wavelength $\lambda_q$, where the average roughness $R_a$ and the root mean square roughness $\lambda_q$ are defined by the following equations (15) and (16).

$$R_a = \frac{1}{l} \int_0^l |f(x)| dx \qquad (15)$$

$$R_q = \left[ \frac{1}{l} \int_0^l \{f(x)\}^2 dx \right]^{1/2} \qquad (16)$$

where f(x) is a 2D analytic curve representing a surface roughness of the wet paint film surface, and l is a length on the 2D analytic curve.

Then, in this second embodiment, the paint film thickness h is calculated according to the following equations (17) to (19) for the average roughness $R_a$ and the average wavelength $\lambda_a$, and equations (20) to (22) for the root mean square roughness $R_q$ and the root mean square wavelength $\lambda_q$, which are similar to the above described equations (11) to (13).

$$h = \{(\ln R_{a1}/R_{a2})/(-t_1/\tau_1' + t_2/\tau_2')\}^{1/3} \qquad (17)$$

$$\tau_1' = (3\eta_1 \times \lambda_a^4)/(16\pi^4 \gamma) \qquad (18)$$

$$\tau_2' = (3\eta_2 \times \lambda_a^4)/(16\pi^4 \gamma) \qquad (19)$$

$$h = \{(\ln R_{q1}/R_{q2})/(-t_1/\tau_1' + t_2/\tau_2')\}^{1/3} \qquad (20)$$

$$\tau_1' = (3\eta_1 \times \lambda_q^4)/(16\pi^4 \gamma) \qquad (21)$$

$$\tau_2' = (3\eta_2 \times \lambda_q^4)/(16\pi^4 \gamma) \qquad (22)$$

Figure 8:
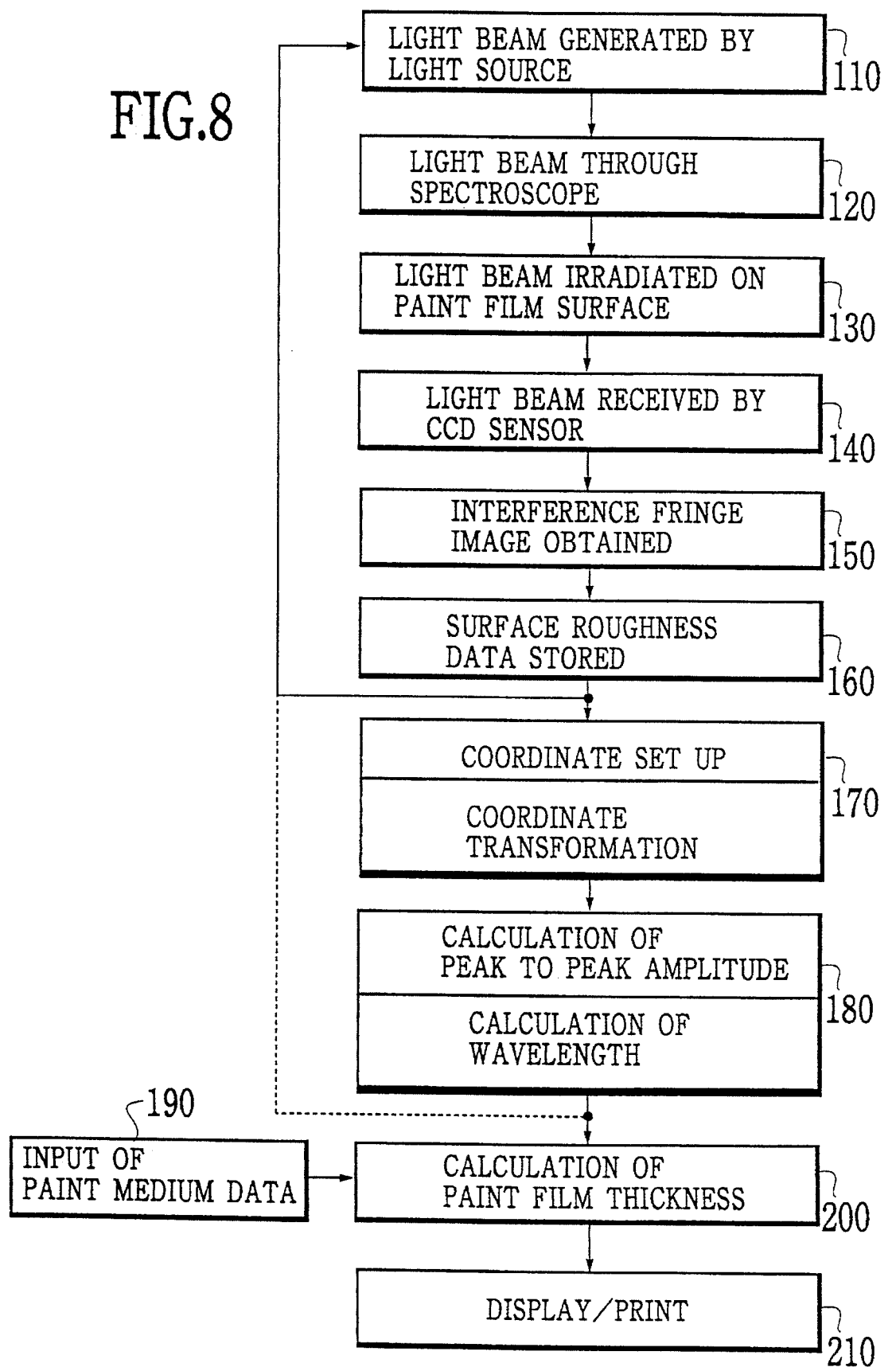
FIG. 8 is a flow chart for the paint film thickness measurement operation carried out by the apparatus FIG. 6.
Figure 11:
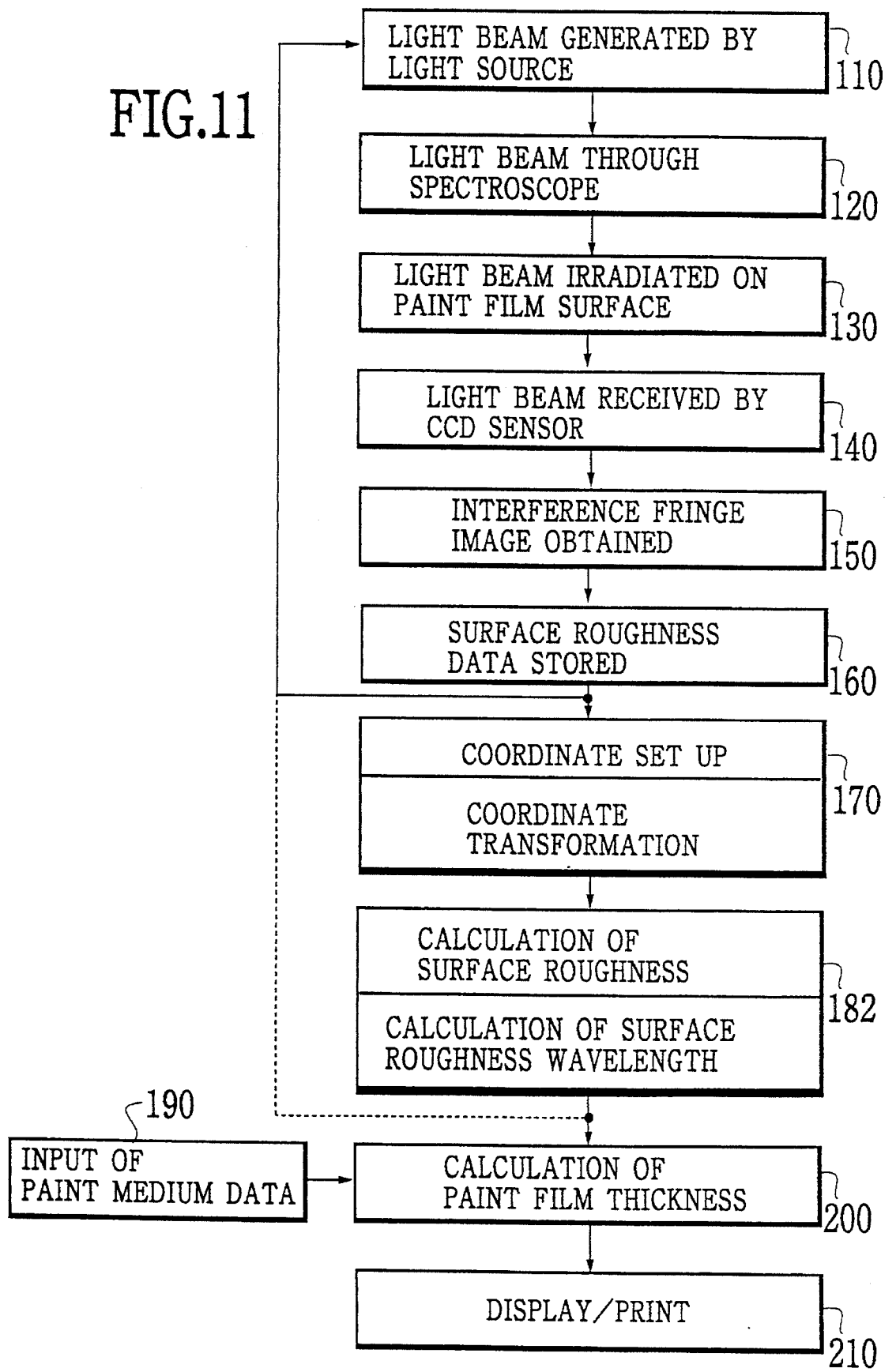
FIG. 11 is a flow chart for the paint film thickness measurement operation carried out by the apparatus FIG. 10.

Thus, the paint film thickness measurement operation of the apparatus of FIG. 10 is carried out according to the flow chart of FIG. 11, which differs from the flow chart of FIG. 8 for the apparatus of FIG. 6 in that the step 180 in FIG. 8 is replaced by the step 182 in which the surface roughness and a surface roughness wavelength are calculated instead of the peak to peak amplitude "a" and the wavelength λ calculated at the step 180.

Consequently, at the step 182, the average roughness $R_a$ and the average wavelength $\lambda_a$ or the root mean square roughness $R_q$ and the root mean square wavelength $\lambda_q$ are calculated from the image processed surface roughness data at the surface roughness calculation unit 17, and supplied to the paint film thickness calculation unit 7a.

Then, at the step 200, the paint film thickness "h" is calculated by the paint film thickness calculation unit 7a according to the surface roughness and the surface roughness wavelength supplied from the surface roughness calculation unit 17 and the paint medium data supplied from the paint medium data memory 8, by using either one of the equations (17) and (20) described above.

Figure 12:
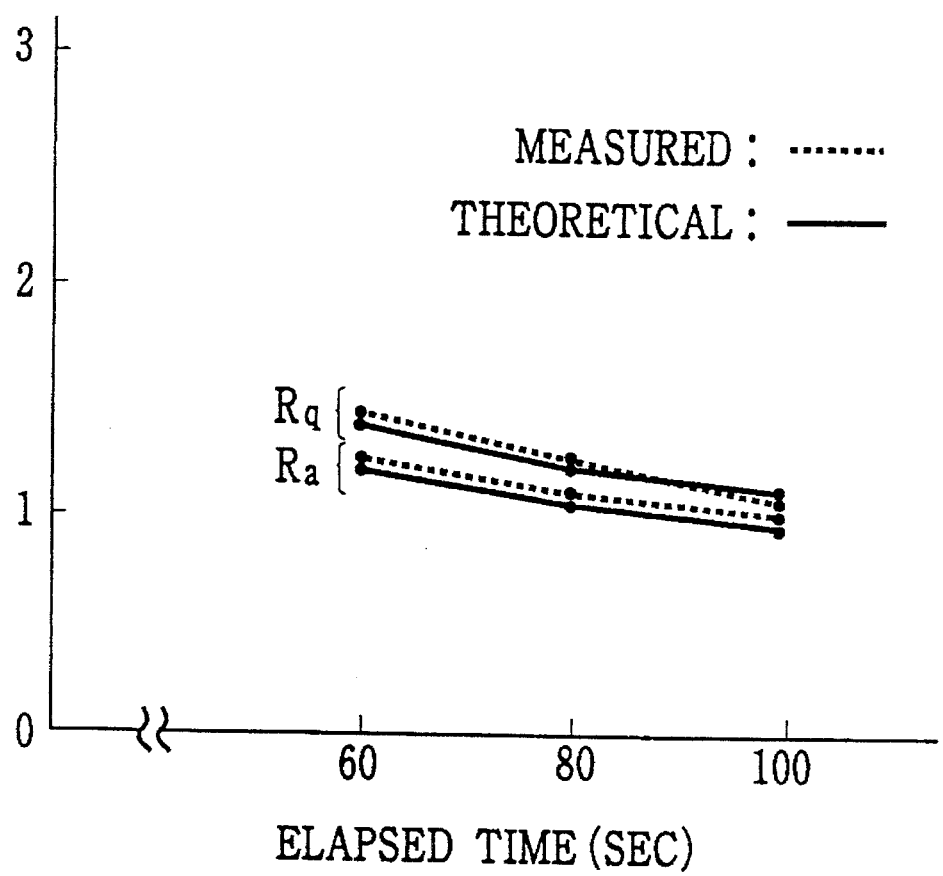
FIG. 12 is a graph showing a time change of surface roughnesses obtained by the apparatus of FIG. 10, along with the theoretical values for the surface roughnesses.

The time change of the surface roughnesses $R_a$ and $R_q$ actually obtained by this apparatus of FIG. 10 is plotted as dashed lines in FIG. 12 along with the theoretical values indicated by solid lines, for an exemplary case of using the wavelength equal to 4.3 mm, the actual paint film thickness of 38 μm, and fixed painting conditions. As shown in FIG. 12, the values of the surface roughnesses $R_a$ and $R_q$ are obtained by this apparatus of FIG. 10 after the elapsed time of 60 to 100 sec. since the application of the paint medium are very close to the theoretical values, and the paint film thickness of $h_a = 40$ μm and $h_q = 39$ μm can be obtained from these results and the equations (17) and (20) described above, so that the extremely accurate paint film thickness can also be obtained in this second embodiment.

As described, according to this second embodiment, it also becomes possible to provide an apparatus capable of measuring a wet paint film thickness easily and accurately in a non-contacting manner.

Moreover, in this second embodiment, the measurement of the surface roughness and the surface roughness wavelength can be made in a relatively shorter period of time compared with the first embodiment described above, and in addition, there is no need to select a particular roughness for determining the peak to peak amplitude and the wavelength in the wet paint film surface as required in the first embodiment described above.

Figure 13:
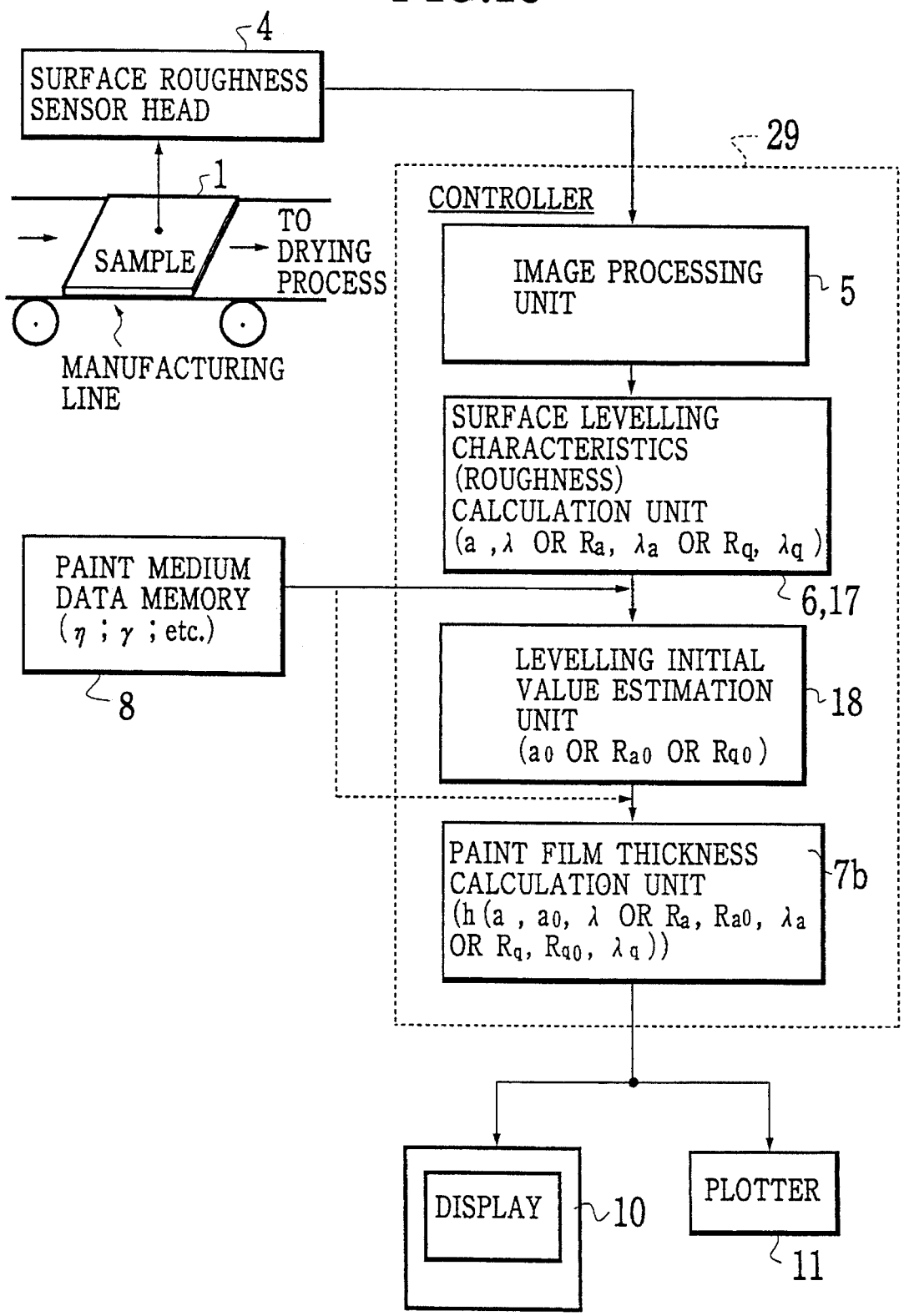
FIG. 13 is a schematic block diagram of the third embodiment of an apparatus for measuring a paint film thickness according to the present invention.

Referring now to FIG. 13, a third embodiment of an apparatus for measuring a paint film thickness according to the present invention will be described in detail.

This third embodiment of FIG. 13 differs from the first and second embodiments of FIG. 6 and 10 described above in that the control unit 9 or 19 in the configuration of FIG. 6 or FIG. 10 is replaced by the control unit 29 in which a paint film thickness calculation unit 7 or 7a is replaced by a paint film thickness calculation unit 7b, a levelling initial value estimation unit 18 is inserted between the surface levelling characteristics calculation unit 6 or the surface roughness calculation unit 17 and the paint film thickness calculation unit 7b, and the paint medium data from the paint medium data memory 8 is also supplied to this levelling initial value estimation unit 18 in the configuration of FIG. 13.

This levelling initial value estimation unit 18 estimates the initial peak to peak amplitude as, or the initial surface roughness $R_{a0}$ or $R_{q0}$ as described below, such that the calculation of the paint film thickness can be made by a single measurement of the peak to peak amplitude and the wavelength or the surface roughness and the surface roughness wavelength at a time t sec. after the application of the paint medium alone.

Namely, according to the equation (5) described above, the initial peak to peak amplitude $a_0$ can be expressed by the following equation (23).

$$a_0 = a_1 \cdot \exp(t_1/\tau_1) \tag{23}$$

where $\tau_1$ is given by the above equation (6) while $\eta_1(t_1)$ appearing in $\tau_1$ is given by the above equation (4). Consequently, the initial peak to peak amplitude $a_0$ at a time $t=0$ can be obtained by using this equation (23) from the measured peak to peak amplitude at at a time $t=t_1$, provided that the painting condition is fixed.

Figure 14:
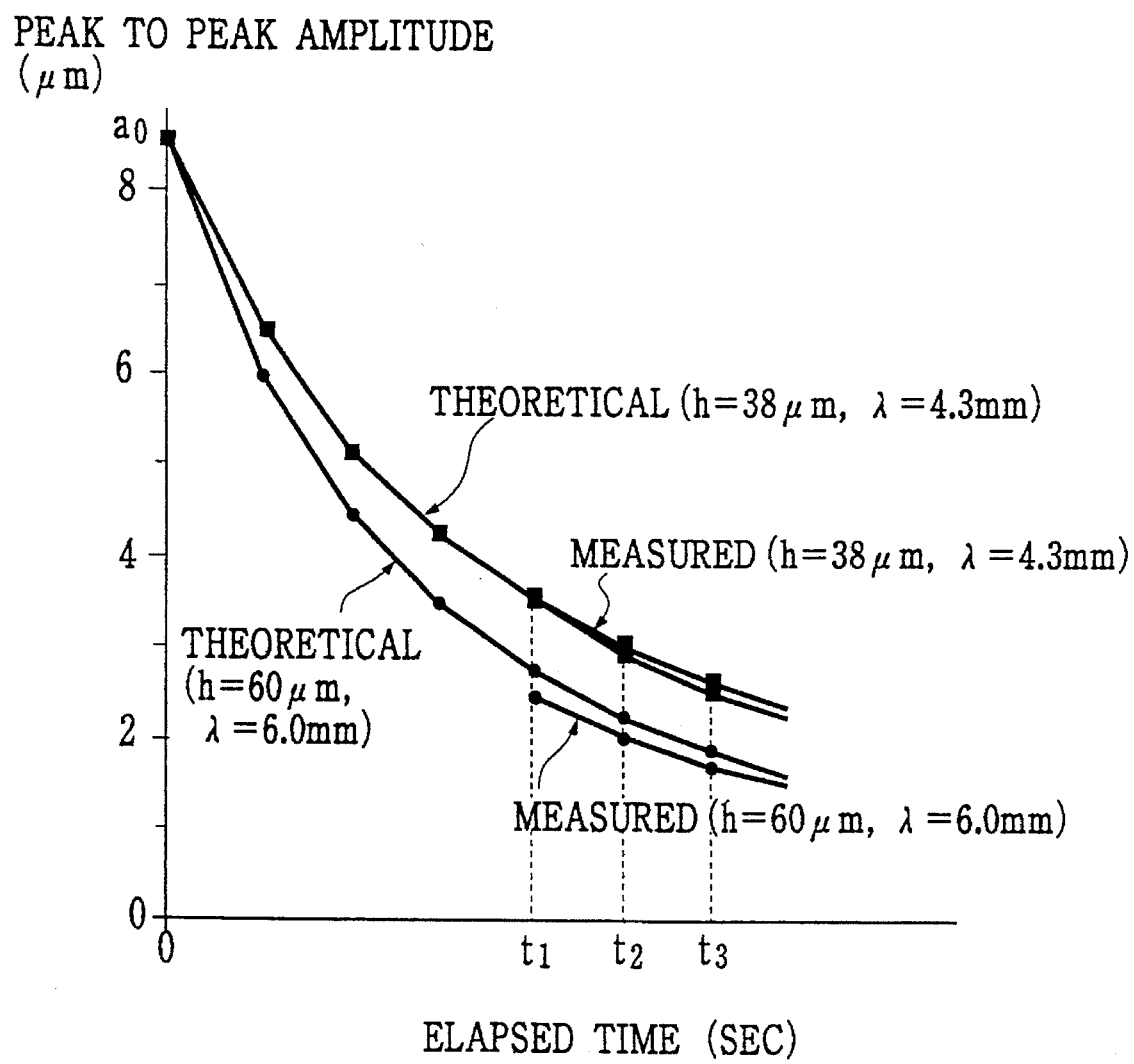
FIG. 14 is a graph showing a time change of peak to peak amplitudes obtained by the apparatus of FIG. 13, along with the theoretical values for the peak to peak amplitudes.

On the other hand, as can be seen in the measurement results and the theoretical values for the peak to peak amplitude "a" shown in FIG. 14, for a case of the paint film thickness $h=60$ μm and the wavelength $\lambda=6$ mm and a case of the paint film thickness $h=38$ μm and the wavelength $\lambda=4.3$ mm, the initial peak to peak value $a_0$ is in a range of 8.5 to 8.7 μm for the former case while the initial peak to peak value $a_0$ is in a range of 8.4 to 8.6 μm in the latter case, so that it can be asserted that the initial peak to peak amplitude $a_0$ is substantially constant with respect to the paint film thickness "h" and the wavelength $\lambda$. In other words, there is a relationship expressed by the following expression (24).

$$\lambda^4/h^3 \approx K_0 (constant) \tag{24}$$

Consequently, when the paint medium data are known in advance, the initial peak to peak amplitude a0 can be estimated from the measured peak to peak amplitude "a" at a time t after the application of the paint medium alone, by using the above equations (23) and (24).

The similar analysis also holds for the initial value of the surface roughness $R_a$ or $R_q$.

In this manner, the levelling initial value estimation unit 18 estimates the initial peak to peak amplitude $a_0$, or the initial surface roughness $R_{a0}$ or $R_{q0}$, and supplies the obtained initial value to the paint film thickness calculation unit 7b.

Then, the paint film thickness calculation unit 7b calculates the paint film thickness "h" from the supplied initial value as follows.

Namely, by substituting $t_1 \rightarrow 0$ and $t_2 \rightarrow t_1$ in the above described equations (11) to (13), the following equations (25) and (26) can be obtained for the paint film thickness "h" for a case of using the peak to peak amplitude "a" and the wavelength $\lambda$ as in the first embodiment of FIG. 6 described above.

$$\begin{aligned} h &= \{(\ln a_0/a_1)/(-0/\tau_0 + t_1/\tau_1')\}^{1/3} \\ &= \{(\ln a_0/a_1)/(t_1/\tau_1')\}^{1/3} \end{aligned} \tag{25}$$

$$\tau_1' = (3\eta_1 \times \lambda^4)/(16\pi^4 \gamma) \tag{26}$$

where $\eta_1$ is given by the above equation (4).

Similarly, by substituting $t_1 \rightarrow 0$ and $t_2 \rightarrow t_1$ in the above described equation (17) to (19) and equations (20) to (22), the following equations (27) and (28) and equations (29) and (30) can be obtained for the paint film thickness "h" for a case of using the surface roughness $R_a$ or $R_q$ and the surface roughness wavelength $\lambda_a$ or $\lambda_q$, respectively, as in the second embodiment of FIG. 10 described above.

$$h = (\ln R_{a0}/R_{a1})/(t_1/\tau_1')^{1/3} \tag{27}$$

$$\tau_1' = (3\eta_1 \times \lambda_a^4)/(16\pi^4 \gamma) \tag{28}$$

$$h = \{(\ln R_{q0}/R_{q1})/(t_1/\tau_1')\}^{1/3} \tag{29}$$

$$\tau_1' = (3\eta_1 \times \lambda_q^4)/(16\pi^4 \gamma) \tag{30}$$

Figure 15:
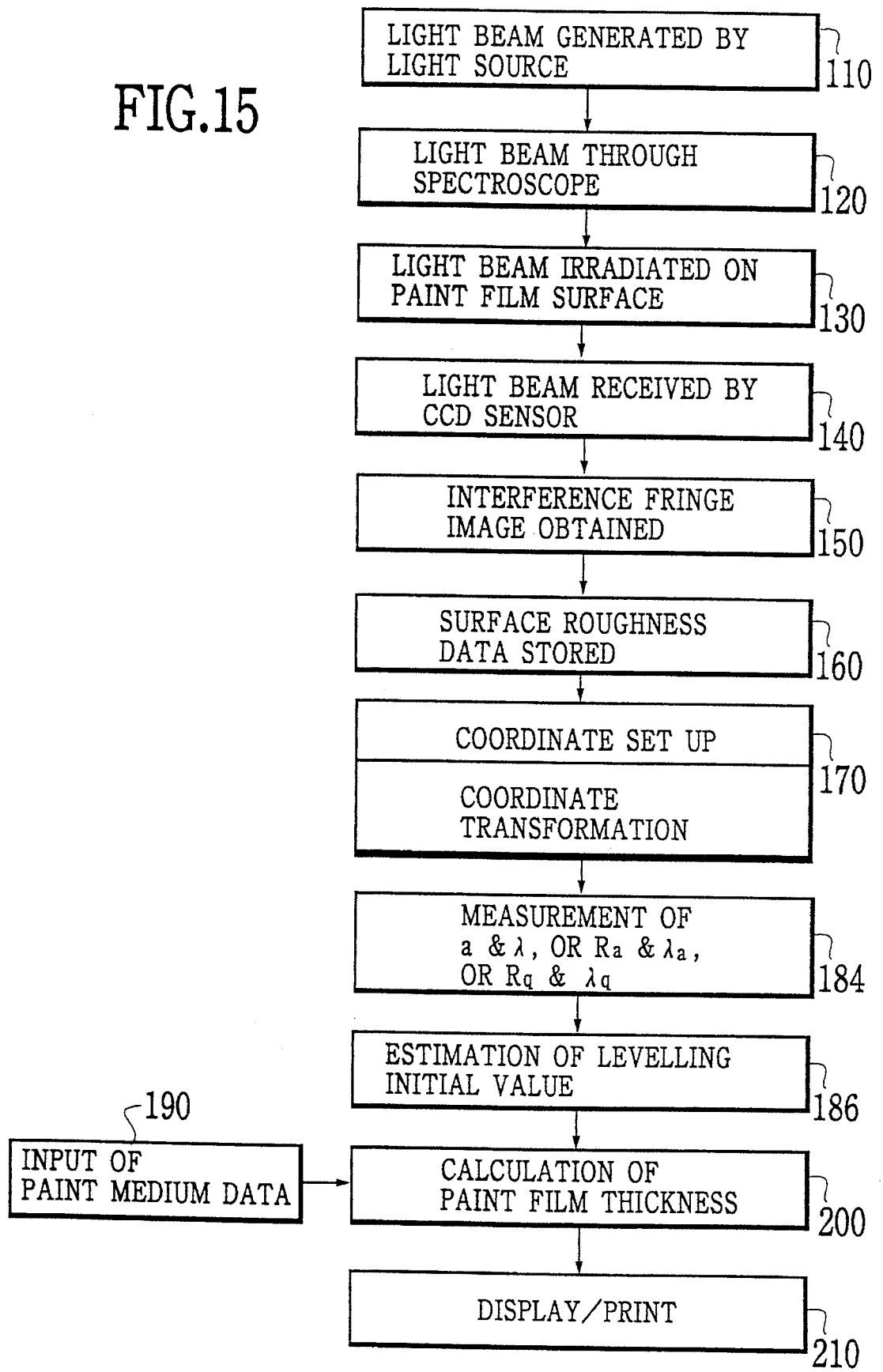
FIG. 15 is a flow chart for the paint film thickness measurement operation carried out by the apparatus FIG. 13.

Thus, the paint film thickness measurement operation of the apparatus of FIG. 13 is carried out according to the flow chart of FIG. 15, which differs from the flow charts of FIG. 8 and FIG. 11 for the apparatuses of FIG. 6 and FIG. 10 in that the step 180 in FIG. 8 or the step 182 in FIG. 11 which are to be repeated at two separate times $t_1$ and $t_2$ is replaced by the step 184 of a single measurement at a time $t_1$ of the peak to peak amplitude and the wavelength or the surface roughness and the surface roughness wavelength, and the step 186 of a levelling initial value estimation by the levelling initial value estimation unit 18

Then, at the step 200, the paint film thickness "h" is calculated by the paint film thickness calculation unit 7b according to the above equations (25) and (26) in a case of using the peak to peak amplitude "a", the above equations (27) and (28) in a case of using the average roughness $R_a$, or the above equations (29) and (30) in a case of using the root mean square roughness $R_q$.

In this manner, this third embodiment is particularly suitable for the implementation in a manufacturing line as depicted in FIG. 13, since it is only necessary to stop the painted sample 1 on the manufacturing line once, directly below the surface roughness sensor head 4 to make a single measurement, such that the interruption in the flow of the manufacturing line can be minimized.

As described according to this third embodiment, it also becomes possible to provide an apparatus capable of measuring a wet paint film thickness easily and accurately in a non-contacting manner.

It is to be noted here that, for the sake of such an implementation in a manufacturing line, instead of estimating the initial value as described above, the initial value may be measured in advance and stored for the subsequent use, if desired.

Next, a fourth embodiment of an apparatus for measuring a paint film thickness according to the present invention will be described in detail.

In this fourth embodiment, the paint film thickness measurement can be realized in accordance with the dynamic levelling property of the wet paint film surface by using the power spectrum P of the surface image data as follows.

Figure 16:
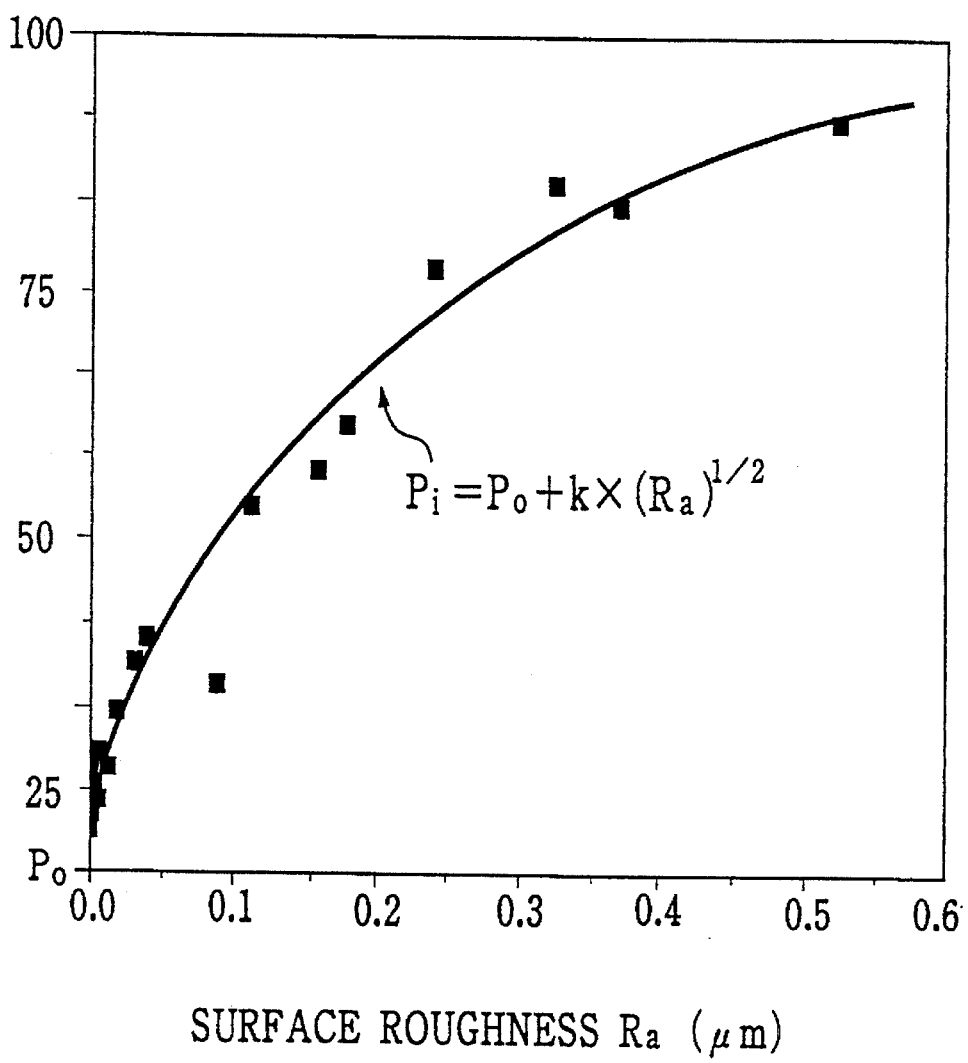
FIG. 16 is a graph showing a relationship between the surface roughness used in the apparatuses of FIGS. 10 and 13 and a power spectrum integrated value used in the fourth embodiment of an apparatus for measuring a paint film thickness according to the present invention.

Namely, the surface roughness $R_a$ and the power spectrum integrated value Pi has a relationship shown in FIG. 16, which can be expressed by the following equations (31) and (32).

$$P_i = P_0 + k \times R_a^{1/2} \tag{31}$$

$$R_a = \{(P_i - P_0)/k\}^2 \tag{32}$$

where $P_0$ is an offset value of the power spectrum when $R_a = 0$, and k is a constant coefficient.

On the other hand, the surface roughness $R_a$ can be expressed in terms of its initial value $R_{a0}$ by the following equation (33).

$$R_a = R_{a0} \cdot \exp(-t/\tau) \tag{33}$$

Therefore, by substituting the equation (32) into the equation (33), the following equation (34) can be obtained.

$$\{(P_i - P_0)/k\}^2 = \{(P_{i0} - P_{00})/k\}^2 \cdot \exp(-t/\tau) \tag{34}$$

where $P_{i0}$ and $P_{00}$ are initial values of $P_i$ and $P_0$, respectively.

Consequently, the power spectrum P can be expressed by the following equation (35).

$$P = P_0 \cdot \exp(-t/2\tau) \tag{35}$$

where $P = P_i - P_0$, and $\tau = 3\eta\lambda^4/16\pi^4\gamma h^3$.

Then, similarly to the case of the surface roughness $R_a$, the paint film thickness "h" can be expressed in terms of the measured power spectra $P_1$ and $P_2$ at times $t_1$ and $t_2$ by the following equation (36).

$$h = \left\{ (\ln P_1 - \ln P_2) / \left( \frac{-t_1}{2\tau'_1} + \frac{t_2}{2\tau'_2} \right) \right\}^{1/3} \tag{36}$$

where $\tau'_i = 3\eta_i\lambda^4/16\pi^4\lambda$, $i=1, 2$.

Figure 17:
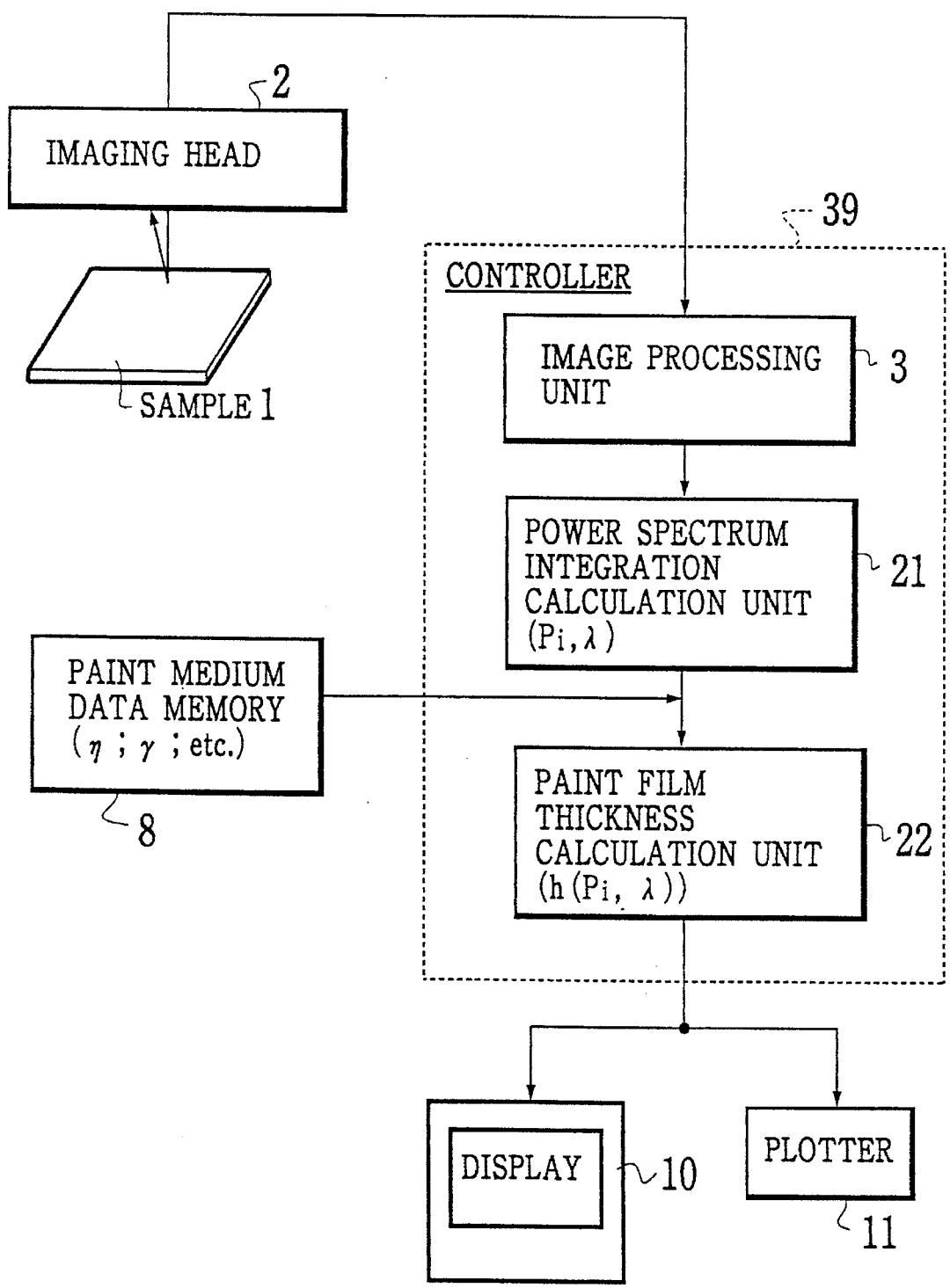
FIG. 17 is a schematic block diagram of the fourth embodiment of an apparatus for measuring a paint film thickness according to the present invention.

Now, in this fourth embodiment, the apparatus has a configuration as shown in FIG. 17, which differs from the first embodiment of FIG. 6 described above in that the surface roughness sensor head 4 in FIG. 6 is replaced by an imaging head 2 for obtaining the surface image data of the wet paint film surface of the painted sample 1, and the controller 9 in FIG. 6 is replaced by a controller 39 for calculating the paint film thickness from the power spectrum of the surface image data obtained by the imaging head 2 as described above.

Figure 18:
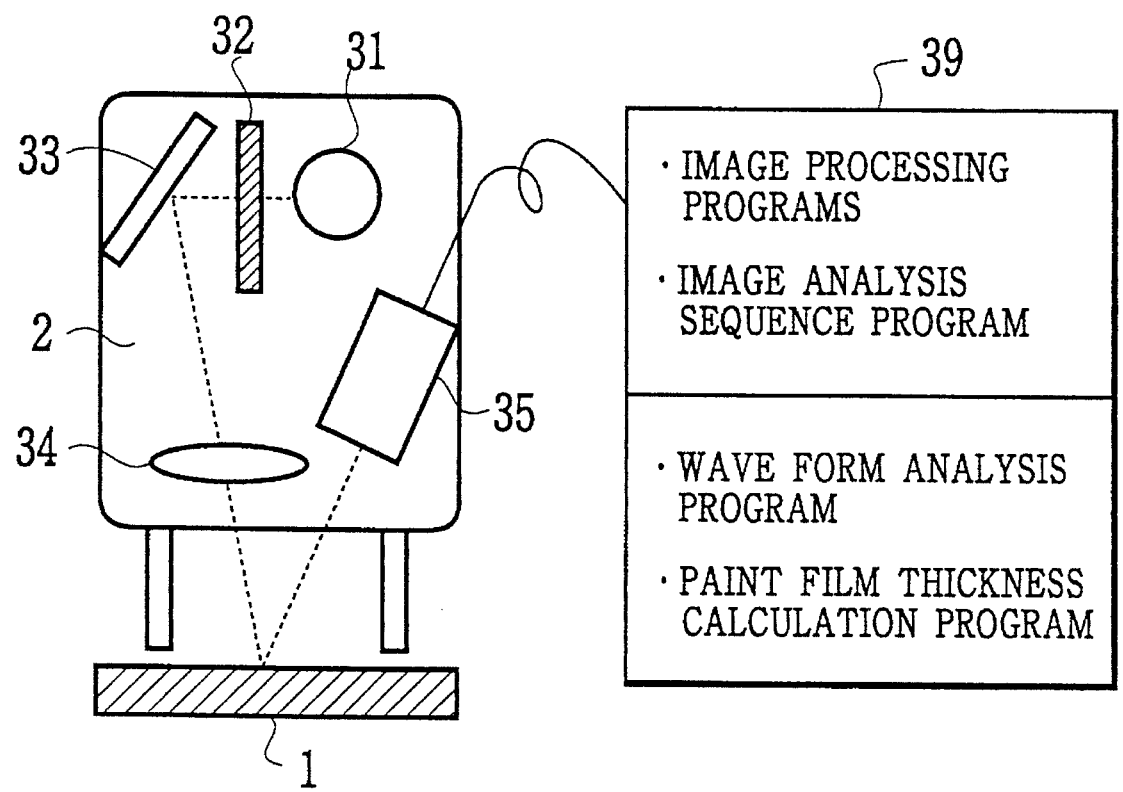
FIG. 18 is a block diagram of an exemplary configuration for an imaging head used in the apparatus of FIG. 17.

More specifically, the imaging head 2 has a configuration as shown in FIG. 18, in which the light beam generated at a light source 31 is guided through a brightness pattern plate 32, reflected by a mirror plate 33, and irradiated onto the paint film surface of the sample 1 through a lens 34, while the light beam reflected by the paint film surface of the sample 1 is received by a CCD camera 35 such that the surface image data obtained at the CCD sensor 12 are supplied to the controller 39 containing various image processing programs, image analysis sequence program, waveform analysis program, and paint film thickness calculation program.

The controller 39 includes: an image processing unit 3 for applying various image processings including the frequency analysis (Fast Fourier Transform) to obtain the power spectrum data for each spatial frequency onto the surface image data supplied from the imaging head 2; a power spectrum integration calculation unit 21 for carrying out the waveform analysis of the power spectrum data to separate the long wave and calculating the long wave power spectrum integrated value $P_i$ and the long wave wavelength $\lambda$ from the image processed surface image data; and a paint film thickness calculation unit 22 for calculating the paint film thickness "h" according to the power spectrum integrated value $P_i$ and the wavelength $\lambda$ supplied from the power spectrum integration calculation unit 21 and the paint medium data supplied from the paint medium data memory 8, by using the equation (36) described above.

Figures 19, 20:
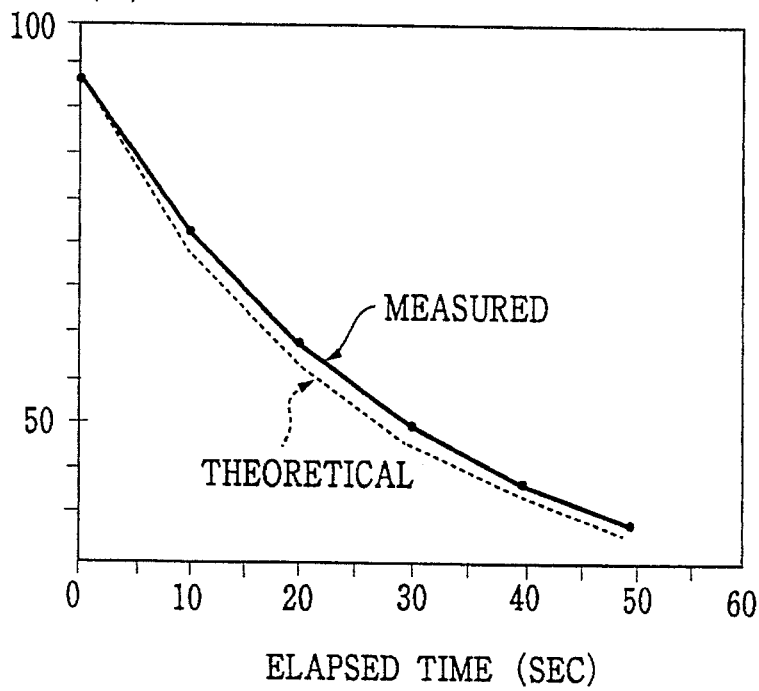
FIG. 19 is a graph showing a time change of a power spectrum integrated value obtained by the apparatus of FIG. 17, along with the theoretical values for the power spectrum integrated value.
FIG. 20 is a table summarizing the paint film thicknesses obtained by the apparatus of FIG. 17 for two samples with different actual paint film thicknesses.

The time change of the power spectrum integrated value $P_i$ actually obtained by this apparatus of FIG. 17 is plotted as a solid line in FIG. 19 along with the theoretical values indicated by a dashed line, for an exemplary case of using the wavelength equal to 4.3 mm, the actual paint film thickness of 60 μm, and fixed painting conditions. As shown in FIG. 19, the values of the power spectrum integrated value $P_i$ obtained by this apparatus of FIG. 17 are very close to the theoretical values.

Also, the table shown in FIG. 20 summarizes the results of the paint film thickness calculated by this apparatus of FIG. 17 for two samples with the actual paint film thickness of 60 μm and 54 μm, for which the average values of 60.5 μm and 55.0 μm are obtained, respectively, which shows that the extremely accurate paint film thickness can be obtained in this fourth embodiment.

As described, according to this fourth embodiment, it also becomes possible to provide an apparatus capable of measuring a wet paint film thickness easily and accurately in a non-contacting manner.

It is to be noted that in this fourth embodiment, because of the use of the imaging head 2 which is relatively simpler compared with the surface roughness sensor head 4, the cost required for the apparatus as a whole can be reduced.

Moreover, the imaging head 2 is lighter compared with the surface roughness sensor head 4, so that it is more suitable for the implementation to mount the imaging head 2 on a robot arm.

Furthermore, the distance between the imaging head 2 and the paint film surface can be set as large as approximately 400 mm, so that the potential for the imaging head 2 to make a contact with the paint film surface can be eliminated completely.

Furthermore, the use of the surface image data taken by the imaging head 2 is less sensitive to the mechanical vibrations that might be present in the painting process cite compared with the surface roughness sensor head 4, so that it can be operated more stably in practice.

Next, a fifth embodiment of an apparatus for measuring a paint film thickness according to the present invention will be described in detail.

In this fifth embodiment, the paint film thickness measurement can be realized in accordance with the dynamic levelling property of the wet paint film surface in which the density vector is utilized in place of the power spectrum integration value used in the fourth embodiment of FIG. 17 described above, so as to make the paint film thickness calculation at a high speed, as follows.

Figure 21A:
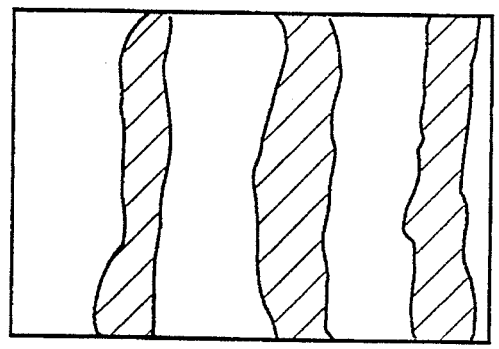
FIGS. 21A, 21B, 21C, and 21D are illustration of the striped image, the boundary lines extracted from the striped image, the smoothed boundary lines, and the normal directions on the smoothed boundary lines, respectively, during the process of obtaining the density vector used in the fifth embodiment of an apparatus for measuring a paint film thickness according to the present invention.
Figure 21B:
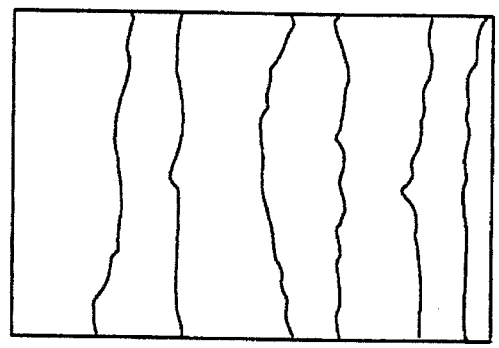
Figure 21C:
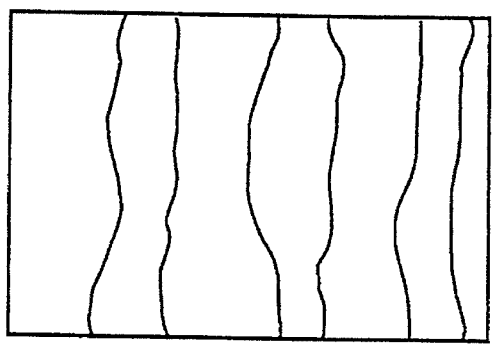
Figure 21D:
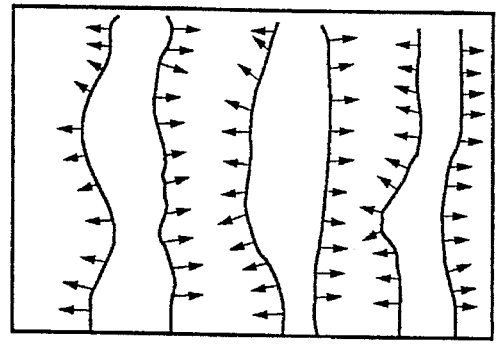

Namely, the density vector $N_i$ is defined as a vector indicating a size of the standard deviation of the normal lines at the picture elements along each boundary line in a striped image. For example, for the binarized striped image as shown in FIG. 21A, the boundary lines can be extracted as shown in FIG. 21B, and the extracted boundary lines can be smoothed as shown in FIG. 21C. Then, the normal lines at each picture element on each smoothed boundary line can be obtained as shown in FIG. 21D. Finally, the density vector $N_i$ can be obtained as the standard deviation by statistically processing the directions of these normal lines.

Figure 22:
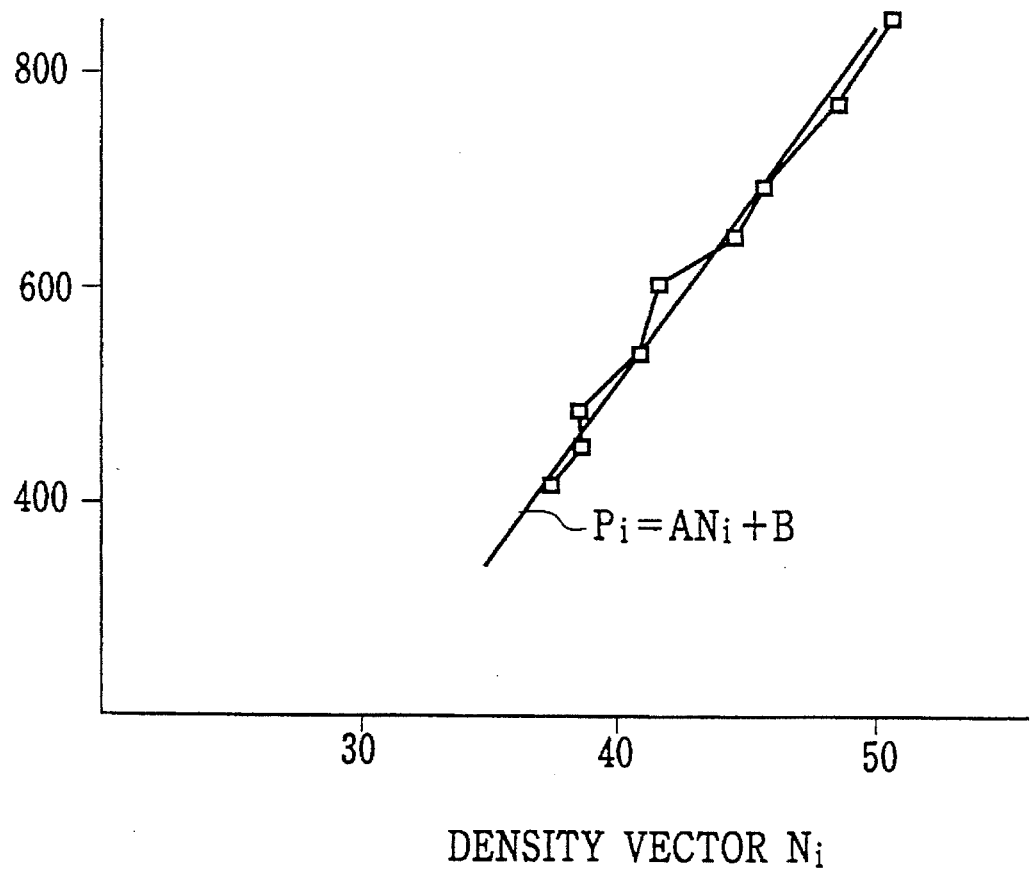
FIG. 22 is a graph showing a relationship between the power spectrum integrated value used in the fourth embodiment of FIG. 17 and the density vector used in the fifth embodiment of an apparatus for measuring a paint film thickness according to the present invention.

The density vector $N_i$ so obtained can express the smoothness of the paint film surface represented by the striped image. This is because the density vector $N_i$ has a correlative relationship with respect to the power spectrum integrated value $P_i$ as shown in FIG. 22. As can be seen in FIG. 22, the power spectrum integrated value $P_i$ and the density vector $N_i$ are proportional to each other, so that their relationship can be expressed by the following equation (37).

$$P_i = A \cdot N_i + B \tag{37}$$

where A and B are constants.

Now, by substituting this equation (37) into the equation (35) for the power spectrum integrated value $P_i$ described above, the following equation (38) can be obtained for the density vector $N_i$.

$$N = N_0 \cdot \exp(-t/2\tau) \tag{38}$$

where $N = A \cdot N_i + B - P_0$, and $N_0 = A \cdot N_i + B$.

Similarly, by substituting the above equation (37) into the equation (36) described above, the following equation (39) can be obtained for the paint film thickness "h" in terms of the density vector $N_i$.

$$h = \{[\ln(N_1 B/A) - \ln(N_2 + B/A)] / [(-t_1/2\tau'_1 + t_2/2\tau'_2)]\}^{1/3} \tag{39}$$

where $\tau'_i = 3\eta_i\lambda^4/16\pi^4\gamma$, $i=1, 2$.

Figure 23:
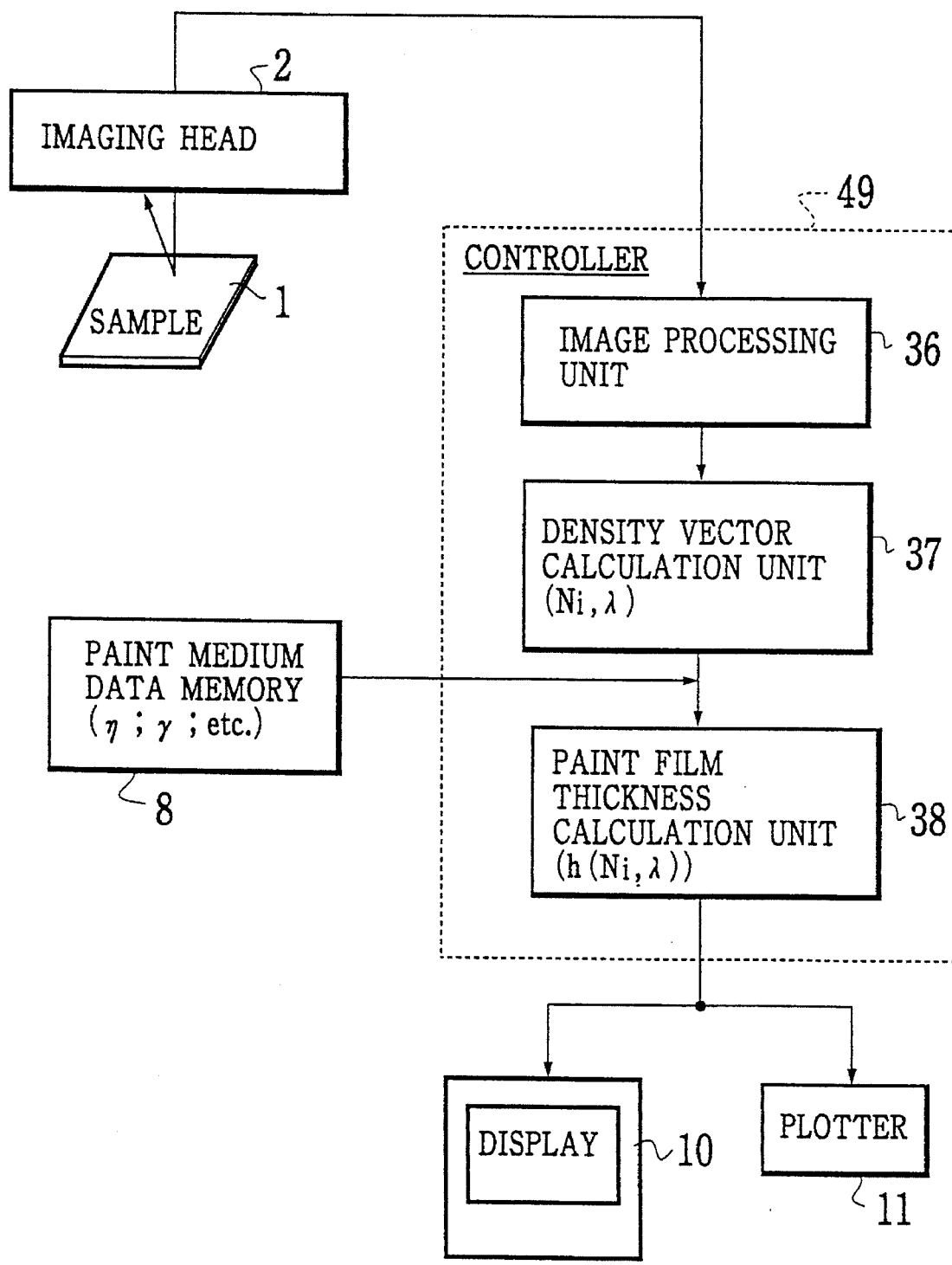
FIG. 23 is a schematic block diagram of the fifth embodiment of an apparatus for measuring a paint film thickness according to the present invention.

Now, in this fifth embodiment, the apparatus has a configuration as shown in FIG. 23, which differs from the fourth embodiment of FIG. 17 described above in that the controller 39 in FIG. 17 is replaced by a controller 49 for calculating the paint film thickness from the density vector of the surface image data in a form of the striped image obtained by the imaging head 2, in a manner described above.

The controller 49 includes: an image processing unit 36 for applying various image processings including the frequency analysis (Fast Fourier Transform) to obtain the power spectrum data for each spatial frequency and the binarization of the surface image data, onto the surface image data supplied from the imaging head 2; a density vector calculation unit 37 for calculating the density vector $N_i$ from the binarized surface image data and the long wavelength $\lambda$ from the power spectrum; and a paint film thickness calculation unit 38 for calculating the paint film thickness "h" according to the density vector $N_i$ and the long wavelength $\lambda$ supplied from the density vector calculation unit 37 and the paint medium data supplied from the paint medium data memory 8, by using the equation (39) described above.

The remaining features of this configuration of FIG. 23 are substantially the same as that of FIG. 17.

Figure 24:
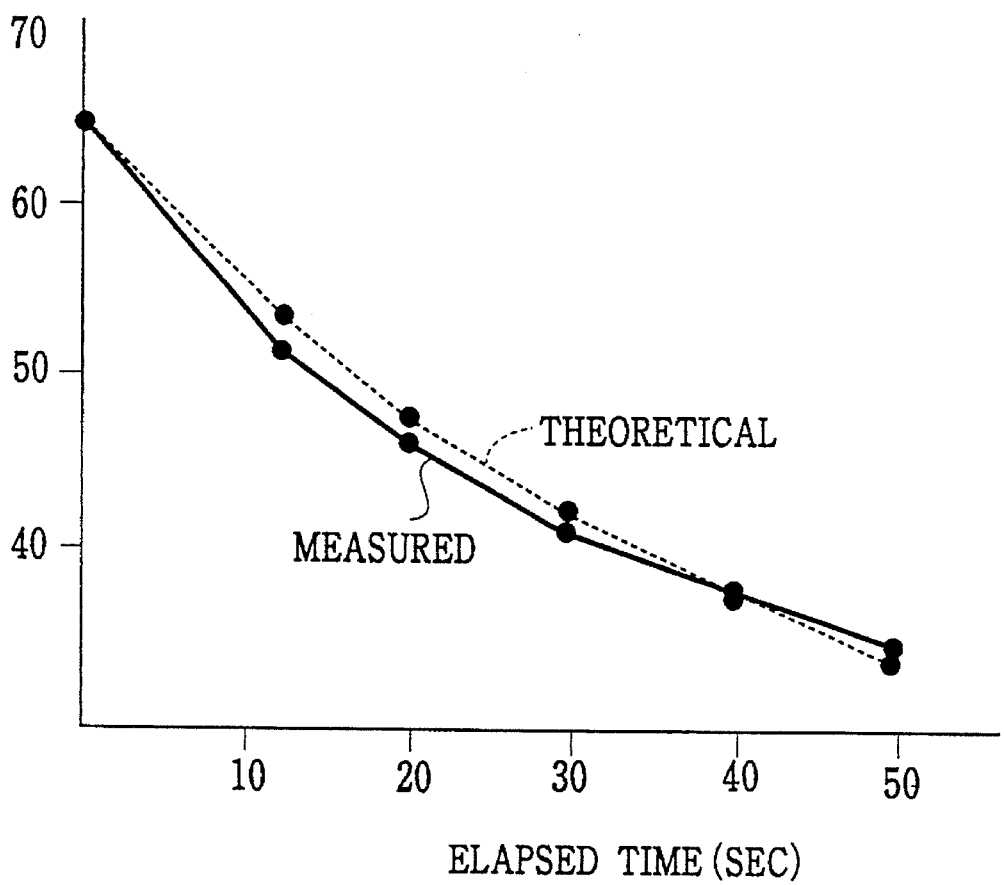
FIG. 24 is a graph showing a time change of a density vector obtained by the apparatus of FIG. 23, along with the theoretical values for the density vector.
Figure 25:
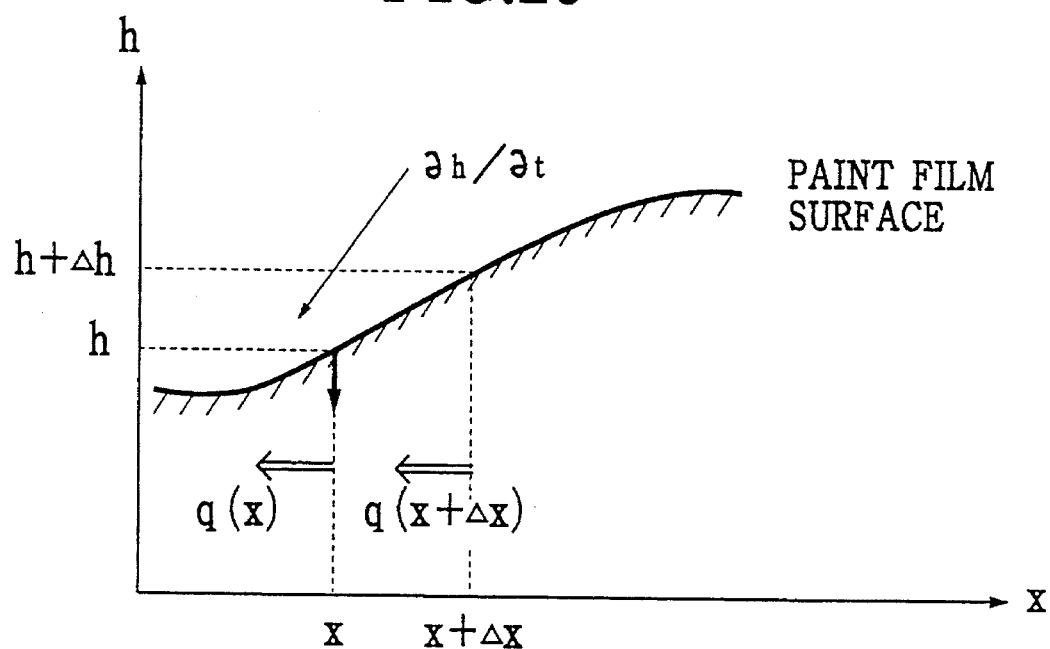
FIGS. 25 and 26 are diagrammatic representations of different portions of the paint film surface used in the sixth embodiment of an apparatus for measuring a paint film thickness according to the present invention.

The time change of the density vector $N_i$ actually obtained by this apparatus of FIG. 23 is plotted as a solid line in FIG. 24 along with the theoretical values indicated by a dashed line, for an exemplary case of using the actual paint film thickness of 53 μm. As shown in FIG. 24, the values of the density vector $N_i$ obtained by this apparatus of FIG. 23 are as close to the theoretical values as few μm order.

As described, according to this fifth embodiment, it also becomes possible to provide an apparatus capable of measuring a wet paint film thickness easily and accurately in a non-contacting manner.

It is to be noted that in this fifth embodiment, as the calculation of the density vector $N_i$ requires a shorter period of time than that of the power spectrum integrated value $P_i$ used in the fourth embodiment, the calculation of the paint film thickness "h" can be made in a shorter period of time.

Next, a sixth embodiment of an apparatus for measuring a paint film thickness according to the present invention will be described in detail.

In this sixth embodiment, the paint film thickness measurement can be realized in accordance with the dynamic levelling property of the wet paint film surface, with the effect of the gravity depending on the angle of inclination of the paint film surface taken into account, as follows.

Namely, the paint film thickness calculation is carried out in a manner which accounts for the fact that the levelling speed becomes slower on a vertical paint surface such as a door portion of an automobile as the levelling force becomes weaker there because the gravity is exerted perpendicularly to the levelling force, and that the levelling speed becomes slower on a largely inclined paint surface such as a roof portion of an automobile as the gravity is reduced by a factor of (cos θ) where θ is an angle of inclination of the paint surface.

To this end, the levelling property of the paint film surface for the horizontal plane, vertical plane, and inclined plane will now be described in detail separately.

<Levelling property on the horizontal plane>

Immediately after the paint medium is applied onto the paint surface on the horizontal plane, the vortex due to the levelling is caused on the paint film surface by the surface tension and the gravity. More specifically, as shown in FIG. 2S, when the height of the paint film surface is equal to "h" and the liquefied quantity is q(x) at a position "x", the time change $\partial h/\partial t$ of the paint film surface height "h" can be expressed by the following equation (40).

$$\frac{\partial h}{\partial t} = [q(x) - q(x + \Delta x)]/dx \quad (40)$$
$$= \left[ q(x) - \left( q(x) + \frac{\partial q(x)}{\partial x} \cdot dx \right) \right]/dx$$
$$= -\frac{\partial q(x)}{\partial x}$$

On the other hand, the relationship between the pressure p(x) and the force F(x) at the position "x" can be expressed in terms of the surface tension γ and the gravitational force ρg, by the following equation (41).

$$p(x) = \gamma \frac{\partial^2 h}{\partial x^2} + \rho g \Delta h \quad (41)$$

Here, however, $$\Delta h = h(x + \Delta x) - h(x)$$
$$= h(x) + \frac{\partial h}{\partial x} \cdot dx - h(x)$$
$$= \frac{\partial h}{\partial x} \cdot dx$$

so that the following equations (42) and (43) can be obtained from the above equation (41).

$$p'(x) = \gamma \frac{\partial^3 h}{\partial x^3} + \rho g \left( \frac{\partial^2 h}{\partial x^2} \cdot dx + \frac{\partial h}{\partial x} \right) \quad (42)$$

$$F(x) = \eta \frac{dv}{dh} = \frac{p(x) - p(x + \Delta x)}{\Delta x} h \quad (43)$$
$$= p'(x)h$$

Then, from these equations (42) and (43), the flow speed $V_h$ can be expressed by the following equation (44).

$$v_h = \int dv = \int_0^h \frac{h}{\eta} \left\{ \gamma \frac{\partial^3 h}{\partial x^3} + \rho g \left( \frac{\partial^2 h}{\partial x^2} dx + \frac{\partial h}{\partial x} \right) \right\} dh \quad (44)$$
$$= \frac{h^2}{2\eta} \left\{ \gamma \frac{\partial^3 h}{\partial x^3} + \rho g \left( \frac{\partial^2 h}{\partial x^2} dx + 2 \frac{\partial h}{\partial x} \right) \right\}$$

Similarly, the flow quantity $q_h$ can be expressed by the following equation (45).

$$q_h = \int_0^h v_h \, dh = \int_0^h \frac{h^2}{2\eta} \left\{ \gamma \frac{\partial^3 h}{\partial x^3} + \rho g \left( \frac{\partial^2 h}{\partial x^2} dx + 2 \frac{\partial h}{\partial x} \right) \right\} dh \quad (45)$$
$$= \frac{h^2}{6\eta} \left\{ \gamma \frac{\partial^3 h}{\partial x^3} + \rho g \left( \frac{\partial^2 h}{\partial x^2} dx + 2 \frac{\partial h}{\partial x} \right) \right\}$$

Consequently, the time change of the paint film surface given by the above equation (40) can be re-expressed by the following equation (46).

$$\frac{\partial h}{\partial t} = -\frac{\partial q}{\partial x} = -\frac{\partial}{\partial x}\left\{ \frac{h^3}{3\eta} \left\{ \gamma \frac{\partial^3 h}{\partial x^3} + \rho g \left( \frac{\partial^2 h}{\partial x^2} dx + 2\frac{\partial h}{\partial x} \right) \right\} \right\} \quad (46)$$

$$= -\frac{h_0^3}{6\eta}\left\{ \gamma \frac{\partial^4 h}{\partial x^4} + \rho g \left( \frac{\partial^3 h}{\partial x^3} dx + 3\frac{\partial^2 h}{\partial x^2} \right) \right\}$$

$$= -\frac{h_0^3}{6\eta}\left\{ \gamma \frac{\partial^4 h}{\partial x^4} + 3\rho g \frac{\partial^2 h}{\partial x^2} \right\}$$

Now, let $h=h_0+a\cdot\sin(2\pi/\lambda)x$ in this equation (46), then the following equation (47) can be obtained.

$$\frac{\partial h}{\partial t} = -\frac{\partial q}{\partial x} = -\frac{h_0^3}{6\eta}\left\{ \gamma \frac{(2\pi)^4}{\lambda^4} + 3\rho g \frac{(2\pi)^2}{\lambda^2} \right\} a \sin\frac{2\pi}{\lambda} x \quad (47)$$

$$= -\frac{h_0^3}{6\eta} \frac{(2\pi)^4}{\lambda^4} \left\{ \gamma + 3\rho g \frac{\lambda^2}{(2\pi)^2} \right\} (h-h_0)$$

Figure 26:
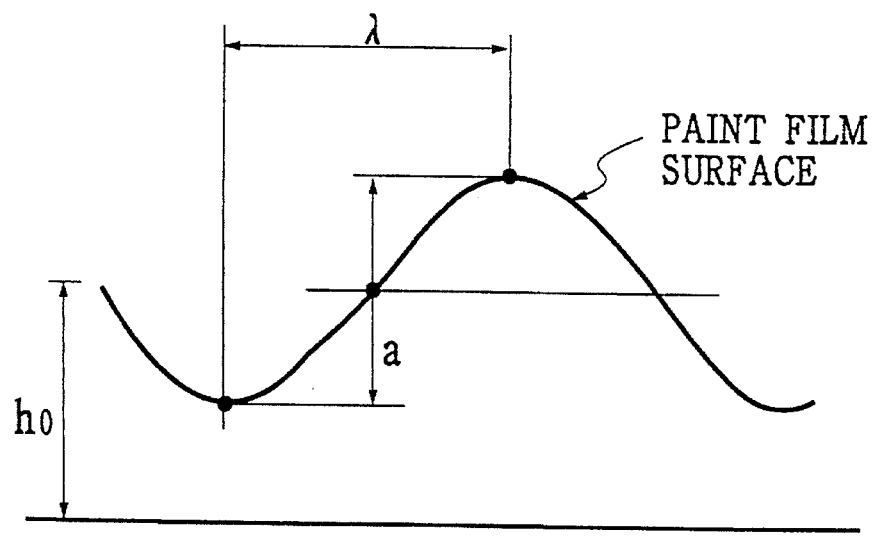

Since, the peak to peak amplitude $a=h-h_0$ as shown in FIG. 26, the following equations (48) and (49) can be obtained for the time change of the peak to peak amplitude and its time constant $\tau$.

$$\frac{\partial a}{\partial t} = -\frac{h_0^3}{3\eta} \frac{(2\pi)^4}{\lambda^4}\left\{ \gamma + 3\rho g \frac{\lambda^2}{(2\pi)^2} \right\} a \quad (48)$$

$$\text{time constant } \tau = \frac{3 \times \eta \times \lambda^4}{(2\pi)^4 \times h_0^3 \times \left( \gamma + 3\rho g \frac{\lambda^2}{(2\pi)^2} \right)} \quad (49)$$

Figure 27:
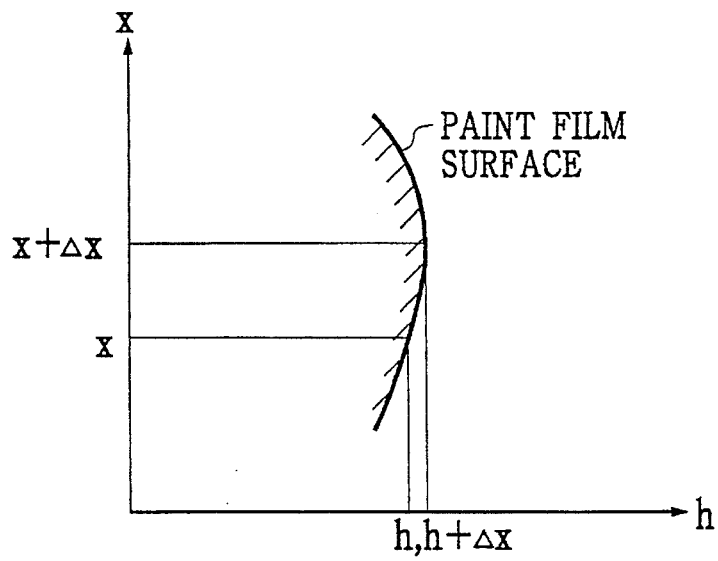
FIGS. 27 and 28 are graphic representations of vertical portions of the paint film surface used in the sixth embodiment of an apparatus for measuring a paint film thickness according to the present invention.
Figure 28:
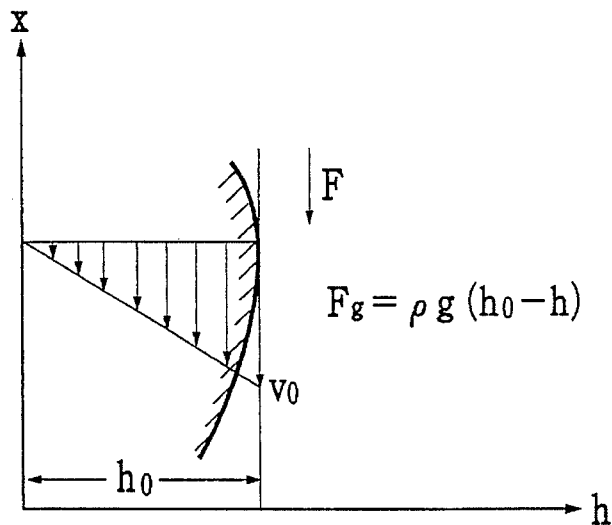

In comparison with the equations (1) and (3), it can be seen that these equations (48) and (49) include the factor $h_0^3(\gamma+3\rho g\lambda^2/(2\pi)^2)$ replacing the factor $h^3\gamma$ so as to account for both the surface tension $\gamma$ and the gravitational force $\rho g$.
<Levelling property on the vertical plane> As shown in FIGS. 27 and 28, the vortex due to the levelling of the paint film surface on the vertical plane is caused by the surface tension $\gamma$, while the gravity "g" functions to cause the sagging of the paint film.

In this case, the relationship between the pressure $p(x)$ and the force $F(x)$ at the position "x" can be expressed in terms of the surface tension $\gamma$ and the gravitational force $\rho g$, by the following equation (41)', (42)' and (43)'.

$$p(x) = \gamma \frac{\partial^2 h}{\partial x^2} + \rho g \Delta x \quad (41)'$$

$$p'(x) = \gamma \frac{\partial^3 h}{\partial x^3} + \rho g \quad (42)'$$

$$F(x) = \eta \frac{dv}{dh} = \gamma \frac{\partial^3 h}{\partial x^3} \cdot h + \rho g(h_0 - h) \quad (43)'$$

Then, from these equations (42)' and (43)', the flow speed $V_h$ can be expressed by the following equation (44)'.

$$v_h = \int \frac{1}{\eta}\left\{ \gamma \frac{\partial^3 h}{\partial x^3} \cdot h + \rho g(h_0 - h) \right\} dh \quad (44)'$$

$$= \frac{1}{\eta}\left\{ \frac{h^2}{2} \cdot \gamma \frac{\partial^3 h}{\partial x^3} + \left( h_0 h - \frac{1}{2} h^2 \right) \rho g \right\}$$

$$= \frac{1}{2\eta}\left\{ h^2 \cdot \gamma \frac{\partial^3 h}{\partial x^3} + (2h_0 h - h^2)\rho g \right\}$$

Similarly, the flow quantity $q_h$ can be expressed by the following equation (45)'.

$$q_h = \int \frac{1}{2\eta}\left\{ h^2 \gamma \frac{\partial^3 h}{\partial x^3} + (2h_0 h - h^2)\rho g \right\} dh \quad (45)'$$

$$= \frac{1}{2\eta}\left\{ \frac{h_0^2}{3} \gamma \frac{\partial^3 h}{\partial x^3} + \left( h_0 h_0^2 - \frac{h_0^3}{3} \right) \rho g \right\}$$

$$= \frac{h_0^3}{6\eta}\left\{ \gamma \frac{\partial^3 h}{\partial x^3} + 4\rho g \right\}$$

Consequently, the following equation (46)' can be obtained for the time change of the paint film surface, in a manner similar to that by which the equation (46) described above is obtained.

$$\frac{\partial h}{\partial t} = -\frac{\partial q}{\partial x} = \frac{-\partial}{\partial x}\left\{ \frac{h_0^3}{6\eta}\left( \gamma \frac{\partial^3 h}{\partial x^3} + 4\rho g \right) \right\} \quad (46)'$$

$$= -\frac{h_0^3}{6\eta} \cdot \gamma \frac{\partial^4 h}{\partial x^4}$$

Then, the time change of the peak to peak amplitude and its time constant $\tau$ can be expressed by the following equations (48)', and (49)', in a manner similar to that by which the equations (48) and (49) described above are obtained.

$$\frac{\partial a}{\partial t} = -\frac{h_0^3}{3\eta} \frac{(2\pi)^4}{\lambda^4} \cdot \gamma \cdot a \quad (48)'$$

$$\text{time constant } \tau = \frac{3 \times \eta \times \lambda^4}{(2\pi)^4 \times h_0^3 \times \gamma} \quad (49)'$$

Figure 29:
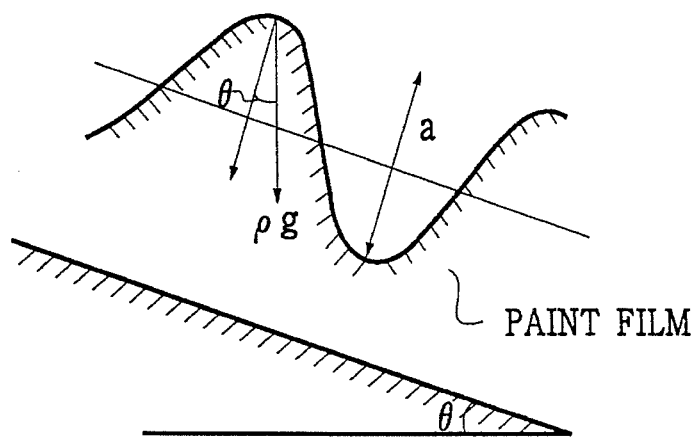
FIG. 29 is a graphic representation of an inclined portion of the paint film surface used in the sixth embodiment of an apparatus for measuring a paint film thickness according to the present invention.

In comparison with the above equations (48) and (49), it can be seen that, in these equations (48)' and (49)' for the levelling on the vertical plane, the factor $h_0^3\gamma$ replaces the factor $h_0^3(\gamma+3\rho g\lambda^2/(2\pi)^2$ in the equations (48) and (49) for the levelling on the horizontal plane.
<Levelling property on the inclined plane>
As shown in FIG. 29, the levelling force due to the gravity "g" on the plane inclined by an inclination angle $\theta$ becomes $\rho g \cdot \cos\theta$, so that the above equations (48) and (49) are to be rewritten as the following equations (48)'' and (49)'' in this case.

$$\frac{\partial a}{\partial t} = -\frac{h_0^3}{3\eta} \frac{(2\pi)^4}{\lambda^4}\left\{ \gamma + 3\rho g \cos\theta \frac{\lambda^2}{(2\pi)^2} \right\} a \quad (48)''$$

$$\text{time constant } \tau = 3 \times \eta \times \lambda^4/(16\pi^4 \times \gamma' \times h^3) \quad (49)''$$

where $$\gamma' = \gamma + 3\rho g \cdot \cos\{\lambda/(2\pi)\}^2$$

Consequently, in this case, for the peak to peak amplitude values $a_1$ and $a_2$ at times $t_1$ and $t_2$ and the wavelength $\lambda$, the following equations (50) to (55) hold.

$$a_1 = a_0 \exp(-t_1/\tau_1) \quad (50)$$

$$\tau_1 = \{3\times\eta(t_1)\times\lambda^4\}/(16\pi^4\times\gamma'\times h^3) \quad (51)$$

$$a_2 = a_0 \cdot \exp(-t_2/\tau_2) \tag{52}$$

$$\tau_2 = \{3 \times \eta(t_2) \times \lambda^4\}/(16\pi^4 \times \gamma \times h^3) \tag{53}$$

$$a_1/a_2 = \exp(-t_1/\tau_1 + t_2/\tau_2) \tag{54}$$

$$\ln a_1/a_2 = (-t_1/\tau_1 + t_2/\tau_2) \tag{55}$$

Thus, the paint film thickness "h" in this case can be expressed by the following equations (56) to (58).

$$h = \{(\ln a_1/a_2)/(-t_1/\tau_1' + t_2/\tau2')\}^{1/3} \tag{56}$$

$$\tau_1' = (3\eta_1 \times \lambda^4)/[16\pi^4(\gamma + 3\rho g \cdot \cos\{\lambda/(2\pi)\}^2)] \tag{57}$$

$$\tau_2' = (3\eta_2 \times \lambda^4)/[16\pi^4(\gamma + 3\rho g \cdot \cos\{\lambda/(2\pi)\}^2)] \tag{58}$$

Figure 30:
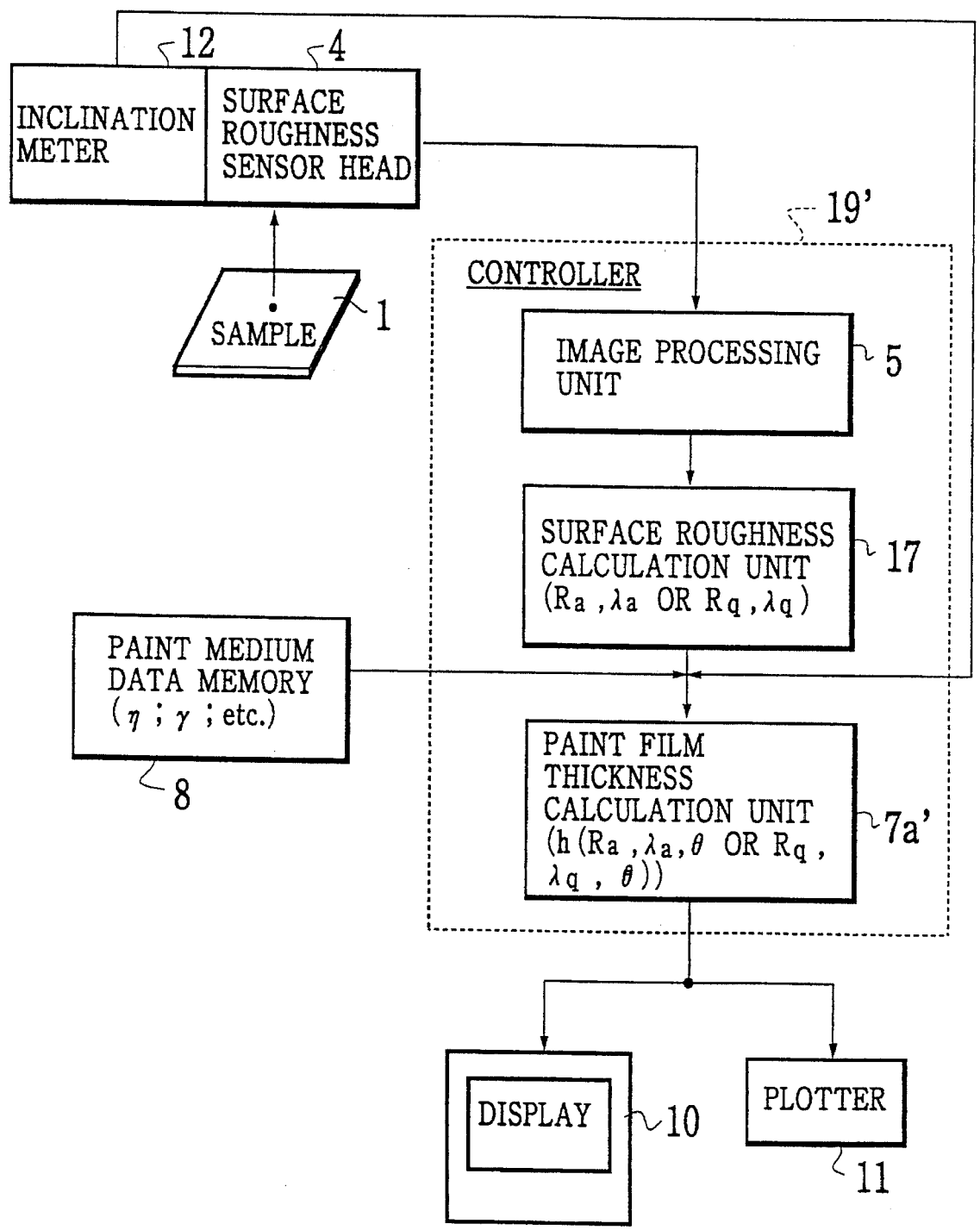
FIG. 30 is a schematic block diagram of the sixth embodiment of an apparatus for measuring a paint film thickness according to the present invention.

Now, in this sixth embodiment, the apparatus has a configuration as shown in FIG. 30, which differs from the second embodiment of FIG. 10 described above in that the surface roughness sensor 4 is accompanied by an inclination meter 12 for measuring the inclination angle θ of the paint film surface on the painted sample 1, which is also supplied to the paint film thickness calculation unit 7a' of the controller 19', in addition to the the surface roughness and the surface roughness wavelength obtained by the surface roughness calculation unit 17 and the paint medium data supplied from the paint medium data memory 8, such that the paint film thickness calculation unit 7a' calculates the paint film thickness "h" according to the levelling property on the inclined plane as described above, by using the above equations (56) to (58).

Here, in terms of the surface roughnesses $R_{a1}$ and $R_{a2}$, the above equation (56) can be re-written as the following equation (56)'.

$$h = \{(\ln R_{a1}/R_{a2})/(-t_1/\tau_1' + t_2/\tau_2')\}^{1/3} \tag{56)'}$$

with $\tau_1'$ and $\tau_2'$ given by the above equations (57) and (58).

The remaining features of this configuration of FIG. 30 are substantially the same as that of FIG. 10.

Figure 31:
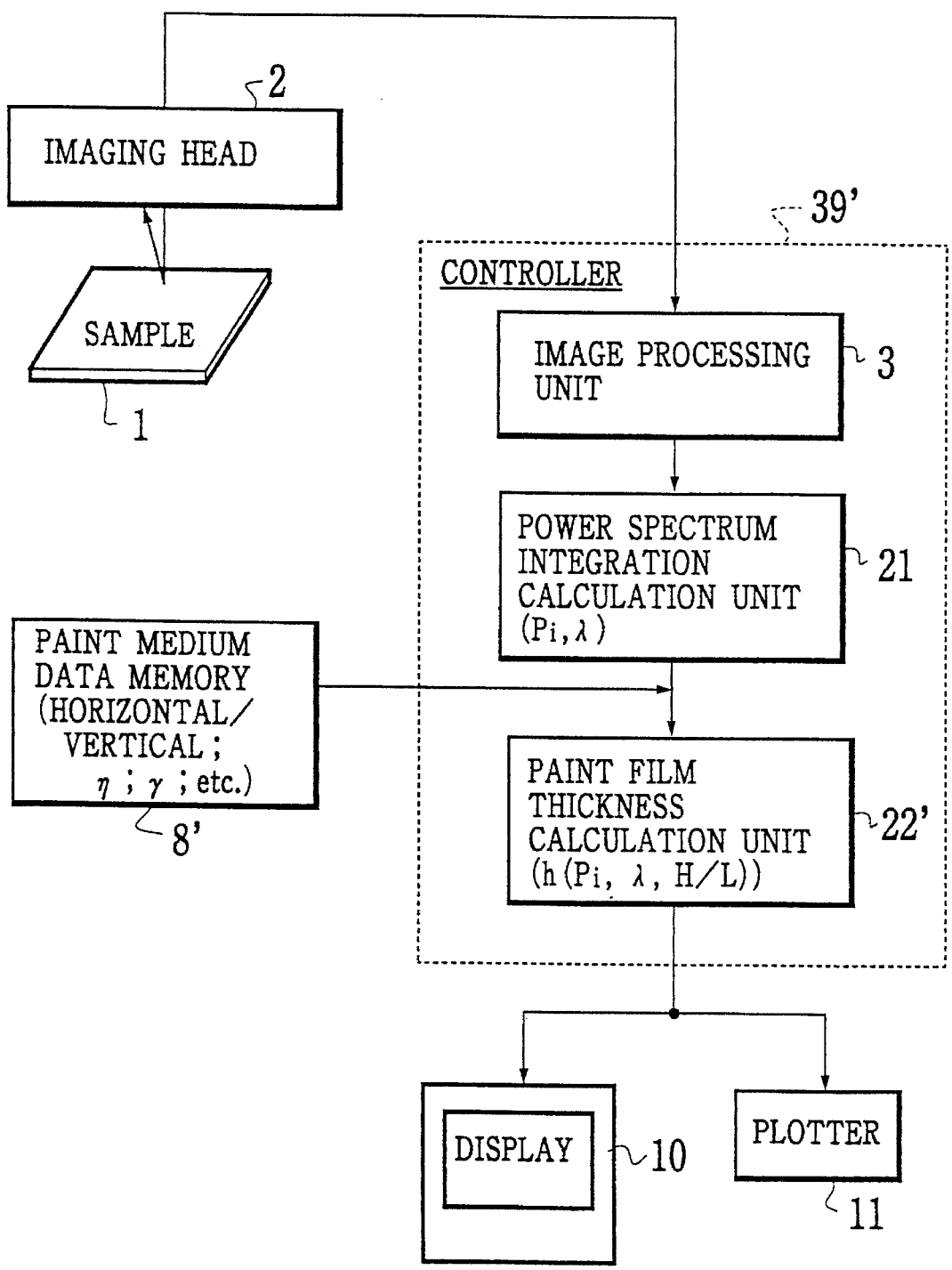
FIG. 31 is a schematic block diagram of the seventh embodiment of an apparatus for measuring a paint film thickness according to the present invention.

Referring now to FIG. 31, a seventh embodiment of an apparatus for measuring a paint film thickness according to the present invention will be described in detail.

This seventh embodiment of FIG. 31 differs from the fourth embodiment of FIG. 17 described above in that the paint medium data memory 8 in the configuration of FIG. 17 is modified to the paint medium data memory 8' which supplies the information concerning whether the paint film surface is on the horizontal plane or on the vertical plane, in addition to the paint medium data, such that the paint film thickness calculation unit 22' of the controller 39' calculates the paint film thickness "h" according to the levelling property on the horizontal plane and the vertical plane as described above, by using the power spectrum of the surface image data, similarly to the fourth embodiment of FIG. 17 described above.

Here, the paint surface thickness "h" can be given by the following equations (59) to (62).

$$h = \{(\ln P_1 - \ln P_2)/(-t_1/2\tau_i' + t_2/2\tau_i')\}^{1/3} \tag{59}$$

where $$\tau_i' = 3\eta_i \lambda^4/16\pi^4 \gamma \tag{60}$$

$$\gamma horizontal = \gamma_H + K \cdot \rho g \cdot \lambda^2/(2\pi)^2 \tag{61}$$

$$\gamma vertical = \gamma' horizontal - K \cdot \rho g \cdot \lambda^2/(2\pi)^2 = \gamma_H \tag{62}$$

The remaining features of this configuration of FIG. 31 are substantially the same as that of FIG. 17.

Figure 32:
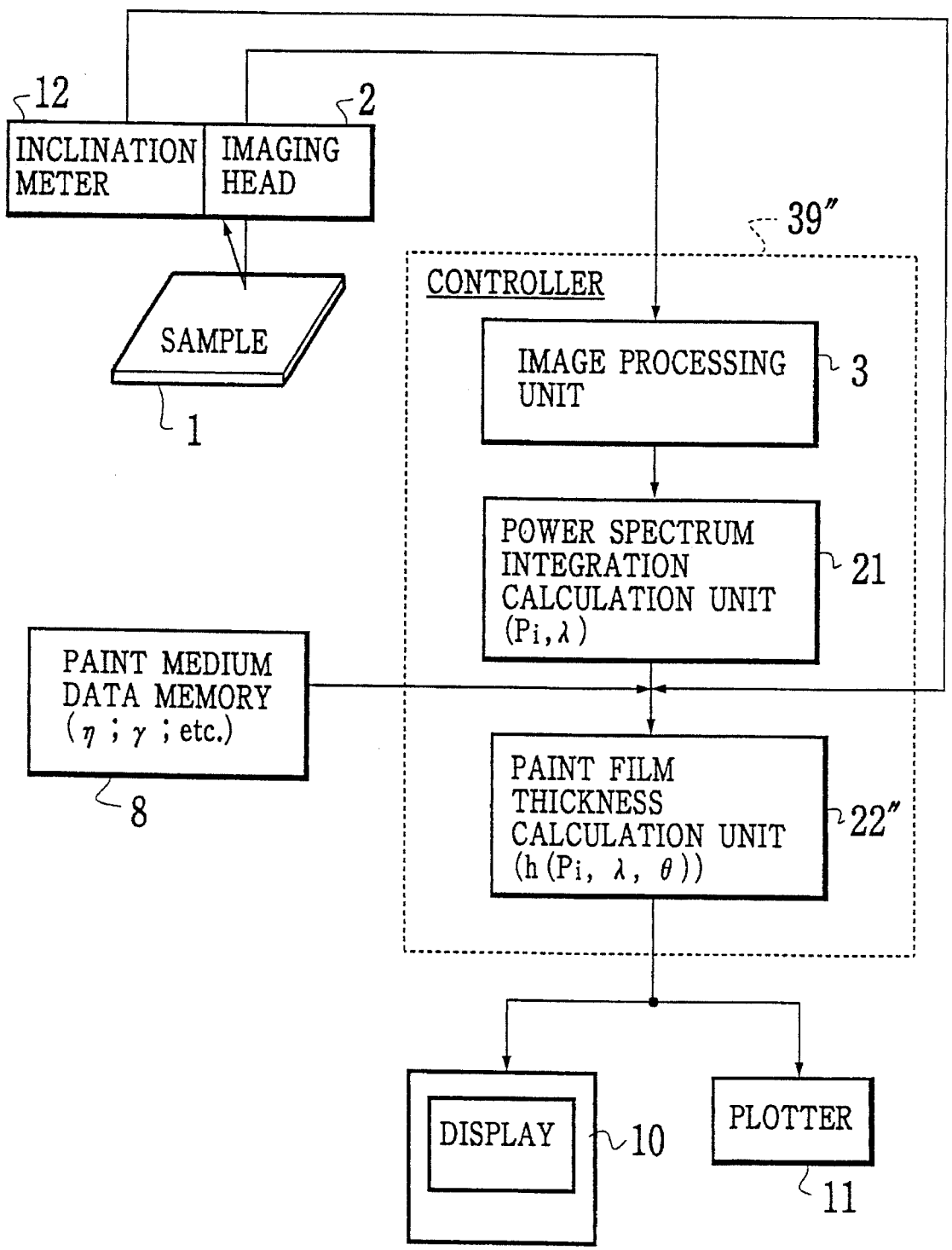
FIG. 32 is a schematic block diagram of the eighth embodiment of an apparatus for measuring a paint film thickness according to the present invention.

Referring now to FIG. 32, an eighth embodiment of an apparatus for measuring a paint film thickness according to the present invention will be described in detail.

This eighth embodiment of FIG. 32 differs from the fourth embodiment of FIG. 17 described above in that the imaging head 2 is accompanied by an inclination meter 12 for measuring the inclination angle θ of the paint film surface on the painted sample 1, which is also supplied to the paint film thickness calculation unit 22" of the controller 39", in addition to the the surface roughness and the power spectrum integrated value $P_i$ and the wavelength λ calculated by the power spectrum integration calculation unit 21 and the paint medium data supplied from the paint medium data memory 8, such that the paint film thickness calculation unit 22" calculates the paint film thickness "h" according to the levelling property on the inclined plane as described above, by using the above equations (56) to (58).

Here, in terms of the power spectra $P_1$ and $P_2$, the above equation (56) can be re-written as the following equation (56)'.

$$h = \{(\ln P_1 - P_2)/(-t_1/2\tau_1' + t_2/2\tau_2')\}^{1/3} \tag{56)''}$$

with $\tau_1'$ and $\tau_2'$ given by the above equations (57) and (58).

The remaining features of this configuration of FIG. 32 are substantially the same as that of FIG. 17.

Next, a ninth embodiment of an apparatus for measuring a paint film thickness according to the present invention will be described in detail.

In this ninth embodiment, the paint film thickness measurement can be realized in accordance with the dynamic levelling property of the wet paint film surface, with the effect of the change of the paint medium temperature and the ambient temperature taken into account, as follows.

Namely, the paint film thickness calculation is carried out in a manner which accounts for the fact that the ambient temperature can be changed by about 5° C. between the day time and the night time, and about 10° C. between the summer time and the winter time, and accordingly the paint viscosity of the paint medium can be changed at different times of the day or the year.

To this end, the temperature characteristic of the paint viscosity of the paint medium and the levelling property of the paint film surface with the temperature correction will now be described in detail.

<Temperature characteristic of the paint viscosity>

Figure 33:
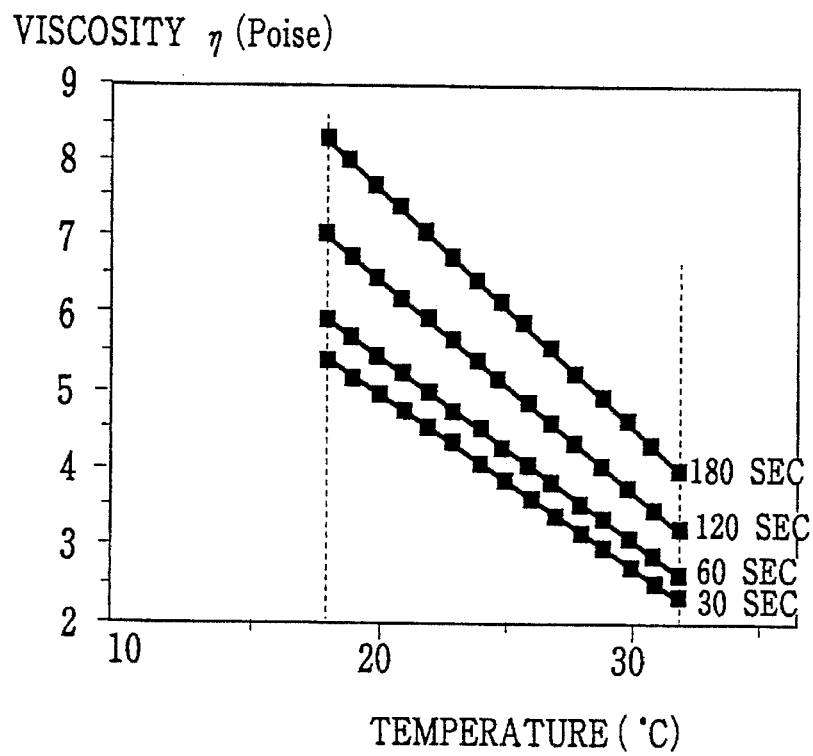
FIG. 33 is a graph of the viscosity of the paint film as a function of the temperature at different times elapsed since the application of the paint medium, in the ninth embodiment of an apparatus for measuring a paint film thickness according to the present invention.

The paint viscosity η of the paint medium and the temperature are known to have the relationship shown in FIG. 33, depending on the time elapsed since the application of the paint medium.

In order to confirm this temperature characteristic of the paint viscosity of the paint medium, the following experiment had been conducted by the present inventors.

Measurement of the Non-Volatile (NV) component in the paint medium

The NV component in the paint medium was measured by the so called Aluminum weight method in which the paint medium of a prescribed amount whose weight was measured in advance is applied onto an Aluminum loll, and the NV components of the paint medium is calculated from the measured weights of the paint medium applied Aluminum foil before and after the drying of the paint medium.

Measurement of the NV component in the paint film

The NV component in the paint film was also measured by the Aluminum weight method. In this case, the sample mounted with the Aluminum foil is processed by the painting process, and the NV components of the paint film is calculated from the measured weights of the Aluminum foil with the paint film formed thereon by the painting process before and after the drying of the paint medium.

Measurement of the paint medium viscosity

The paint medium viscosity was measured by using the shear rate viscometer, and the data for the shear rate in the high rate range to the low rate range were collected.

Measurement of the paint viscosity

The paint viscosity η was measured similarly to the paint medium viscosity described above, for the paint film formed by the fixed painting conditions.

In this manner, the temperature characteristic of the paint medium viscosity was measured by using the shear rate viscometer, and the temperature characteristic of the paint viscosity η was obtained from the measured NV component in the paint film. The results obtained by this experiment are shown in FIG. 34.

Figure 34:
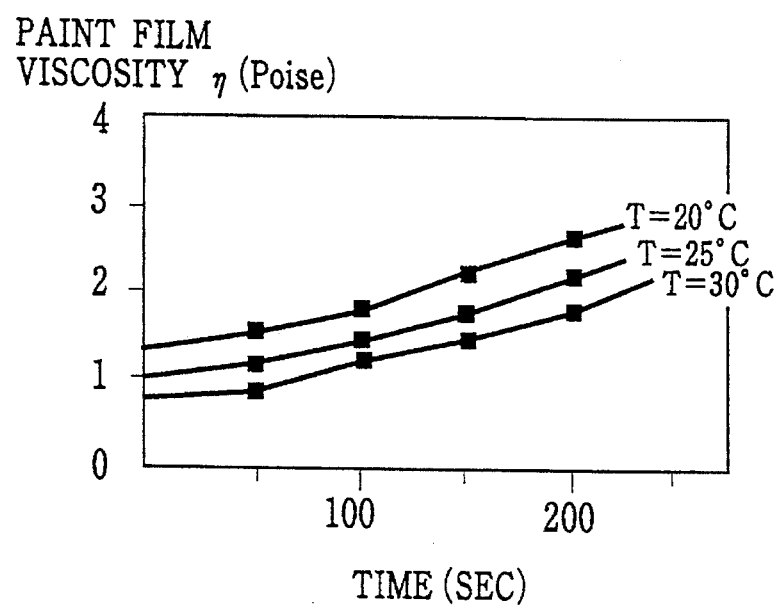
FIG. 34 is a graph showing a time change of the paint film viscosity for different temperatures, in the ninth embodiment

As can be seen in FIG. 34, the paint viscosity η(T, t) as a function of both the temperature T and the time t can be approximately expressed by the following equation (63).

$$\eta = \eta(T, t) \approx (\eta_0 - K_0 T) t + K_2 t^2 \qquad (63)$$

where $t^2$ term will be necessary for the correction at the elapsed time of 2 to 4 min. after the application of the paint medium.

<Levelling property with the temperature correction>

Using this equation (63) in the above described equation (35) for a case of using the power spectrum P, the power spectrum P can be expressed by the following equations (64) and (65).

$$P = P_0 \cdot \exp(-t/2\tau) \qquad (T)$$

where $$\tau = 3 \times \eta(T, t) \times \lambda^4 / (16\pi^4 \times \gamma \times h^3) \qquad (65)$$

with the η(T, t) given by the above equation (63).

Consequently, according to the above described equation (36), the paint film thickness "h" with the temperature correction can be expressed by the following equations (66) and (67).

$$h = \{(\ln P_1 - \ln P_2) / (-t_1/2\tau'_1 + t_2/2\tau'_2)\}^{1/3} \qquad (66)$$

where $$\tau'_i = 3\eta(T, t_i) \lambda^4 / 16\pi^4 \gamma', \quad i = 1, 2. \qquad (67)$$

Figure 35:
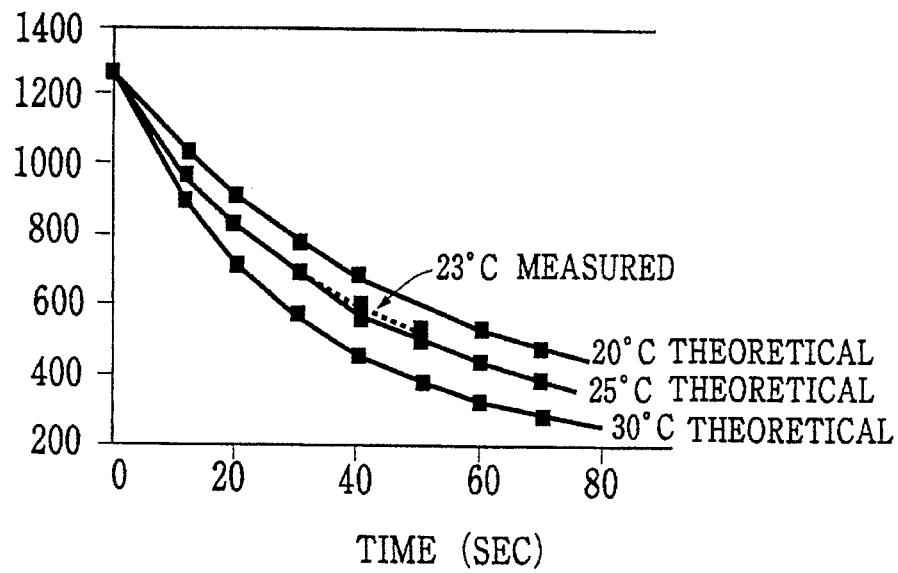
FIG. 35 is a graph showing a time change of the power spectrum integrated value for different temperatures, in the ninth embodiment of an apparatus for measuring a paint film thickness according to the present invention.
Figure 36:
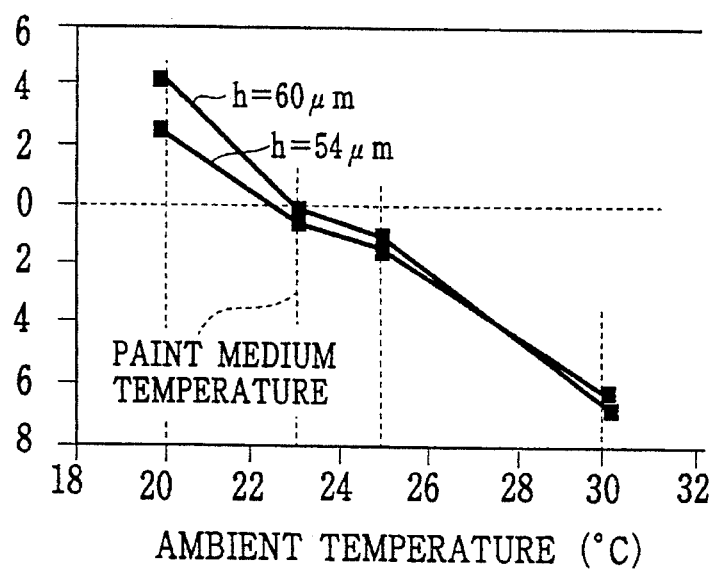
FIG. 36 is a graph of the paint film thickness deviation as a function of an ambient temperature, in the ninth embodiment of an apparatus for measuring a paint film thickness according to the present invention.

The time change of the power spectrum integrated value $P_i$ actually obtained by the above described experiment for the paint medium temperature of 23° C. is plotted in FIG. 35 for an exemplary case of using the wavelength equal to 0.433 mm and the actual paint film thickness of 60 μm, along with the theoretical values for the paint medium temperatures 20° C., 25° C., and 30° C. Also, the paint film thickness "h" calculated by using the above equation (66) for the paint medium temperature of 23° C. and various ambient temperatures are plotted in FIG. 36, for two exemplary cases of the actual paint film thicknesses of 54 μm and 60 μm. The improvement of 2 to 5 μm in the calculated paint film thickness by the incorporation of the temperature correction was confirmed by this experiment.

Figure 37:
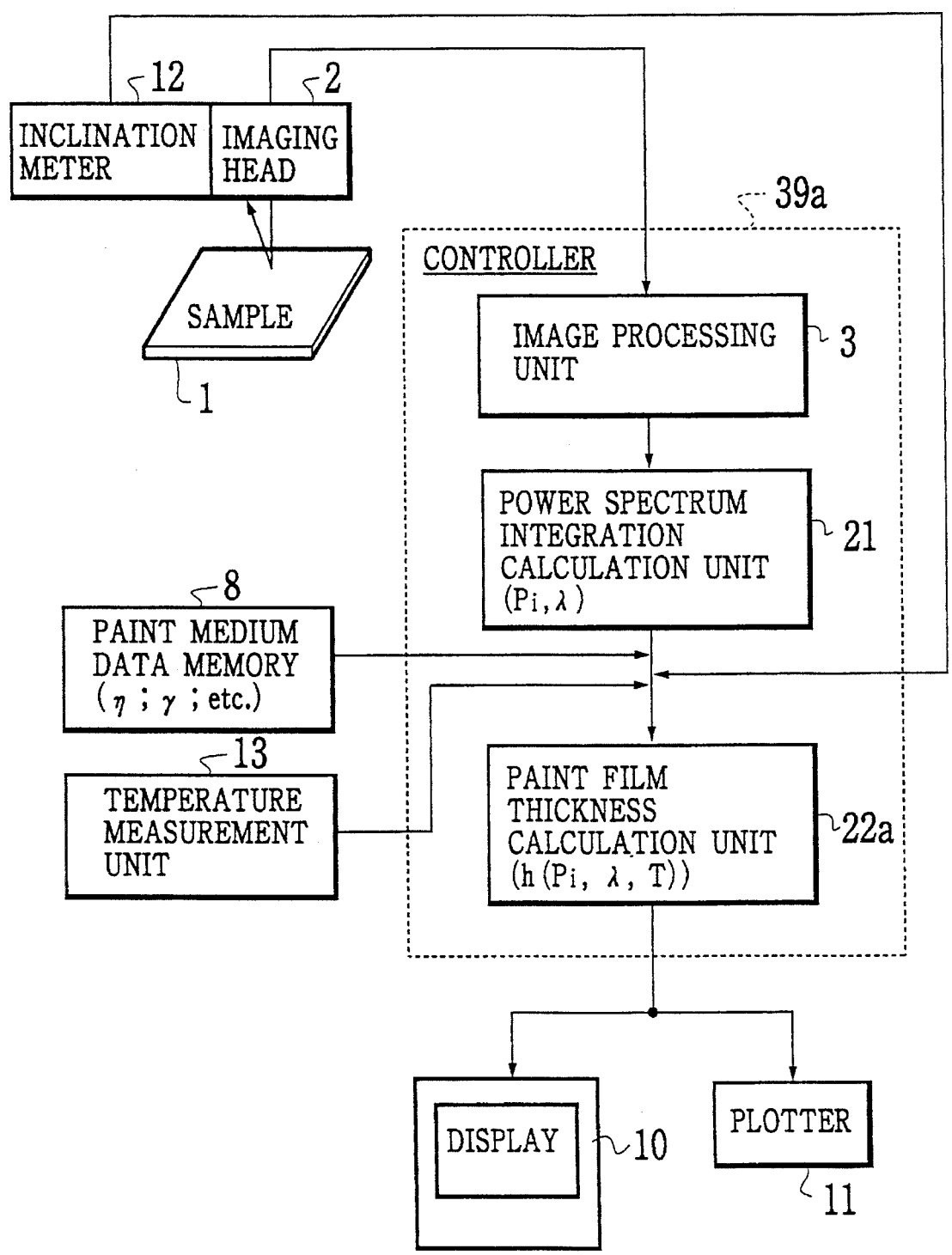
FIG. 37 is a schematic block diagram of the ninth embodiment of an apparatus for measuring a paint film thickness according to the present invention.

Now, in this ninth embodiment, the apparatus has a configuration as shown in FIG. 37, which differs from the eighth embodiment of FIG. 32 described above in that there is also provided a temperature measurement unit 13 for measuring the paint medium temperature and the ambient temperature, which are also supplied to the paint film thickness calculation unit 22a of the controller 39a, in addition to the the power spectrum integrated value and the wavelength obtained by the power spectrum integration calculation unit 21, the paint medium data supplied from the paint medium data memory 8, and the inclination angle obtained by the inclination meter 12, such that the paint film thickness calculation unit 22a calculates the paint film thickness "h" according to the levelling property with the temperature correction as described above, by using the above equation (66).

In this case, according to the above equations (57) to (58) for accounting the inclination angle, the above equation (67) is to be modified as the following equations (68) and (69).

$$\tau_1' = (3\eta_1(T, t) \times \lambda^4) / [16\pi^4(\gamma + 3\rho g \cdot \cos\{\lambda/(2\pi)\}^2)] \qquad (68)$$

$$\tau_2' = (3\eta_2(T, t) \times \lambda^4) / [16\pi^4(\gamma + 3\rho g \cdot \cos\{\lambda/(2\pi)\}^2)] \qquad (69)$$

The remaining features of this configuration of FIG. 37 are substantially the same as that of FIG. 32.

Next, a tenth embodiment of an apparatus for measuring a paint film thickness according to the present invention will be described in detail.

In this tenth embodiment, the dry paint film thickness is estimated according to the wet paint film thickness measurement based on the dynamic levelling property of the wet paint film surface using the power spectrum integration value as in the fourth embodiment of FIG. 17 described above.

Figure 38:
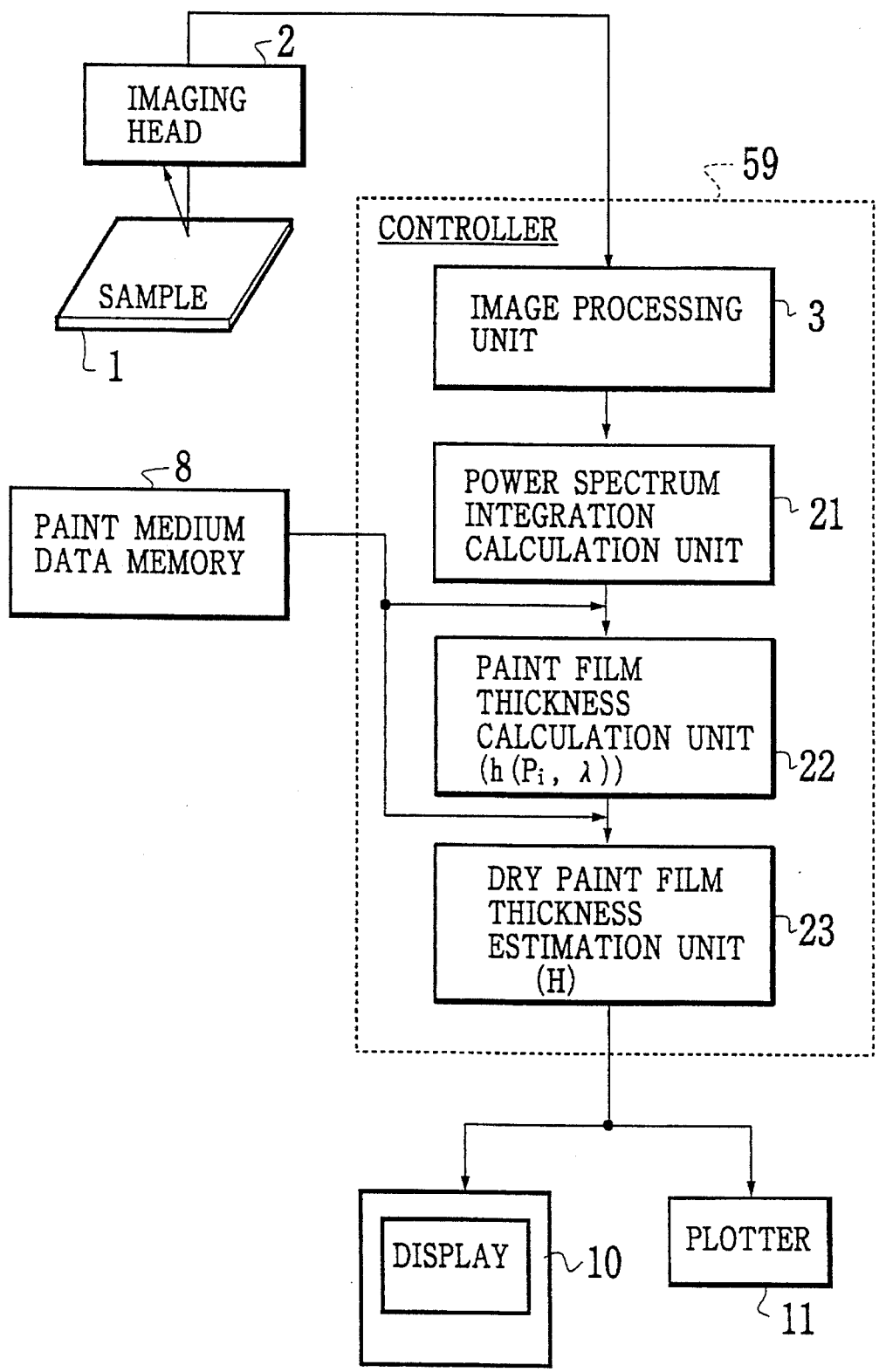
FIG. 38 is a schematic block diagram of the tenth embodiment of an apparatus for measuring a paint film thickness according to the present invention.

Namely, in this tenth embodiment; the apparatus has a configuration as shown in FIG. 38, which differs from the fourth embodiment of FIG. 17 described above in that the controller 39 in FIG. 17 is replaced by a controller 59 for calculating the wet paint film thickness from the power spectrum integration value according to the surface image data obtained by the imaging head 2, and then estimating the dry paint film thickness according to the calculated wet paint film thickness.

To this end, in addition to the image processing unit 3, the power spectrum integration calculation unit 21, and the paint film thickness calculation unit 22, the controller 59 further includes a dry paint film thickness estimation unit 23 to which the wet paint film thickness "h" calculated by the paint film thickness calculation unit 22 and the paint medium data stored in the paint medium data memory 8 are supplied. Here, the paint medium data also contains the NV (Non-Volatile) data, which includes the paint medium NV component data and the paint film NV component data indicating rates of the NV components contained in the paint medium and the paint film, respectively. These paint medium NV data and the paint film NV data are obtained by the Aluminum weight method as described above in conjunction with the ninth embodiment.

The dry paint film thickness estimation unit 23 estimates the dry paint film thickness H according to the following equation (70).

$$H = h \times (NV\ data\ value) \qquad (70)$$

The estimated dry paint film thickness H can then displayed on the display 10 and printed out at the plotter 11.

The remaining features of this configuration of FIG. 23 are substantially the same as that of FIG. 17.

In this manner, it becomes possible in this tenth embodiment to provide an apparatus capable of estimating a dry paint film thickness according to the wet paint film thickness.

Next, an eleventh embodiment of an apparatus for measuring a paint film thickness according to the present invention will be described in detail.

In this eleventh embodiment, the apparatus of the tenth embodiment of FIG. 38 described above is further equipped with a mechanism for estimating quality of painting and optimum paint film thickness from the paint film thickness and the distinctness of the dry paint film according to the paint film thickness and the distinctness of the wet paint film, such that the deviation from the optimum paint film thickness can be fed back to the painting process quickly so as to improve the stability of the quality of painting in the painting process, while preventing the wasteful use of the paint medium.

Figure 39:
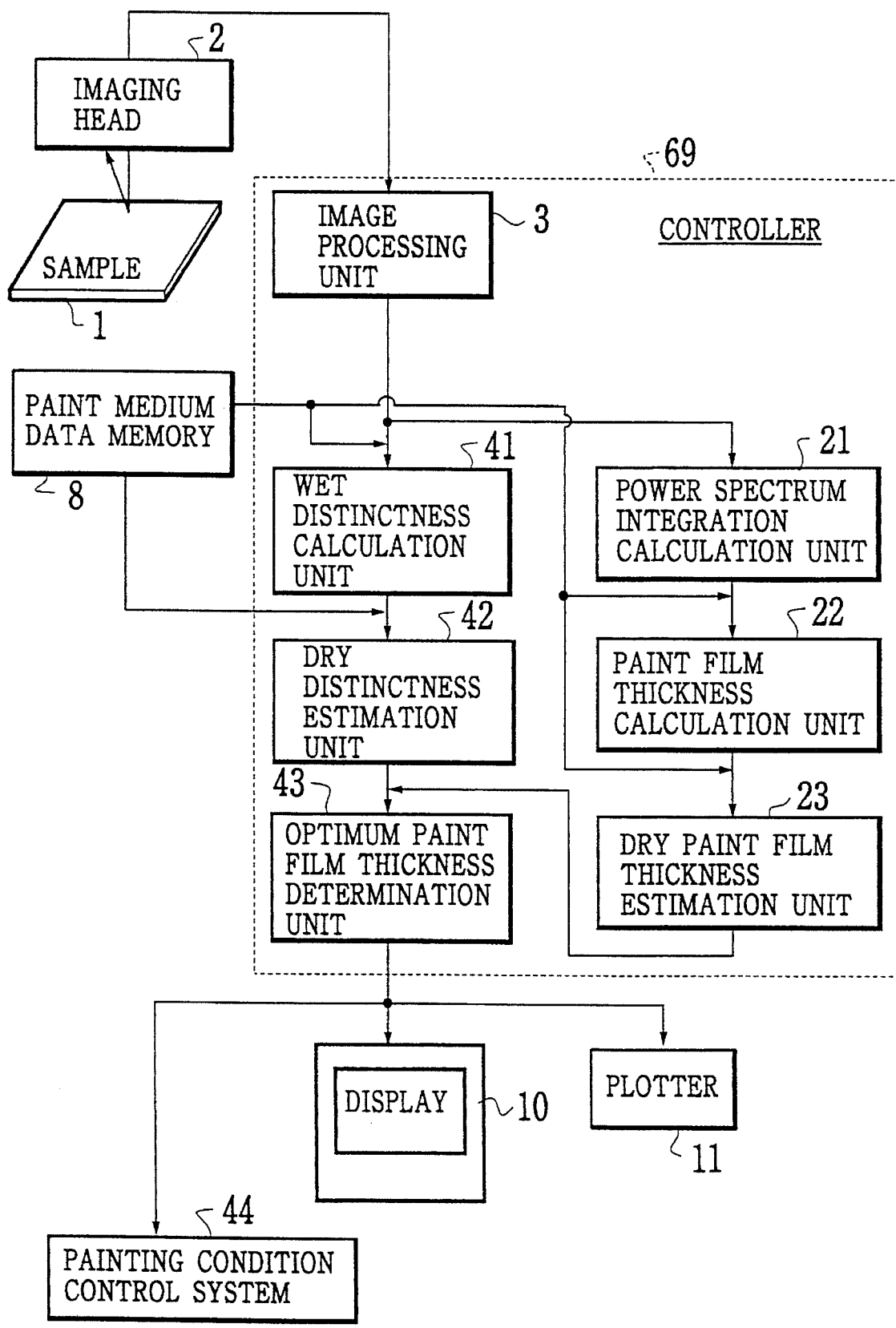
FIG. 39 is a schematic block diagram of the eleventh embodiment of an apparatus for measuring a paint film thickness according to the present invention.

More specifically, in this eleventh embodiment, the apparatus has a configuration as shown in FIG. 39, which differs from the tenth embodiment of FIG. 38 described above in that the controller 59 in FIG. 38 is replaced by a controller 69 for estimating quality of painting and optimum paint film thickness from the paint film thickness and the distinctness of the dry paint film according to the paint film thickness and the distinctness of the wet paint film.

To this end, in addition to the image processing unit 3, the power spectrum integration calculation unit 21, the paint film thickness calculation unit 22, and the dry paint film thickness estimation unit 23, the controller 69 further includes: a wet distinctness calculation unit 41 for calculating the distinctness of the wet paint film from the paint film surface image data supplied from the image processing unit 3 and the paint medium data supplied from the paint medium data memory 8; a dry distinctness estimation unit 42 for estimating the distinctness of the dry paint film from the distinctness of the wet paint film calculated by the wet distinctness calculation unit 41 and the paint medium data supplied from the paint medium data memory 8; and an optimum paint film thickness determination unit 43 for determining the optimum paint film thickness according to the distinctness of the dry paint film estimated by the dry distinctness estimation unit 42 and the dry paint film thickness estimated by the dry paint film thickness estimation unit 23. Here, the optimum paint film thickness determination unit 43 compares the obtained distinctness with a target distinctness to judge the quality of painting as either one of OK or NG, and calculates a deviation of the obtained paint film thickness from an optimum paint film thickness determined in correspondence to the target distinctness.

In addition, this configuration of FIG. 39 also contains a painting condition control system 44 for executing a feed back control of the painting conditions used in the painting process according to the optimum paint film thickness determined by the optimum paint film thickness determination unit 43.

Here, the distinctness of each of the wet paint film and the dry paint film is evaluated in terms of the smoothness, the paint build level, and the glossiness, as follows.

Figure 40:
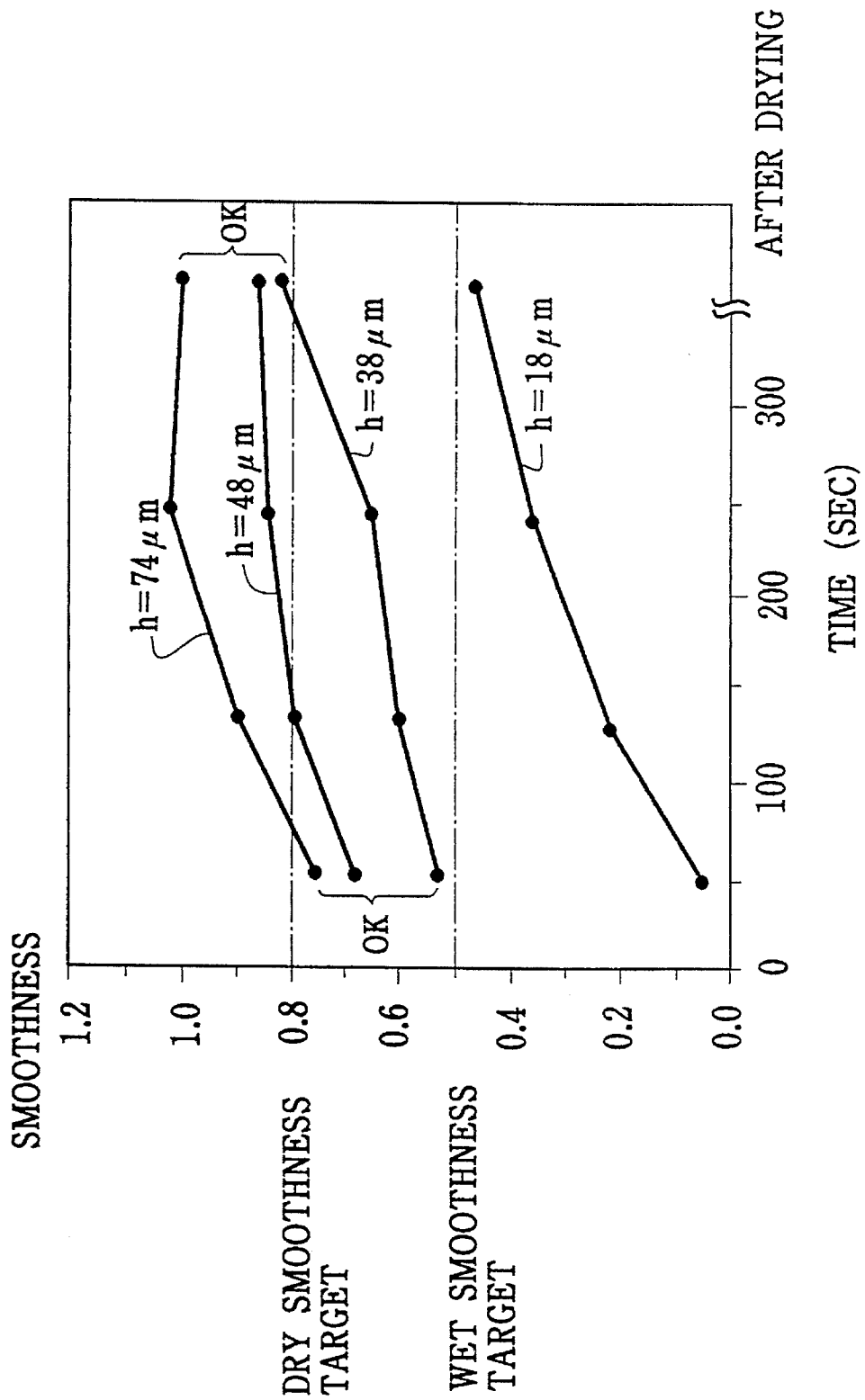
FIG. 40 is a graph showing a time change of the smoothess for different paint film thicknesses, in the eleventh embodiment of an apparatus for measuring a paint film thickness according to the present invention.

First, the smoothness varies in time as indicated in FIG. 40, which is rather low immediately after the application of the paint medium, but gradually increases as the levelling of the wet paint film progresses. This tendency of the increasing smoothness actually continues even after the drying. Consequently, the target value for the smoothness for the wet paint film surface is lower than that for the dry paint film surface, and the wet paint film surface smoothness $H_w$ and the dry paint film surface smoothness $H_d$ have a relationship expressed by the following equation (71).

$$H_d = K_1 \cdot H_w \qquad (71)$$

where $K_1 > 1$ is a wet smoothness coefficient.

In this embodiment, according to FIG. 40, the target value for the wet paint film surface smoothness can be expressed by the following inequality (72).

$$H_w \geq 0.5 \qquad (72)$$

Figure 41:
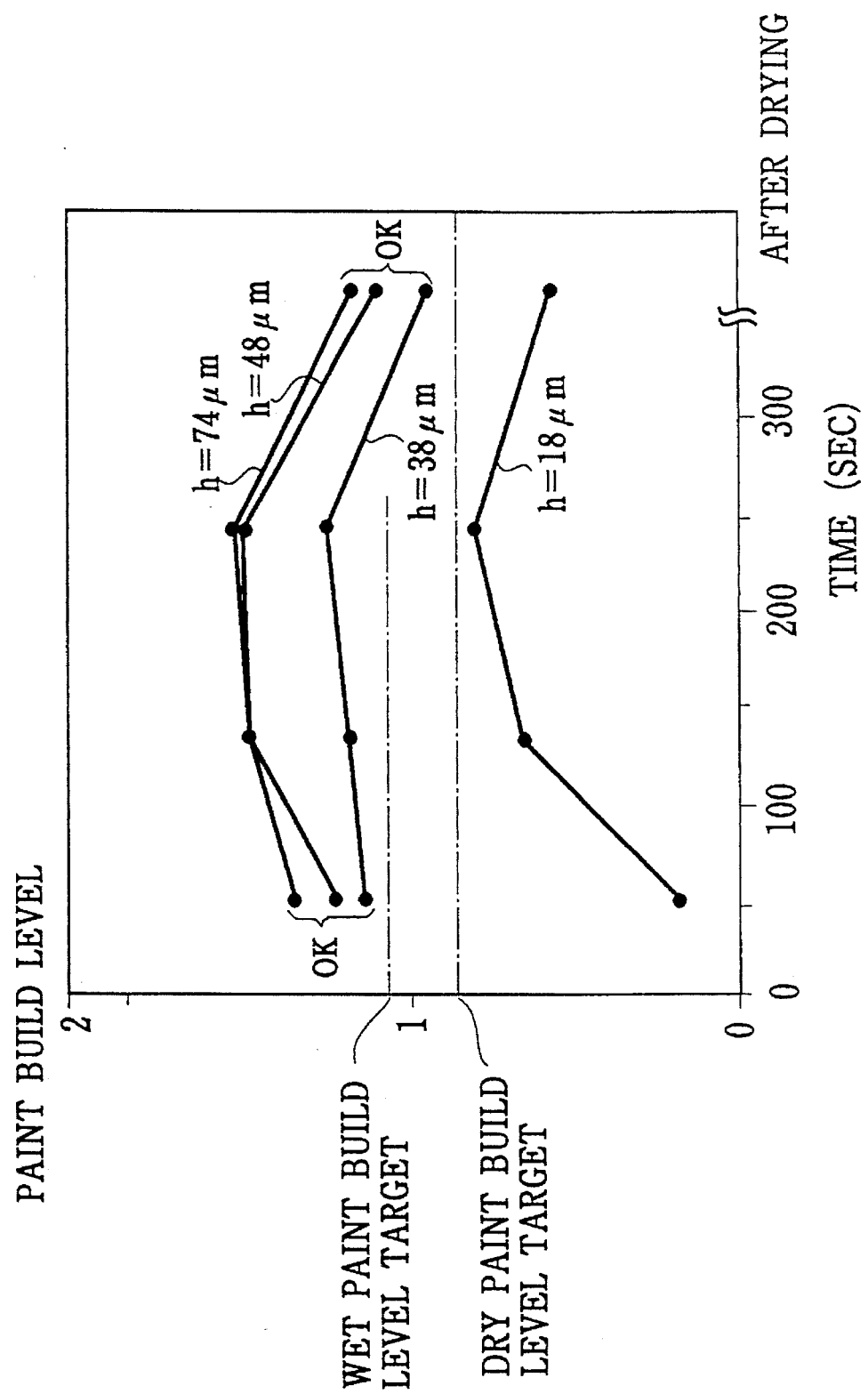
FIG. 41 is a graph showing a time change of the paint build level for different paint film thicknesses, in the eleventh embodiment of an apparatus for measuring a paint film thickness according to the present invention.

Next, the paint build level varies in time as indicated in FIG. 41, which is rather large even immediately after the application of the paint medium, but decreases after the drying due to the roughening caused by the baking. Consequently, the target value of the paint build level for the wet paint film surface is higher than that for the dry paint film surface, and the wet paint film surface paint build level $N_w$ and the dry paint film surface paint build level $N_d$ have a relationship expressed by the following equation (73).

$$N_d = K_2 \cdot N_w \qquad (73)$$

where $K_2 < 1$ is a wet paint build level coefficient.

In this embodiment, according to FIG. 41, the target value for the wet paint film surface paint build level can be expressed by the following inequality (74).

$$N_w \geq 1.0 \qquad (74)$$

Figure 42:
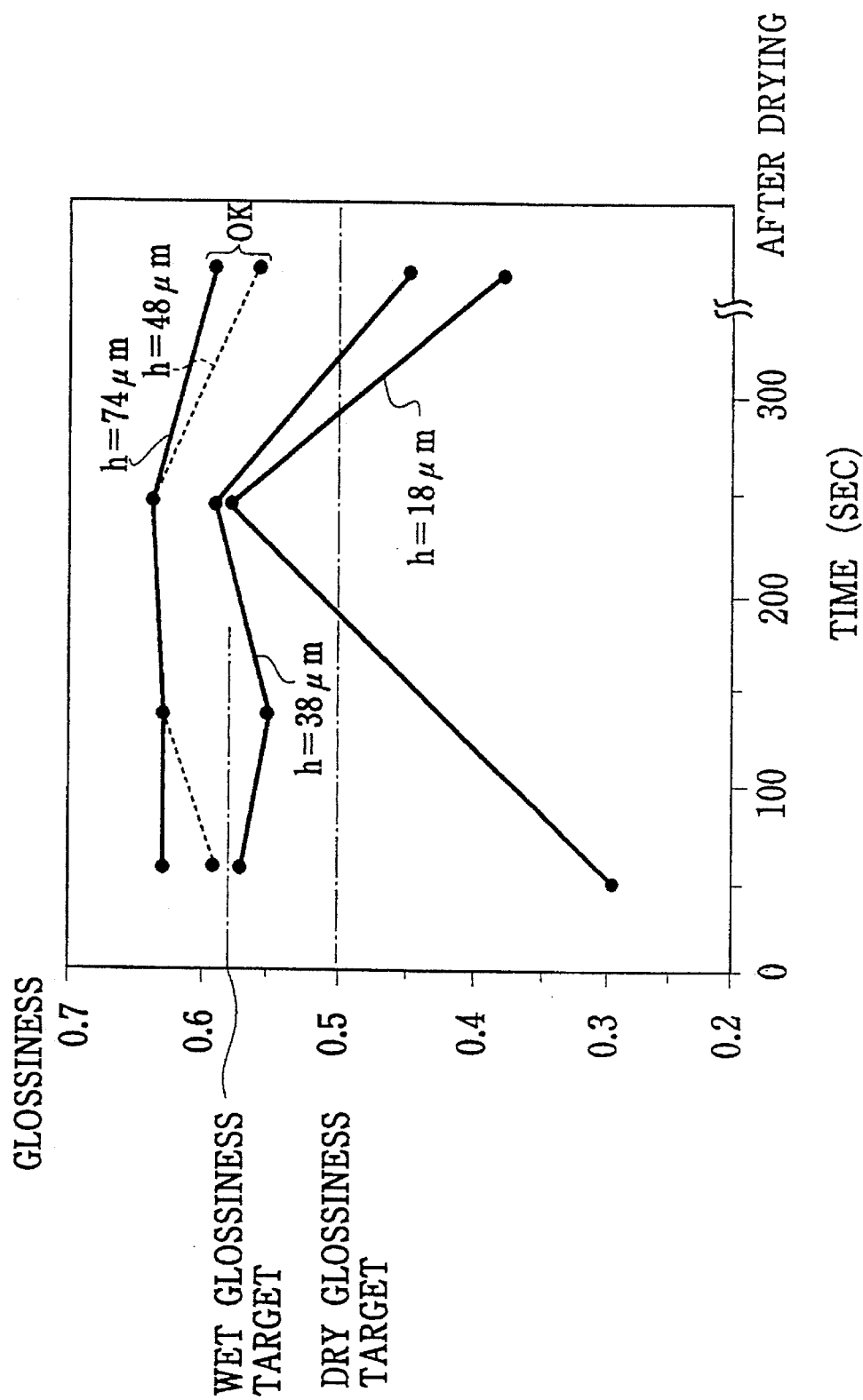
FIG. 42 is a graph showing a time change of the glossiness for different paint film thicknesses, in the eleventh embodiment of an apparatus for measuring a paint film thickness according to the present invention.

Next, the glossiness varies in time as indicated in FIG. 42, which is rather large even immediately after the application of the paint medium, but decreases after the drying due to the roughening caused by the baking. Consequently, the target value of the glossiness for the wet paint film surface is higher than that for the dry paint film surface, and the wet paint film surface glossiness $T_w$ and the dry paint film surface glossiness $T_d$ have a relationship expressed by the following equation (75).

$$T_d = K_3 \cdot T_w \qquad (75)$$

where $K_3 < 1$ is a wet glossiness coefficient.

Figure 43:
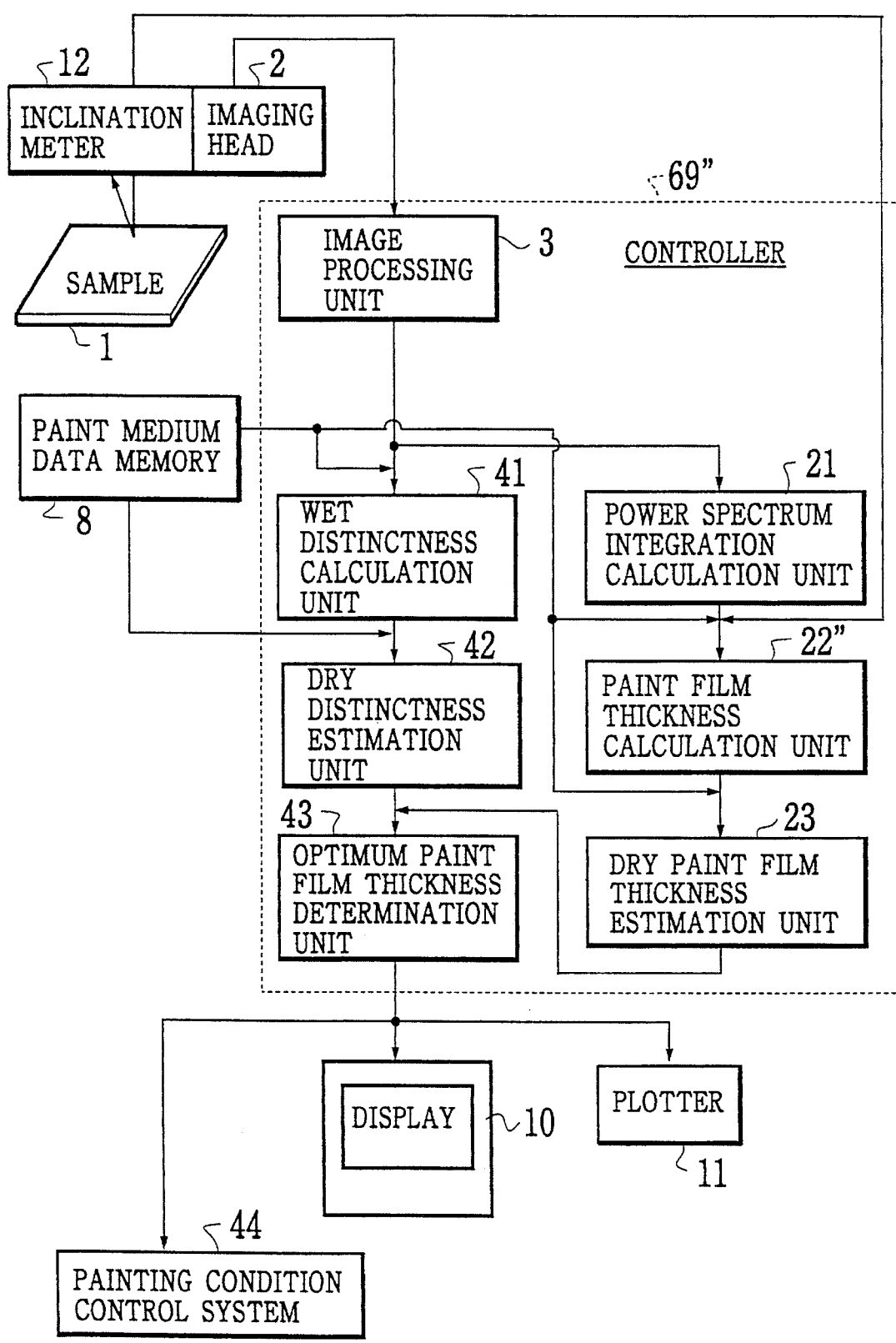
FIG. 43 is a schematic block diagram of the twelfth embodiment of an apparatus for measuring a paint film thickness according to the present invention.

In this embodiment, according to FIG. 43, the target value for the wet paint film surface paint build level can be expressed by the following inequality (76).

$$T_w \geq 0.6 \qquad (76)$$

Thus, the wet distinctness calculation unit 41 obtains the distinctness of the wet paint film in terms of these smoothness, paint build level, and glossiness, with respect to the target values given by the above inequalities (72), (74), and (76), while the dry distinctness estimation unit 42 estimates the distinctness of the dry paint film according to the relationships between the wet paint film surface and the dry paint film surface as indicated in FIGS. 40, 41, and 42. Then, the optimum paint film thickness determination unit 43 determines the optimum paint film thickness $H_0$ as the minimum paint film thickness for which the distinctness of the dry paint film can satisfy the desired target values. In the exemplary case shown in FIGS. 40, 41, and 42, the optimum paint film thickness $H_0$ is in a range of 40 to 45 μm. The optimum paint film thickness determination unit 43 then calculates the paint film thickness deviation $\Delta H$ from the determined optimum paint film thickness $H_0$ and the estimated dry paint film thickness H obtained by the the dry paint film thickness estimation unit 23, according to the following equation (77).

$$\Delta H = H - H_0 \qquad (77)$$

and this paint film thickness deviation $\Delta H$ is supplied to the painting condition control system 44 for the purpose of the feed back control.

In this manner, it becomes possible in this eleventh embodiment to provide an apparatus capable of estimating quality of painting and optimum paint film thickness from the paint film thickness and the distinctness of the dry paint film according to the paint film thickness and the distinctness of the wet paint film.

It is to be noted that the wet paint film thickness calculation based on the dynamic levelling property of the wet paint film surface using the power spectrum integration value used in this eleventh embodiment by the power spectrum integration calculation unit 21 and the paint film thickness calculation unit 22 may be replaced by the wet paint film thickness calculation using other quantities such as the peak to peak amplitude as in the first embodiment, or the surface roughness as in the second embodiment, or the levelling initial value as in the third embodiment, if desired.

It is also to be noted that the eleventh embodiment of FIG. 39 described above may be modified into a twelfth embodiment shown in FIG. 43 which is further equipped with the inclination meter 12 and the paint film thickness calculation unit 22'' used in the eighth embodiment of FIG. 32, such that the controller 69'' can obtain the wet paint film thickness with the effect of the inclination of the paint film surface taken into account.

Figure 44:
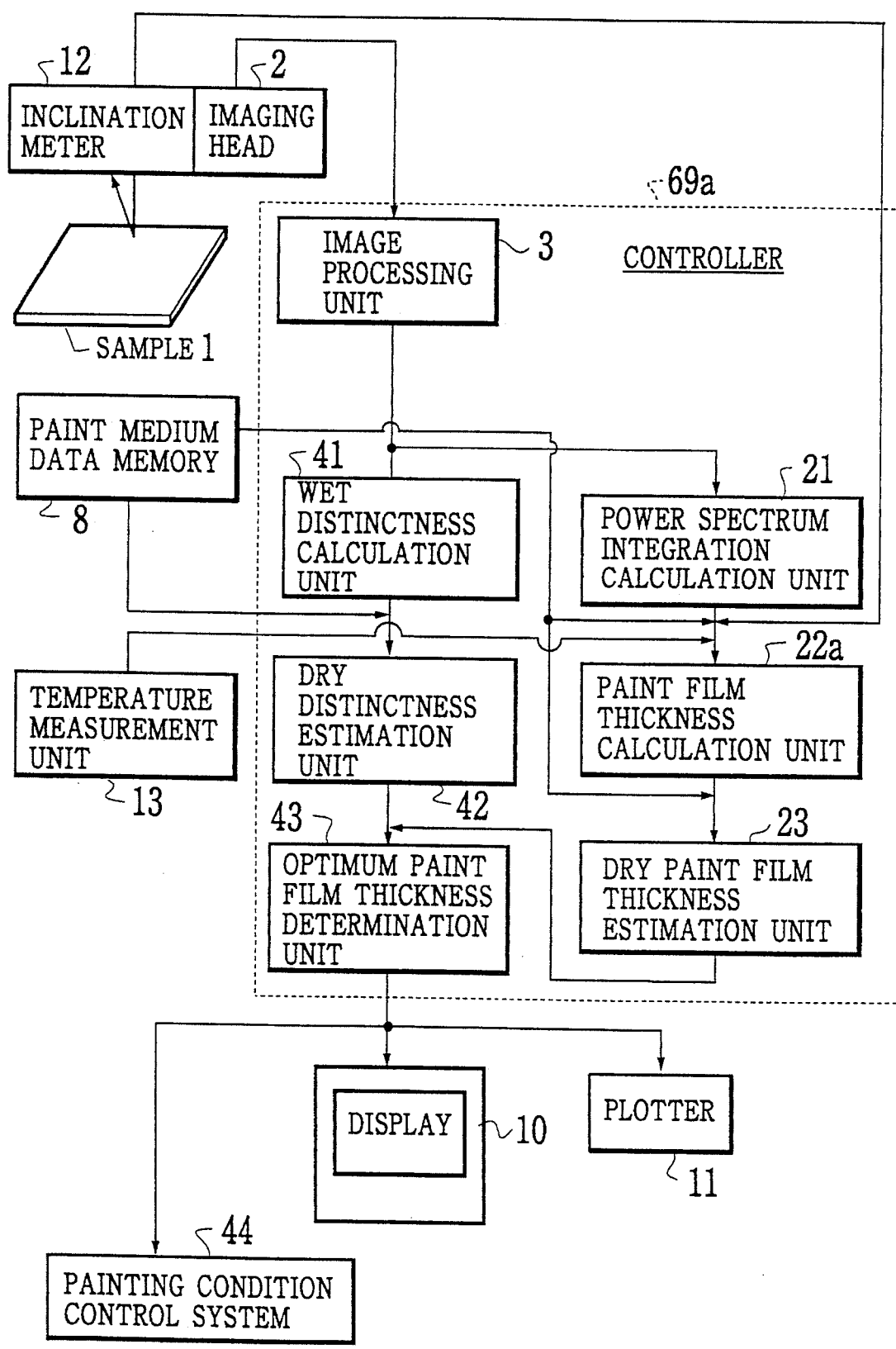
FIG. 44 is a schematic block diagram of the thirteenth embodiment of an apparatus for measuring a paint film thickness according to the present invention.

In addition, this configuration of FIG. 43 can be further modified into a thirteenth embodiment shown in FIG. 44, which is further equipped with the temperature measurement unit 13 and the paint film thickness calculation unit 22a used in the ninth embodiment of FIG. 33, such that the controller 69a can obtain the wet paint film thickness with the effect of the temperature taken into account.

Figure 45:
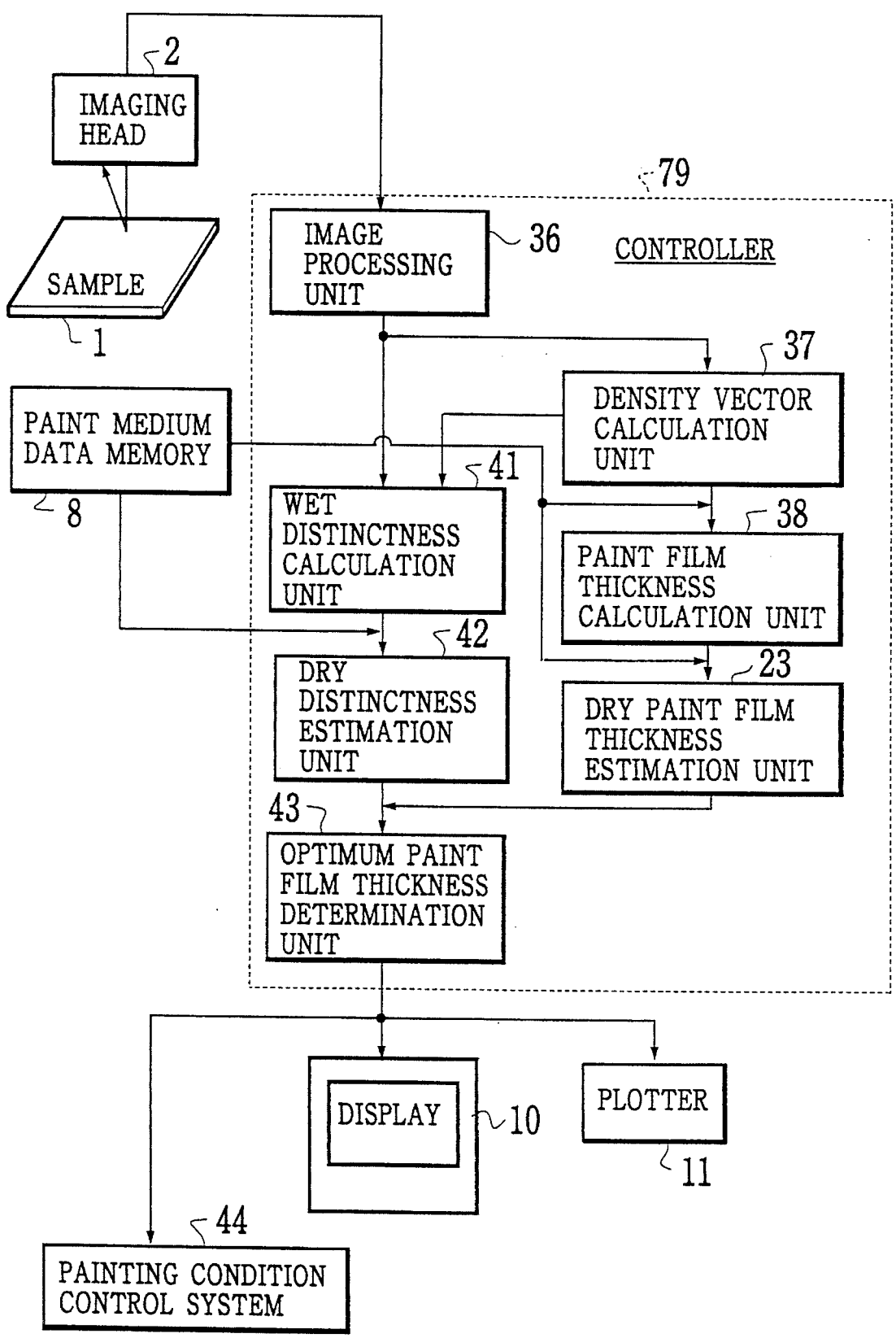
FIG. 45 is a schematic block diagram of the fourteenth embodiment of an apparatus for measuring a paint film thickness acceding to the present invention.

Similarly, the eleventh embodiment of FIG. 39 described above may be modified into a fourteenth embodiment shown in FIG. 45, in which the image processing unit 3, the power spectrum integration calculation unit 21, and the paint film thickness calculation unit 22 in the eleventh embodiment of FIG. 39 are replaced by the image processing unit 36, the density vector calculation unit 37, and the paint film thickness calculation unit 38 used in the fifth embodiment of FIG. 23, such that the controller 79 can obtain the wet paint film thickness by using the density vector instead of the power spectrum integrated value.

Figure 46A:
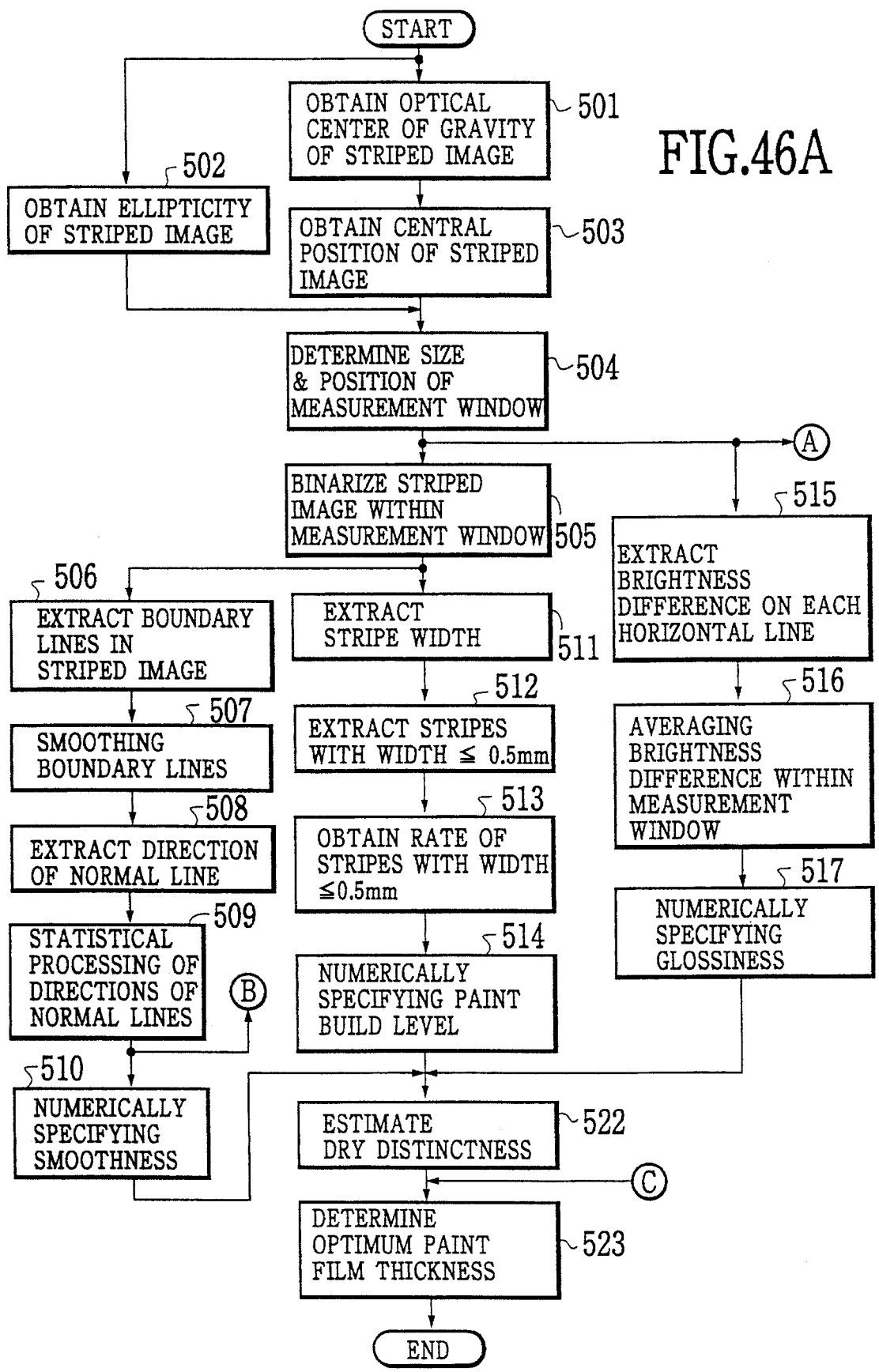
FIGS. 46A and 46B are a flow chart for the overall operation carried out by the apparatus FIG. 45.
Figure 46B:
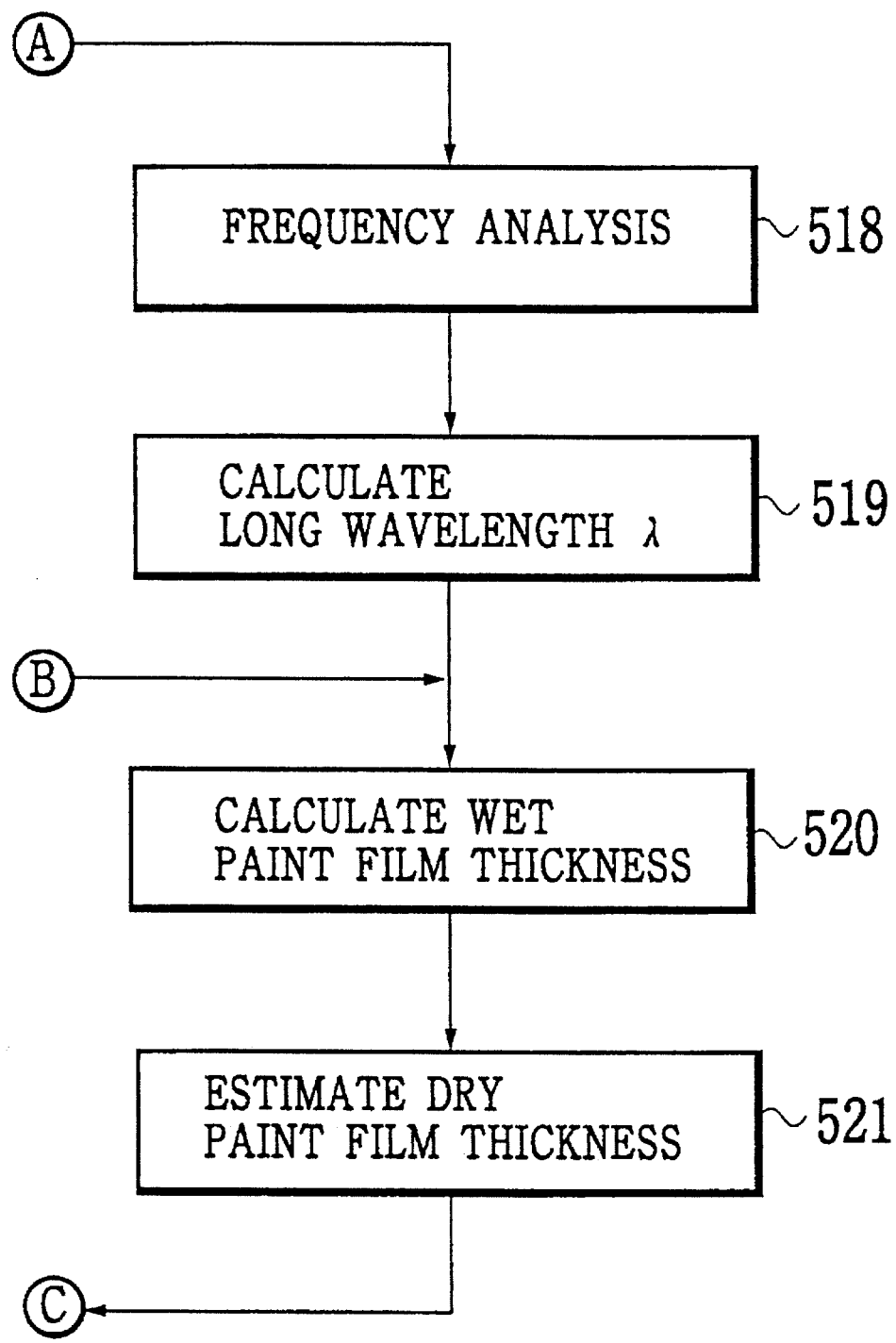

In this case, the operation in the controller 79 is carried out according to the flow chart of FIGS. 46A and 46B, as follows.

First, from the striped image taken by the imaging head 2, the image processing unit 36 obtains an optical center of gravity of the striped image at the step 501 and an ellipticity of the striped image at the step 502.

Then, the image processing unit 36 obtains a central position in the striped image at the step 503 according to the optical center of gravity obtained at the step 501, and determines a size and a position of a measurement window at the step 504 according to the ellipticity obtained at the step 501 and the central position obtained at the step 503.

Next, at the step 505, the striped image within the measurement window determined at the step 504 is binarized by the image processing unit 36.

Then, the density vector calculation unit 37 calculates the density vector $N_i$ at the steps 506 to 509, where the boundary lines of the striped image are extracted at the step 506, the extracted boundary lines are smoothed at the step 507, a direction of a normal line at each picture element on each smoothed boundary line is extracted at the step 508, and the extracted directions of the normal lines are statistically processed to obtain the size of the standard deviation of the directions of the normal lines.

Next, at the step 510, the wet distinctness calculation unit 41 numerically specifies the smoothness of the paint film surface according to the density vector $N_i$ calculated by the density vector calculation unit 37. Here, the smoothness can be specified in terms of the level of the dispersion, i.e., the convergence, of the directions of the normal lines. Thus, the better smoothness can be given to the converging ones, while the worse smoothness can be given to the diverging ones.

On the other hand, after the step 505, the wet distinctness calculation unit 41 obtains the paint build level of the paint film surface at the steps 511 to 514, where a width of each stripe in the striped image is extracted at the step 511, each stripe having an extracted width not greater than 0.5 mm is extracted at the step 512, a rate of those stripes having a width not greater than 0.5 mm among all the stripes in the striped image is obtained at the step 513, and the paint build level is numerically specified at the step 514 according to the rate obtained at the step 513. Namely, under the normal circumstances, only the same width as that of each stripe in the striped image will be obtained. However, when the paint build level is low, small islands may appear within each stripe such that the width corresponding to these islands can also be obtained. Thus, by extracting the width and obtaining a rate of the smaller widths as in the steps 511 to 513, how many of these small islands are present in the striped image can be indicated, and consequently, the paint build level can be specified in accordance with the obtained rate of the smaller widths.

Meanwhile, after the step 504, the wet distinctness calculation unit 41 also obtains the glossiness of the paint film surface at the steps 515 to 517, where a brightness difference between the brightest portion and the darkest portion on each horizontal line in the striped image is extracted at the step 515, an average of the extracted brightness differences within the measurement window determined at the step 504 is calculated at the step 516, and the glossiness is numerically specified at the step 517 according to the average obtained at the step 516. Here, the correlation between the brightness difference and the glossiness is already well known, so that the glossiness can be specified in accordance with the obtained average brightness difference.

On the other hand, after the step 504, the image processing unit 36 applies the frequency analysis (Fast Fourier Transform) onto the striped image, to obtain the power spectrum data for each spatial frequency at the step 518, and the density vector calculation unit 37 calculates the long wavelength λ from the power spectrum data at the step 519.

Then, after the steps 509 and 519, the paint film thickness calculation unit 38 calculates the wet paint film thickness according to the density vector $N_i$ obtained at the step 509, the long wavelength obtained at the step 519, and the paint medium data supplied from the paint medium data memory 8 at the step 520.

Then, at the step 521, the dry paint film thickness estimation unit estimates the dry paint film thickness according to the wet paint film thickness calculated at the step 520.

Meanwhile, after the steps 510, 514, and 517, the dry distinctness estimation unit 42 estimates the dry distinctness at the step 522, according to the wet distinctness specified by the smoothness obtained at the step 510, the paint build level obtained at the step 514, and the glossiness obtained at the step 517.

Finally, after the steps 521 and 522, the optimum paint film thickness determination unit 43 determines the optimum paint film thickness according to the wet paint film thickness obtained at the step 520, the dry paint film thickness obtained at the step 521, the wet distinctness obtained at the steps 510, 514, and 517, and the dry distinctness obtained at the step 522, and obtains the deviation from the optimum paint film thickness, such that the obtained paint film thickness deviation can be supplied to the painting condition control system 44, while being displayed on the display 10 and printed by the plotter 11 along with the other data including those of the wet paint film thickness, the dry paint film thickness, the wet distinctness, and the dry distinctness.

Next, a fifteenth embodiment of an apparatus for measuring a paint film thickness according to the present invention will be described in detail.

In this fifteenth embodiment, in addition to the measurement of the wet paint film thickness similar to that used in the second embodiment of FIG. 10 described above, the presence of the sagging on the paint film surface is checked by utilizing the dynamic levelling property of the wet paint film surface.

Namely, in a normal case without the sagging on the paint film surface, the paint film surface initially has a relatively large unevenness due to the initial vortex flow, but this initial unevenness is gradually levelled according to the dynamic levelling property of the wet paint film surface.

On the other hand, in a case in which the sagging is present on the paint film surface, the state of the paint film surface is quite different from the normal case described above in that the paint film surface has a relatively small unevenness from the beginning, and the levelling speed is very slow, such that there is hardly any change in time for the state of the paint film surface.

Thus, by checking the time change of the surface roughness on the paint film surface, it becomes possible to check the presence of the sagging on the paint film surface.

Figure 47:
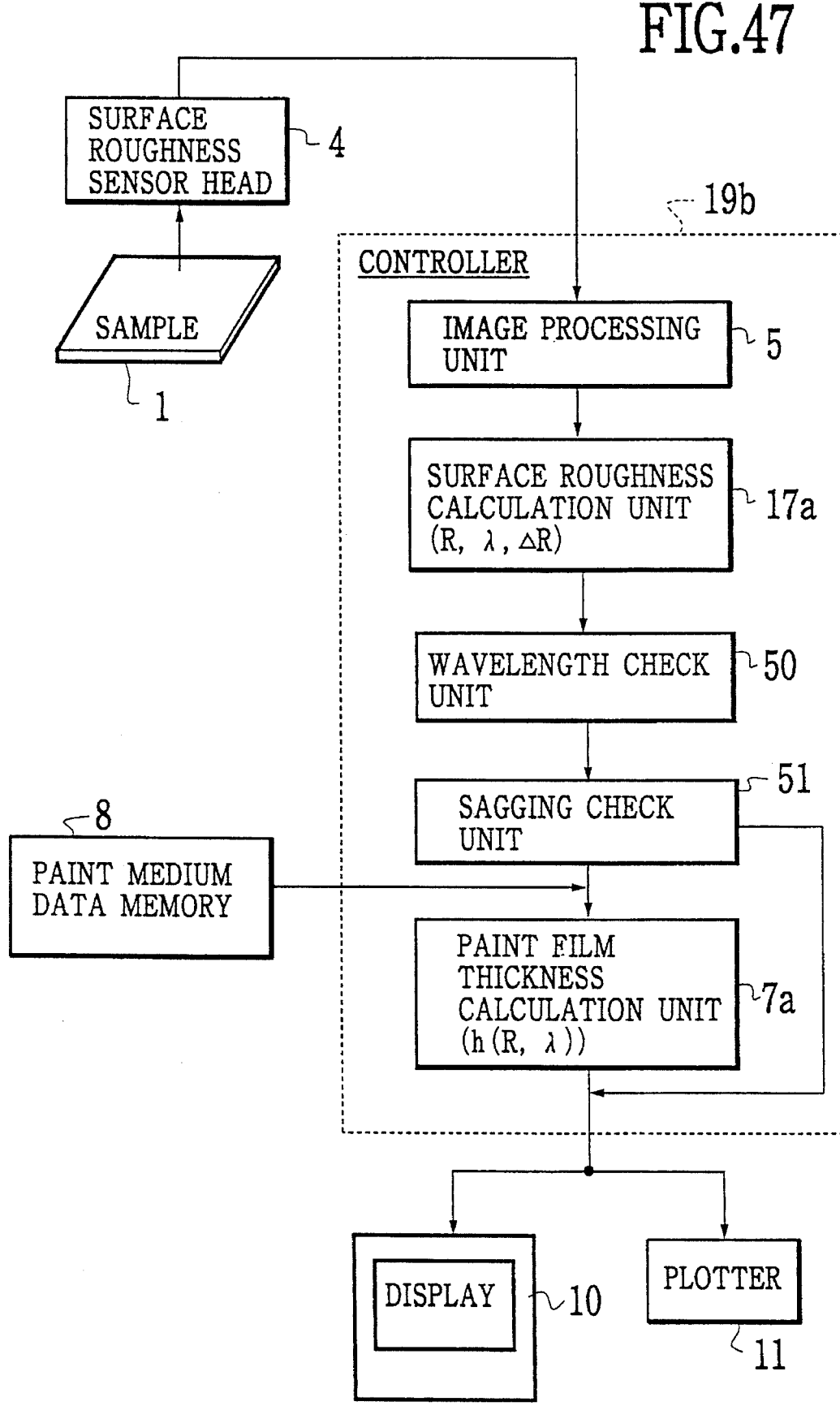
FIG. 47 is a schematic block diagram of the fifteenth embodiment of an apparatus for measuring a paint film thickness according to the present invention.

In this fifteenth embodiment, the apparatus has a configuration as shown in FIG. 47, which differs from the second embodiment of FIG. 10 described above in that the controller 19 in FIG. 10 is replaced by a controller 19b for calculating the wet paint film thickness from the surface roughness data obtained by the surface roughness sensor head 4, while checking the presence of the sagging on the paint film surface according to the time change of the surface roughness.

To this end, the surface roughness calculation unit 17a in this controller 19b calculates the time change $\Delta R$ of the surface roughness in addition to the surface roughness R and the surface roughness wavelength $\lambda$, and the controller 19b further includes a wavelength check unit 50 for checking whether the surface roughness wavelength $\lambda$ obtained by the surface roughness calculation unit 17a is not less than a prescribed limit wavelength $\lambda_0$, and the sagging check unit 51 for checking whether the sagging is present on the paint film surface.

More specifically, in this controller 19b, the presence of the sagging on the paint film surface is checked according to the flow chart of FIG. 48, as follows.

First, at the step 601, the surface roughness wavelength $\lambda$ is obtained at the surface roughness calculation unit 17a, and then at the step 602, whether the obtained wavelength $\lambda$ is not less than the prescribed limit wavelength $\lambda_0$ or not is determined at the wavelength check unit 50. Here, the prescribed limit wavelength $\lambda_0$ represents the lower limit wavelength for the top coat paint film surface in this fifteenth embodiment.

When the obtained wavelength $\lambda$ is less than the prescribed limit wavelength $\lambda_0$ at the step 602, it implies that the unevenness on the paint film surface is so small that the presence of the sagging on the paint film surface cannot be checked within a reasonable error rate, so that next at the step 603, the display 10 displays that it is incapable to check the presence of the sagging.

On the other hand, when the obtained wavelength $\lambda$ is not less than the prescribed limit wavelength $\lambda_0$ at the step 602, the process proceeds to the step 604.

At the step 604, the surface roughness R is obtained at the surface roughness calculation unit 17a, and then at the step 605, whether the obtained surface roughness R is less than a prescribed limit surface roughness $R_0$ or not is determined at the sagging check unit 51. Here, the prescribed limit surface roughness $R_0$ represents the surface roughness at the time of the upper limit paint film thickness in this fifteenth embodiment.

When the obtained surface roughness is not less than the prescribed limit surface roughness $R_0$ at the step 605, it implies that there is no chance for the sagging to be present on the paint film surface, so that next at the step 608, the display 10 displays that it is a normal case without the sagging on the paint film surface.

On the other hand, when the obtained surface roughness R is less than the prescribed limit surface roughness $R_0$ at the step 605, the process proceeds to the step 606.

At the step 606, the time change $\Delta R$ of the surface roughness is obtained at the surface roughness calculation unit 17a from the surface roughness R obtained at two different times $t_1$ and $t_2$, where the time change $\Delta R=[R(t_1)-R(t_2)]/(t_1-t_2)$. Then, at the step 607, whether the obtained time change $\Delta R$ is less than the prescribed limit time change $\Delta R_0$ or not is determined at the sagging check unit 51. Here, the prescribed limit time change $\Delta R_0$ represents the lower limit time change of the surface roughness in this fifteenth embodiment.

When the obtained time change $\Delta R$ is not less than the prescribed limit time change $\Delta R_0$ at the step 607, it implies that there is no chance for the sagging to be present on the paint film surface, so that the process proceeds to the step 608 described above.

On the other hand, when the obtained time change $\Delta R$ is less than the prescribed limit time change $\Delta R_0$ at the step 607, it is Judged that the sagging is present on the paint film surface, so that next at the step 609, the display 10 displays that the sagging is present.

Figure 48:
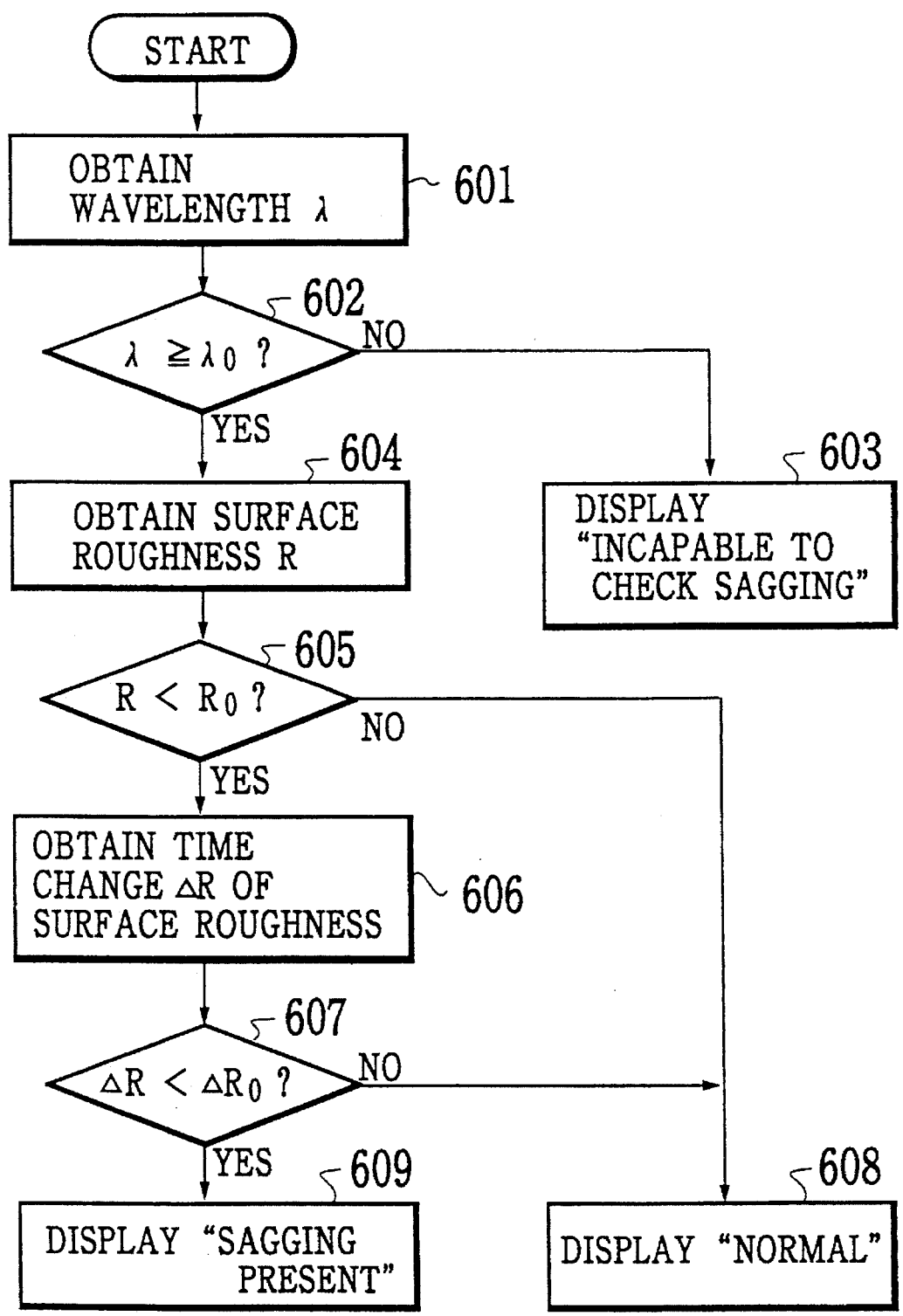
FIG. 48 is a flow chart for the sagging check operation carried out by the apparatus FIG. 47.

It is to be noted that the prescribed limit values of $\lambda_0$, $R_0$, and $\Delta R_0$ used in this flow chart of FIG. 48 can be determined either empirically, or from the dynamic levelling property of the wet paint film surface by using the theoretically specified limit values for the wavelength or the paint film thickness indicating an appropriate limit for an appearance of the sagging on the wet paint film surface.

Figure 49A:
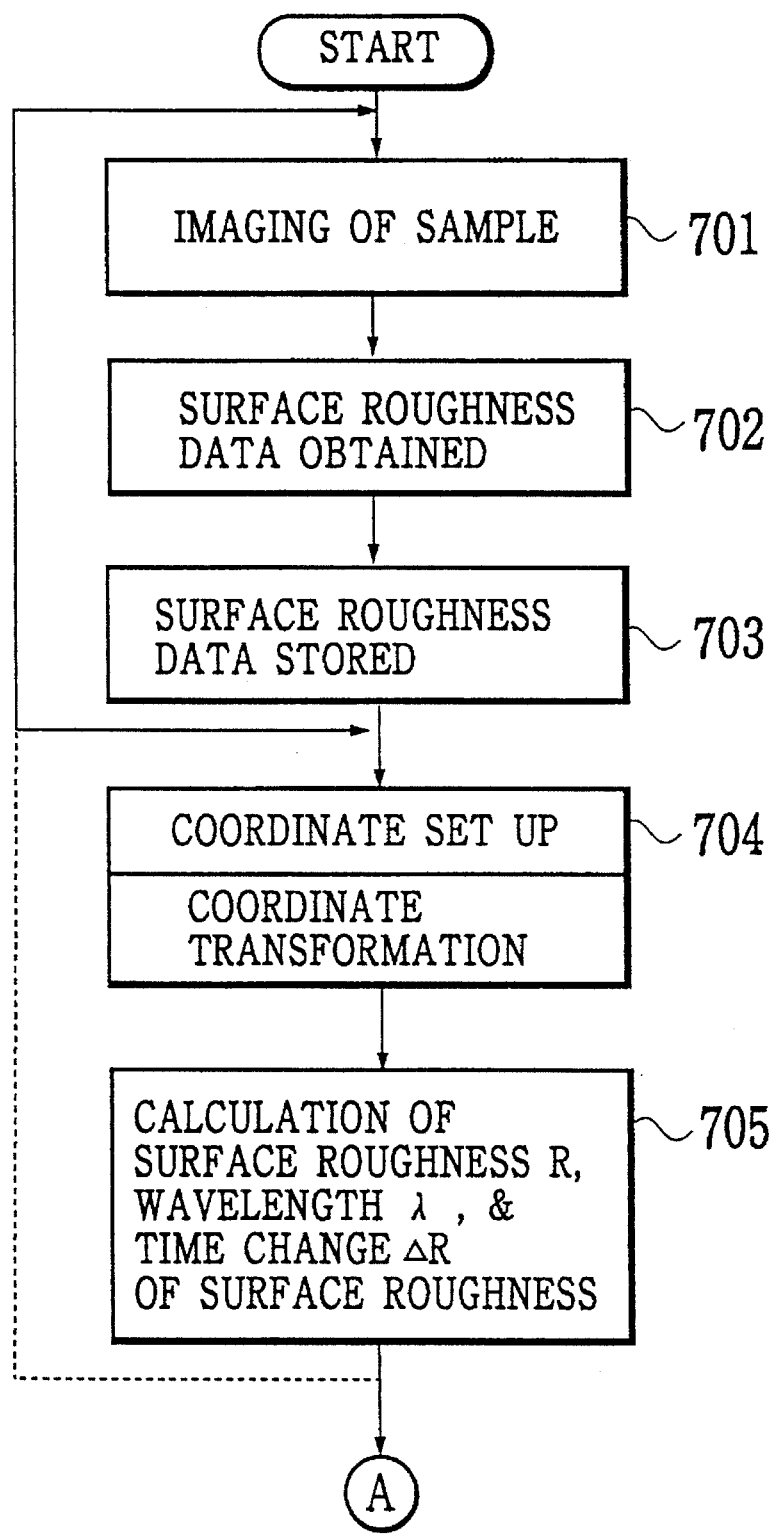
FIGS. 49A and 49B are a flow chart for the overall operation carried out by the apparatus FIG. 47.
Figure 49B:
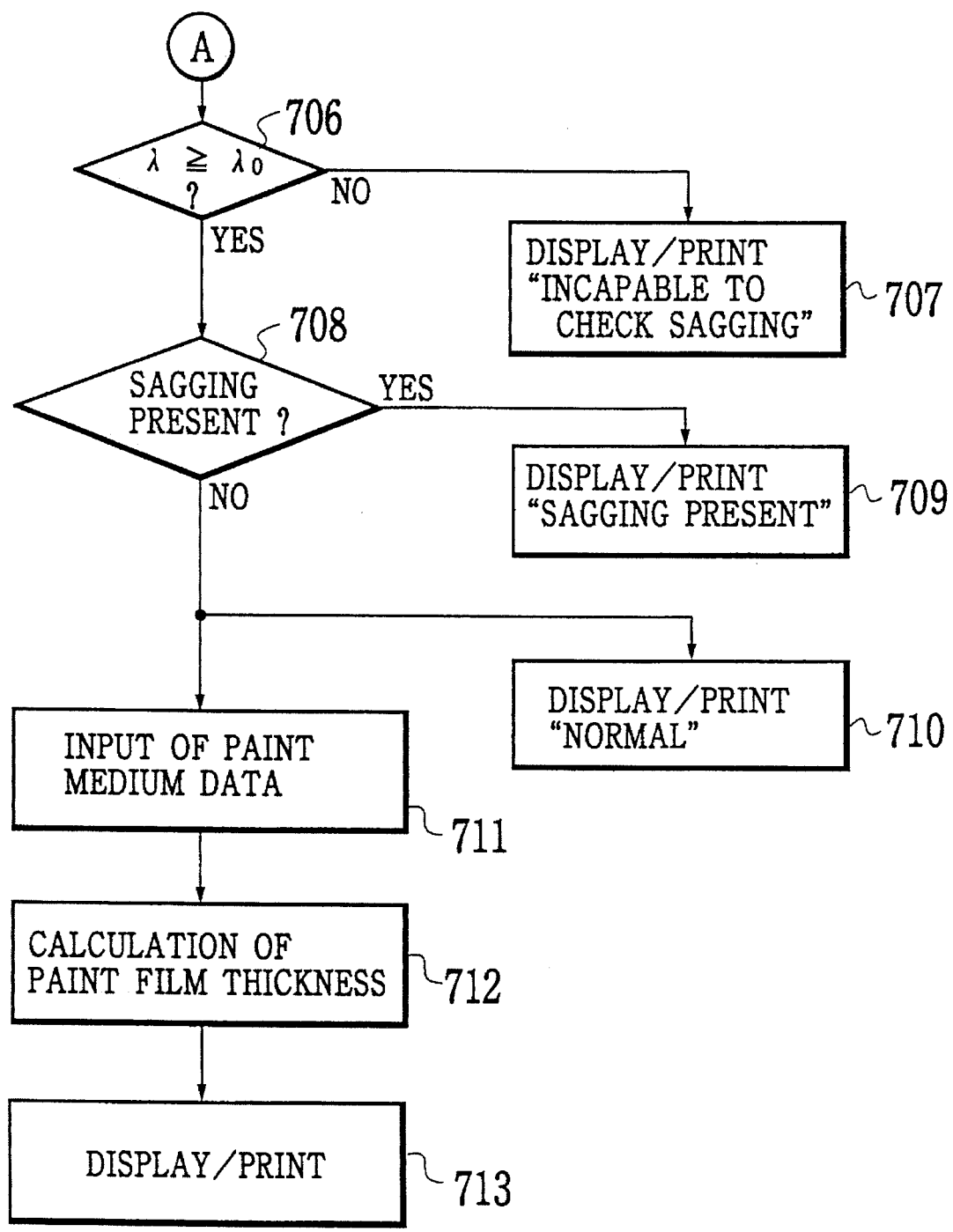

Now, this fifteenth embodiment of FIG. 47 as a whole operates according to the flow chart of FIGS. 49A and 49B, as follows.

First, the surface roughness sensor head 4 carries out the imaging of the sample 1 at the step 701, such that the surface roughness data are obtained at the step 702. Then, the obtained surface roughness data are temporarily stored in a memory (not shown) provided in the controller 19b at the step 703. These steps 701 to 703 are repeated for different times $t_1$ and $t_2$.

Next, at the step 704, the various image processings including the coordinate set up and the coordinate transformation for a real space modelling are applied the temporarily stored surface roughness data at the image processing unit 5.

Then, at the step 705, the surface roughness R, the wavelength $\lambda$, and the time change $\Delta R$ of the surface roughness are calculated from the image processed surface roughness data at the surface roughness calculation unit 17a.

Next, at the step 706, whether the wavelength $\lambda$ obtained at the step 705 is not less than the prescribed limit wavelength $\lambda_0$ or not is determined by the wavelength check unit 50. If not, the display 10 and the plotter 11 displays and prints, respectively, that it is incapable to check the presence of the sagging on the paint film surface at the step 707 and the process terminates.

Otherwise, next at the step 708, whether the sagging is present on the paint film surface or not is determined by the sagging check unit 51 in the manner described above in conjunction with the flow chart of FIG. 48. If the sagging is present, next at the step 709, the display 10 and the plotter 11 displays and prints, respectively, that the sagging is present on the paint film surface, and the process terminates.

Otherwise, next at the step 710, the display 10 and the plotter displays and prints that it is a normal case without the sagging on the paint film surface, and the process proceeds to the step 711.

At the step 711, the paint medium data are entered from the paint medium data memory 8 to the paint film thickness calculation unit 7a, and then at the step 712, the paint film thickness calculation unit 7a calculates the paint film thickness just as in the second embodiment of FIG. 10 described above.

Finally, at the step 713, the display 10 and the plotter 11 displays and prints, respectively, the paint film thickness obtained by the paint film thickness calculation unit 7a at the step 712, and the process terminates.

In this manner, according to this fifteenth embodiment, it becomes possible to provide an apparatus capable of checking the presence of the sagging on the wet paint film surface automatically, in addition to the measurement of the wet paint film thickness.

Next, a sixteenth embodiment of an apparatus for measuring a paint film thickness according to the present invention will be described in detail.

In this sixteenth embodiment, in addition to the measurement of the wet paint film thickness using the power spectrum integrated value similar to that used in the fourth embodiment of FIG. 17 described above, the presence of the sagging on the paint film surface is checked by utilizing the dynamic levelling property of the wet paint film surface using the power spectrum integrated value.

Figure 50:
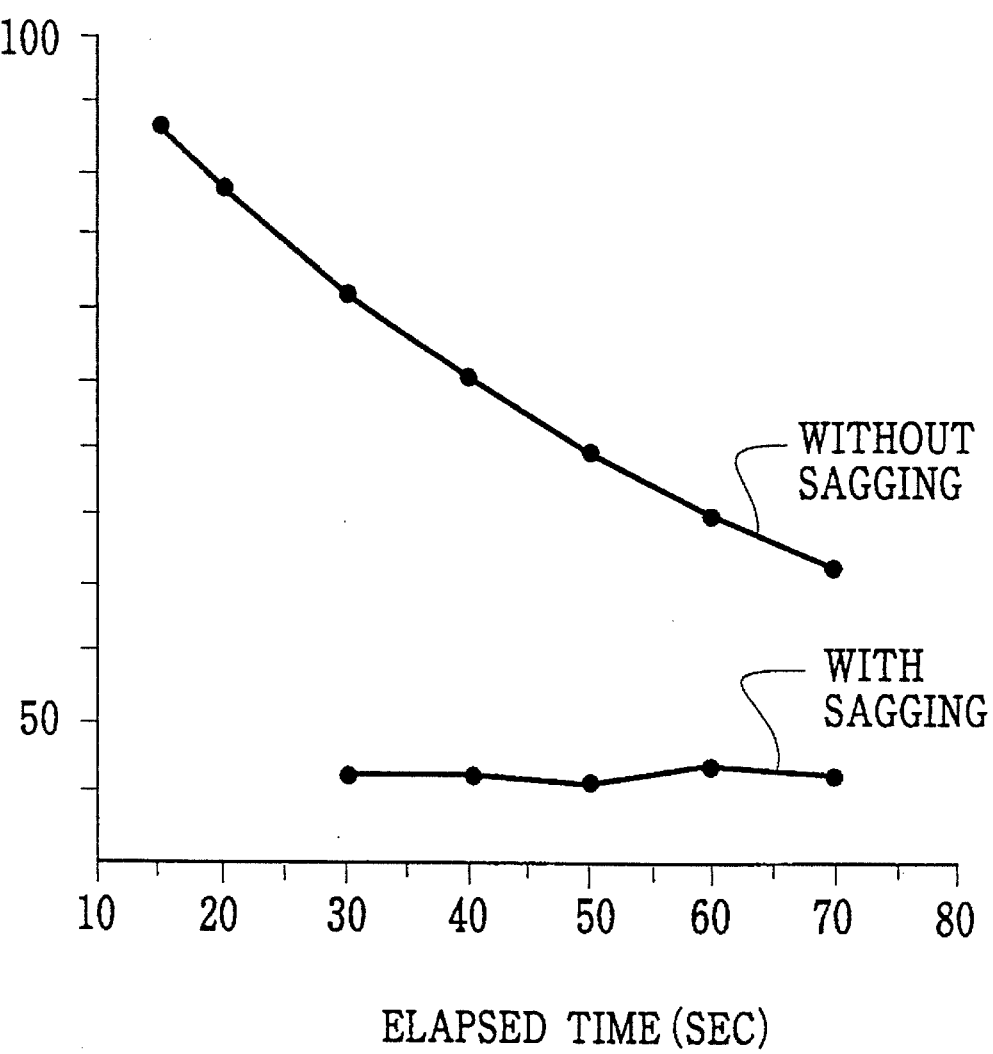
FIG. 50 is a graph showing a time change of the power spectrum integrated value for a case without the sagging and the case with the sagging, in the sixteenth embodiment of an apparatus for measuring a paint film thickness according to the present invention.

Namely, as shown in FIG. 50, in a normal case without the sagging on the paint film surface, the power spectrum integrated value obtained from the paint film surface gradually decreases as the time elapses according to the dynamic levelling property of the wet paint film surface, whereas in a case in which the sagging is present on the paint film surface, the power spectrum integrated value obtained from the paint film surface remains substantially unchanged in time at the relatively low level.

Thus, by checking the time change of the power spectrum integrated value obtained from the paint film surface, it also becomes possible to check the presence of the sagging on the paint film surface.

Figure 51:
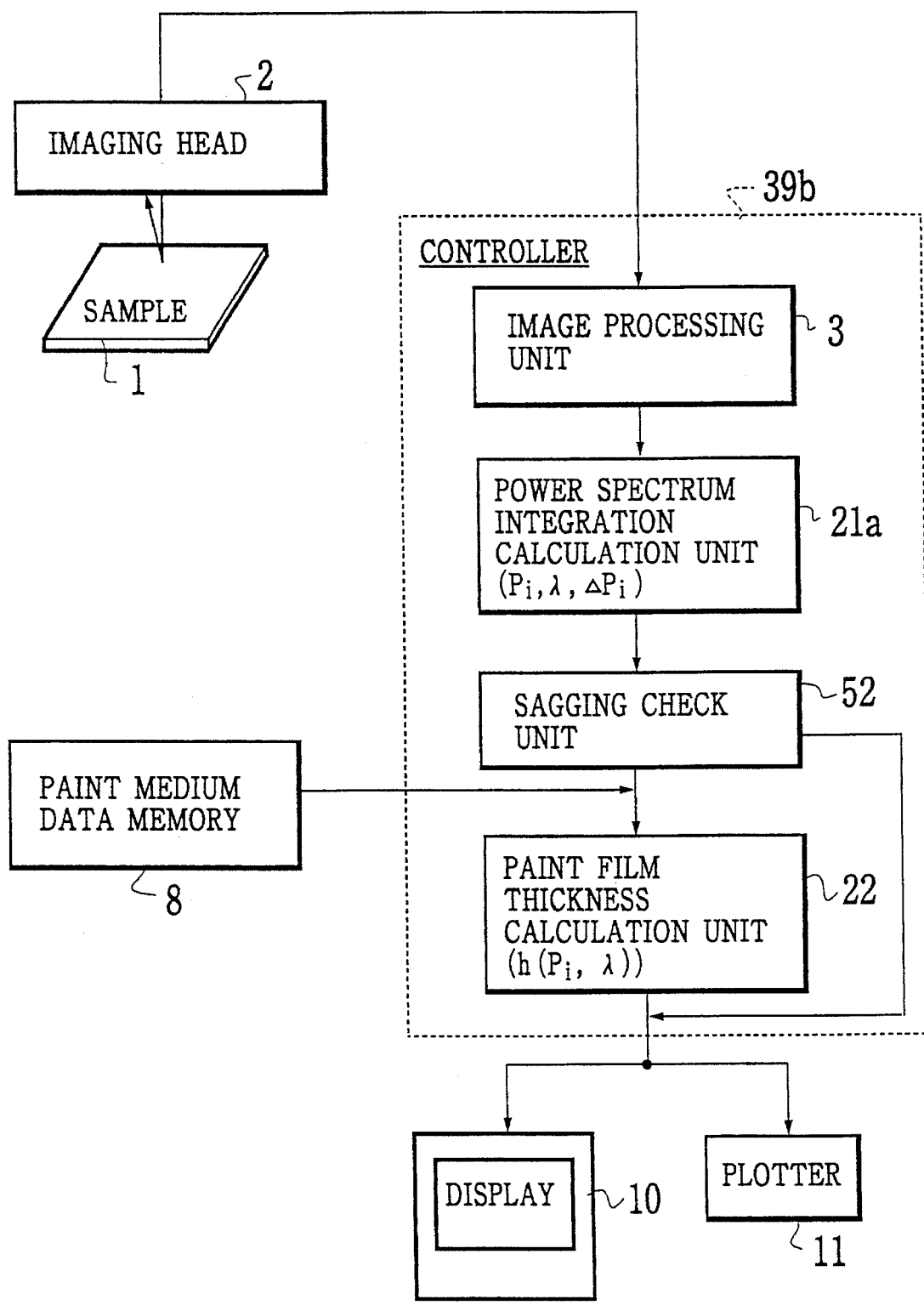
FIG. 51 is a schematic block diagram of the sixteenth embodiment of an apparatus for measuring a paint film thickness according to the present invention.

In this sixteenth embodiment, the apparatus has a configuration as shown in FIG. 51, which differs from the fourth embodiment of FIG. 17 described above in that the controller 39 in FIG. 17 is replaced by a controller 39b for calculating the wet paint film thickness from the surface image data obtained by the imaging head 2, while checking the presence of the sagging on the paint film surface according to the time change of the power spectrum integrated value.

To this end, the power spectrum integration calculation unit 21a in this controller 39b calculates the time change $\Delta P_i$ of the power spectrum integrated value in addition to the power spectrum integrated value $P_i$ and the long wavelength $\lambda$, and the controller 39b further includes the sagging check unit 52 for checking whether the sagging is present on the paint film surface.

More specifically, in this controller 39b, the presence of the sagging on the paint film surface is checked according to the flow chart of FIG. 52, as follows.

First, at the step 801, the power spectrum integrated value $P_i$ at the power spectrum integration calculation unit 21a, and then at the step 802, whether the obtained power spectrum integrated value $P_i$ is not greater than a prescribed limit value or not is determined at the sagging check unit 52.

When the obtained power spectrum integrated value is greater than the prescribed limit value at the step 802, it implies that there is no chance for the sagging to be present on the paint film surface, so that next at the step 805, the display 10 displays that it is a normal case without sagging on the paint film surface.

On the other hand, when the obtained power spectrum integrated value $P_i$ is not greater than the prescribed limit value at the step 802, the process proceeds to the step 803, at which the time change $\Delta P_i$ of the power spectrum integrated value is obtained at the power spectrum integration calculation unit 21a from the power spectrum integrated value $P_i$ obtained at two different times $t_1$ and $t_2$. Then, at the step 804, whether the obtained time change $\Delta P_i$ is not greater than another prescribed limit value or not is determined at the sagging check unit 52.

When the obtained time change $\Delta P_i$ is greater than the prescribed limit value at the step 804, it implies that there is no chance for the sagging to be present on the paint film surface, so that the process proceeds to the step 805 described above.

On the other hand, when the obtained time change $\Delta P_i$ is not greater than the prescribed limit value at the step 804, it is judged that the sagging is present on the paint film surface, so that next at the step 806, the display 10 displays that the sagging is present.

Figure 52:
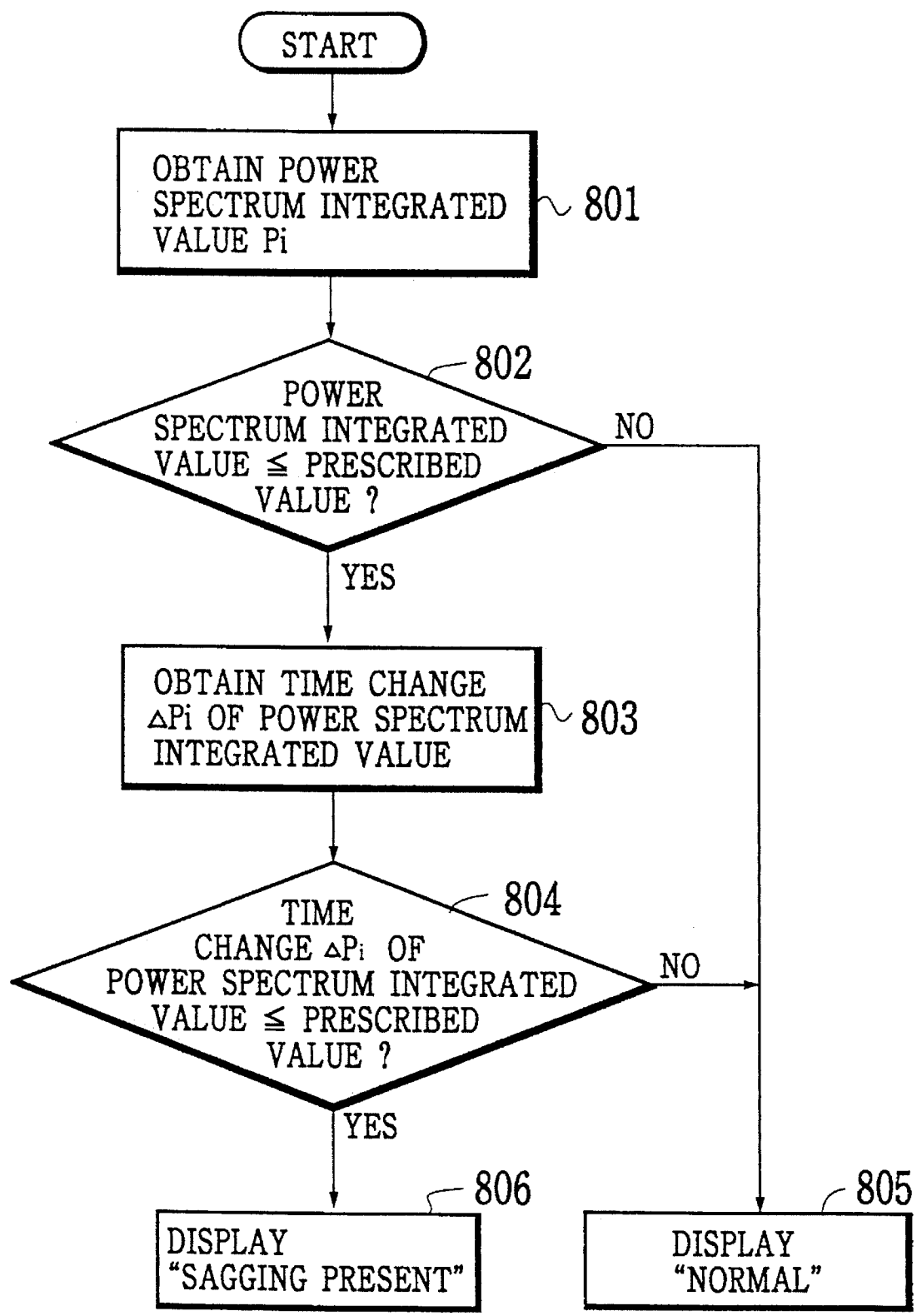
FIG. 52 is a flow chart for the sagging check operation carried out by the apparatus FIG. 51.

It is to be noted that the prescribed limit values for $P_i$ and $\Delta P_i$ used in this flow chart of FIG. 52 can be determined either empirically, or from the dynamic levelling property of the wet paint film surface by using the theoretically specified limit values for the wavelength or the paint film thickness indicating an appropriate limit for an appearance of the sagging on the wet paint film surface.

Figure 53A:
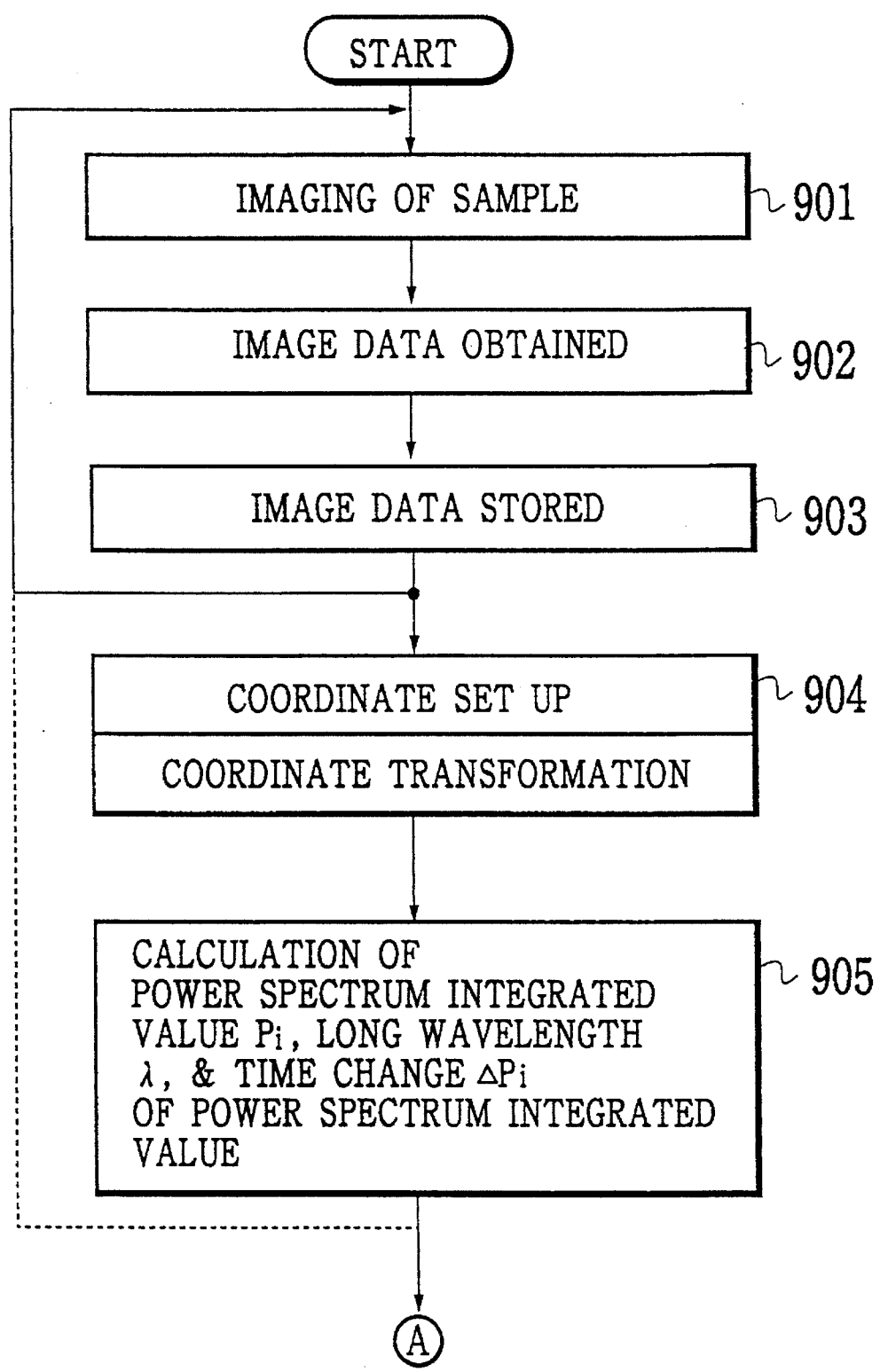
FIGS. 53A and 53B are a flow chart for the overall operation carried out by the apparatus FIG. 51.
Figure 53B:
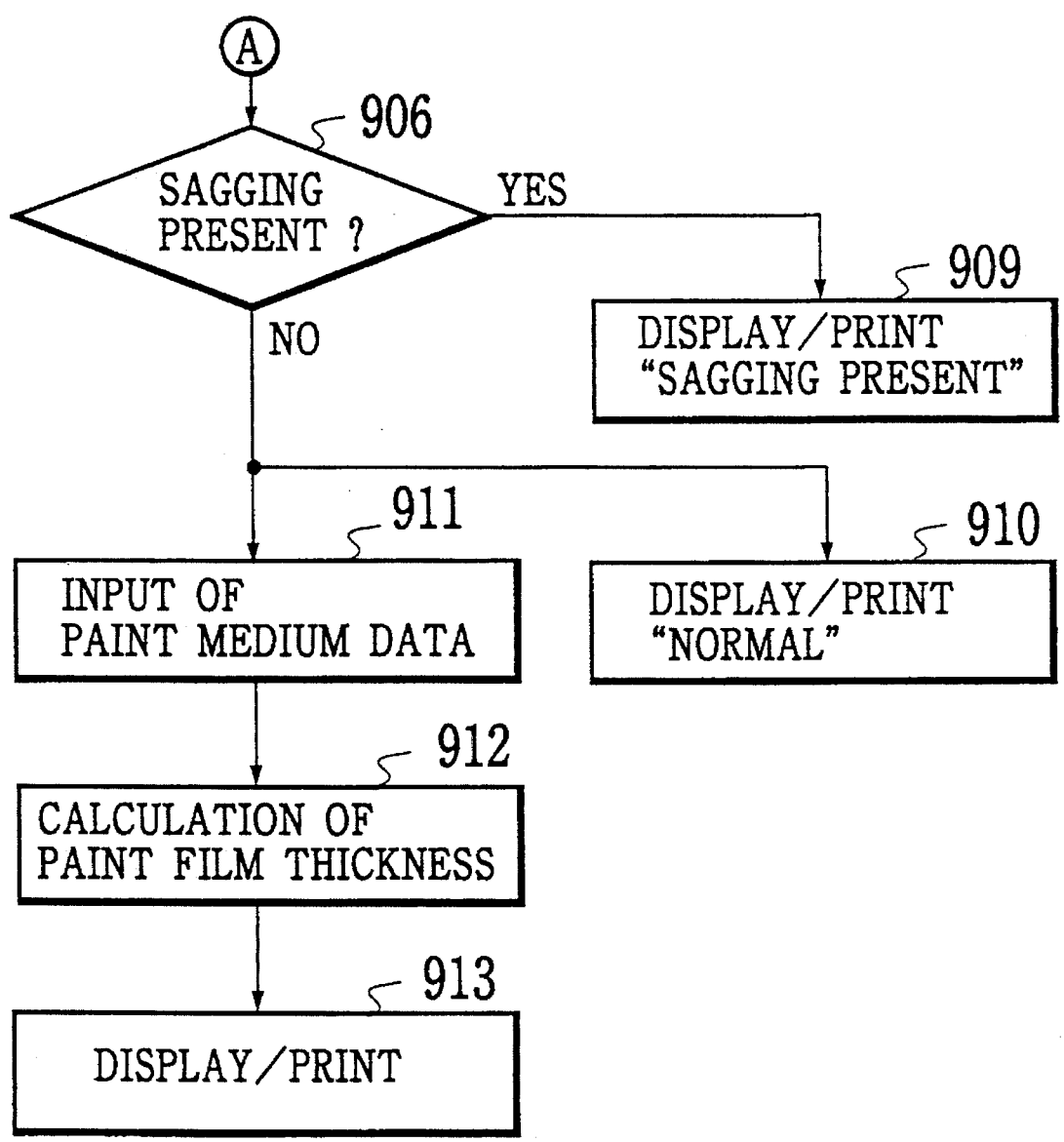

Now, this sixteenth embodiment of FIG. 51 as a whole operates according to the flow chart of FIGS. 53A and 53B, as follows.

First, the imaging head 2 carries out the imaging of the sample 1 at the step 901, such that the surface image data are obtained at the step 902. Then, the obtained surface image data are temporarily stored in a memory (not shown) provided in the controller 39b at the step 903. These steps 901 to 903 are repeated for different times and $t_2$.

Next, at the step 904, the various image processings including the coordinate set up and the coordinate transformation for a real space modelling are applied to the temporarily stored surface roughness data at the image processing unit 3.

Then, at the step 905, the power spectrum integrated value $P_i$, the long wavelength $\lambda$, and the time change $\Delta P_i$ of the power spectrum integrated value are calculated from the image processed surface image data at the power spectrum integration calculation unit 21a.

Next, at the step 906, whether the sagging is present on the paint film surface or not is determined by the sagging check unit 52 in the manner described above in conjunction with the flow chart of FIG. 52. If the sagging is present, next at the step 909, the display 10 and the plotter 11 displays and prints, respectively, that the sagging is present on the paint film surface, and the process terminates.

Otherwise, next at the step 910, the display 10 and the plotter displays and prints, respectively, that it is a normal case without the sagging on the paint film surface, and the process proceeds to the step 911.

At the step 911, the paint medium data are entered from the paint medium data memory 8 to the paint film thickness calculation unit 22, and then at the step 912, the paint film thickness calculation unit 22 calculates the paint film thickness just as in the fourth embodiment of FIG. 17 described above.

Finally, at the step 913, the display 10 and the plotter 11 displays and prints, respectively, the paint film thickness obtained by the paint film thickness calculation unit 22 at the step 912, and the process terminates.

In this manner, according to this sixteenth embodiment, it also becomes possible to provide an apparatus capable of checking the presence of the sagging on the wet paint film surface automatically, in addition to the measurement of the wet paint film thickness.

It is to be noted that, in the sixteenth embodiment described above, the presence of the sagging on the paint film surface may be checked by the time change $\Delta P_i$ alone, instead of checking both the power spectrum integrated value $P_i$ and the time change $\Delta P_i$ as in the flow chart of FIG. 52 described above.

Next, a seventeenth embodiment of an apparatus for measuring a paint film thickness according to the present invention will be described in detail.

In this seventeenth embodiment, in addition to the measurement of the wet paint film thickness and the wet distinctness, the estimation of the dry paint film thickness and the dry distinctness, and the determination of the optimum paint film thickness to be fed back to the painting process similar to those used in the eleventh embodiment of FIG. 39 described above, the presence of the sagging on the paint film surface is checked by utilizing the dynamic levelling property of the wet paint film surface using the power spectrum integrated value, just as in the sixteenth embodiment described above.

Figure 54:
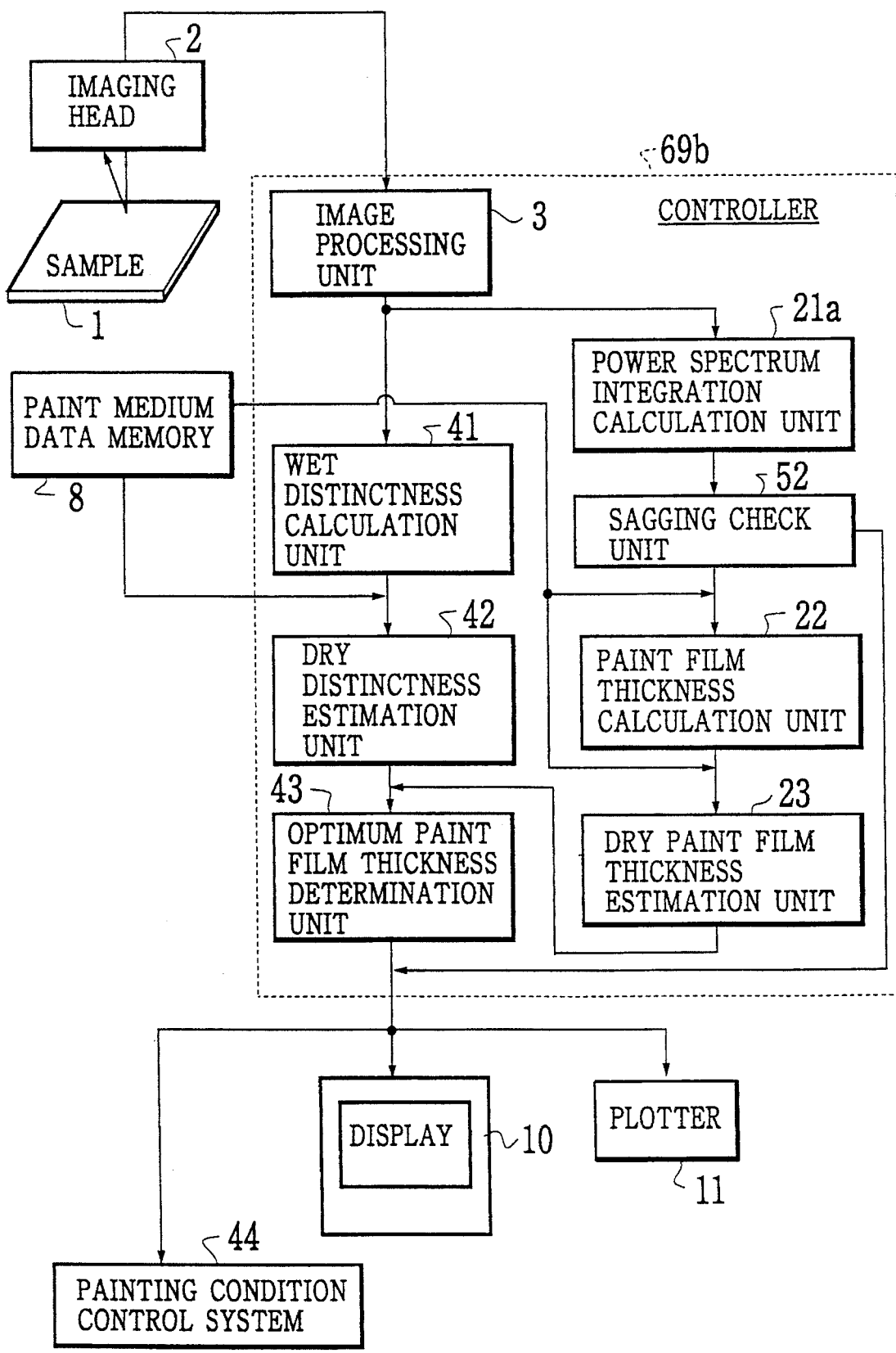
FIG. 54 is a schematic block diagram of the seventeenth embodiment of an apparatus for measuring a paint film thickness according to the present invention.

In this seventeenth embodiment, the apparatus has a configuration as shown in FIG. 54, which differs from the eleventh embodiment of FIG. 39 described above in that the controller 69 in FIG. 39 is replaced by a controller 69b which is also capable of checking the presence of the sagging on the paint film surface according to the time change of the power spectrum integrated value.

To this end, the power spectrum integration calculation unit 21a in this controller 69b calculates the time change $\Delta P_i$ of the power spectrum integrated value in addition to the power spectrum integrated value $P_i$ and the long wavelength $\lambda$, and the controller 69b further includes the sagging check unit 52 for checking whether the sagging is present on the paint film surface, just as in the sixteenth embodiment of FIG. 51 described above.

In should be apparent that, according to this seventeenth embodiment, it also becomes possible to provide an apparatus capable of checking the presence of the sagging on the wet paint film surface automatically, in addition to the measurement of the wet paint film thickness and the wet distinctness, the estimation of the dry paint film thickness and the dry distinctness, and the determination of the optimum paint film thickness to be fed back to the painting process.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An apparatus for measuring a paint film thickness, comprising:

paint film surface data acquisition means for obtaining paint film surface data indicating a roughness of a paint film surface in a wet state, by a measurement of a surface of the paint film for which the paint film thickness is to be measured, in a non-contacting manner;

paint medium data memory means for storing paint medium data specifying a paint medium from which the paint film is formed; and paint film thickness determination means for determining the paint film thickness from the paint film surface data obtained by the paint film surface data acquisition means and the paint medium data stored by the paint medium data memory means, by utilizing a calculation based on a dynamic levelling property of a wet paint film.

2. The apparatus of claim 1, wherein the paint film surface data include wavelength data indicating a wavelength of a waveform representing an unevenness on the paint film surface, and roughness data indicating one of a peak to peak amplitude of the waveform representing the unevenness on the paint film surface, a surface roughness of a surface defined by the waveform representing the unevenness on the paint film surface, a power spectrum integrated value in an image of the paint film surface, and a density vector in the image of the paint film surface.

3. The apparatus of claim 2, wherein the paint film surface data acquisition means obtains the roughness data for the paint film surface in a wet state at two different times after an application of the paint medium.

4. The apparatus of claim 2, wherein the paint film surface data acquisition means obtains the roughness data for the paint film surface in a wet state at one time after an application of the paint medium, and the paint film thickness determination means estimates the roughness data for the paint film surface in the wet state at another time from the roughness data obtained by the paint film surface data acquisition means at said one time and the paint medium data.

5. The apparatus of claim 1, wherein the paint medium data include a viscosity and a surface tension of the paint medium.

6. The apparatus of claim 1, further comprising inclination meter means for detecting an inclination of the paint film surface, wherein the paint film thickness determination means determines the paint film thickness from the paint film surface data, the paint medium data, and the inclination detected by the inclination meter means, by utilizing a calculation based on a dynamic levelling property of a wet paint film for an inclined plane.

7. The apparatus of claim 1, further comprising temperature measurement means for measuring at least one of a paint medium temperature and an ambient temperature of the paint film, wherein the paint film thickness determination means determines the paint film thickness from the paint film surface data, the paint medium data, and said at least one of the paint medium temperature and the ambient temperature measured by the temperature measurement means, by utilizing a calculation based on a dynamic levelling property of a wet paint film with a temperature correction.

8. The apparatus of claim 1, wherein the paint medium data include non-volatile data indicating a rate of non-volatile components contained in the paint medium with respect to the paint medium as a whole, and the apparatus further comprises dry paint film thickness estimation means for estimating a dry paint film thickness from the paint film thickness for the paint film surface in the wet state determined by the paint film thickness determination means and the non-volatile data in the paint medium data.

9. The apparatus of claim 8, further comprising:

wet distinctness calculation means for calculating a wet distinctness of the paint film surface from the paint film surface data and the paint medium data;

dry distinctness estimation means for estimating a dry distinctness of the paint film surface from the wet distinctness calculated by the wet distinctness calculation means and the paint medium data;

optimum paint film thickness determination means for determining an optimum paint film thickness from the wet distinctness calculated by the wet distinctness calculation means, the dry distinctness estimated by the dry distinctness estimation means, the paint film thickness determined by the paint film thickness determination means, and the dry paint film thickness estimated by the dry paint film thickness estimation means; and feed back control means for providing a feed back to control painting conditions used in a painting process for forming the paint film according to the optimum paint film thickness determined by the optimum paint film thickness determination means.

10. The apparatus of claim 1, further comprising sagging check means for checking a presence of a sagging on the paint film surface according to a time change of the paint film surface data.

11. A method of measuring a paint film thickness, comprising the steps of:

(a) obtaining paint film surface data indicating a roughness of a paint film surface in a wet state, by a measurement of a surface of the paint film for which the paint film thickness is to be measured, in a non-contacting manner;

(b) storing paint medium data specifying a paint medium from which the paint film is formed; and (c) determining the paint film thickness from the paint film surface data obtained at the step (a) and the paint medium data stored at the step (b), by utilizing a calculation based on a dynamic levelling property of a wet paint film.

12. The method of claim 11, wherein the paint film surface data include wavelength data indicating a wavelength of a waveform representing an unevenness on paint film surface, and roughness data indicating one of a peak to peak amplitude of the waveform representing the unevenness on the paint film surface, a surface roughness of a surface defined by the waveform representing the unevenness on the paint film surface, a power spectrum integrated value in an image of the paint film surface, and a density vector in the image of the paint film surface.

13. The method of claim 12, wherein at the step (a), the roughness data for the paint film surface in a wet state is obtained at two different times after an application of the paint medium.

14. The method of claim 12, wherein at the step (a), the roughness data for the paint film surface in a wet state is obtained at one time after an application of the paint medium, and at the step (c), the roughness data for the paint film surface in the wet state at another time is estimated from the roughness data obtained at the step (a) at said one time and the paint medium data.

15. The method of claim 11, wherein the paint medium data include a viscosity and a surface tension of the paint medium.

16. The method of claim 11, further comprising the step of:

(d) detecting an inclination of the paint film surface, wherein the paint film thickness is determined at the step (c) from the paint film surface data, the paint medium data, and the inclination detected at the step (d), by utilizing a calculation based on a dynamic levelling property of a wet paint film for an inclined plane.

17. The method of claim 11, further comprising the step of:

(d) measuring at least one of a paint medium temperature and an ambient temperature of the paint film, wherein the paint film thickness is determined at the step (c) from the paint film surface data, the paint medium data, and said at least one of the paint medium temperature and the ambient temperature measured at the step (d), by utilizing a calculation based on a dynamic levelling property of a wet paint film with a temperature correction.

18. The method of claim 11, wherein the paint medium data include non-volatile data indicating a rate of non-volatile components contained in the paint medium with respect to the paint medium as a whole, and the method further comprises the step of:

(d) estimating a dry paint film thickness from the paint film thickness for the paint film surface in the wet state determined at the step (c) and the non-volatile data in the paint medium data.

19. The method of claim 18, further comprising the steps of:

(e) calculating a wet distinctness of the paint film surface from the paint film surface data obtained at the step (a) and the paint medium data;

(f) estimating a dry distinctness of the paint film surface from the wet distinctness calculated at the step (e);

(g) determining an optimum paint film thickness from the wet distinctness calculated at the step (e), the dry distinctness estimated at the step (f), the paint film thickness determined at the step (c), and the dry paint film thickness estimated at the step (d); and (h) providing a feed back to control painting conditions used in a painting process for forming the paint film according to the optimum paint film thickness determined at the step (g).

20. The method of claim 11, further comprising the step of checking a presence of a sagging on the paint film surface according to a time change of the paint film surface data.

* * * * *